US010387695B2

(12) United States Patent
Engels et al.

(10) Patent No.: US 10,387,695 B2
(45) Date of Patent: *Aug. 20, 2019

(54) AUTHENTICATING AND MANAGING ITEM OWNERSHIP AND AUTHENTICITY

(71) Applicant: Vattaca, LLC, Plano, TX (US)

(72) Inventors: Daniel W. Engels, Colleyville, TX (US); Eric M. Smith, Carrollton, TX (US); Ross Mandel, Plano, TX (US)

(73) Assignee: Vattaca, LLC, Plano, TX (US)

( * ) Notice: Subject to any disclaimer, the term of this patent is extended or adjusted under 35 U.S.C. 154(b) by 374 days.

This patent is subject to a terminal disclaimer.

(21) Appl. No.: 14/987,977

(22) Filed: Jan. 5, 2016

(65) Prior Publication Data
US 2016/0132704 A1 May 12, 2016

Related U.S. Application Data

(63) Continuation of application No. 14/536,098, filed on Nov. 7, 2014, now Pat. No. 9,256,881.

(Continued)

(51) Int. Cl.
*H04W 12/06* (2009.01)
*G06K 7/10* (2006.01)
(Continued)

(52) U.S. Cl.
CPC ... *G06K 7/10366* (2013.01); *G06K 19/06037* (2013.01); *G06K 19/0723* (2013.01); *G06Q 10/087* (2013.01); *G06Q 30/0185* (2013.01); *H04L 9/3247* (2013.01); *H04L 9/3263* (2013.01); *H04L 9/3271* (2013.01);
(Continued)

(58) Field of Classification Search
CPC combination set(s) only.
See application file for complete search history.

(56) References Cited

U.S. PATENT DOCUMENTS 6,611,598 B1 8/2003 Hayosh
7,840,453 B2 11/2010 Davis, Jr. et al.
(Continued)

FOREIGN PATENT DOCUMENTS

WO 2013124276 A1 8/2013
WO 201570055 A2 5/2015
WO 201570055 A3 5/2015

OTHER PUBLICATIONS

Filing receipt and specification for provisional patent application entitled "Authenticating and Managing Item Ownership and Authenticity," by Daniel W. Engels, et al., filed Nov. 8, 2013 as U.S. Appl. No. 61/901,924.

(Continued)

*Primary Examiner* — Mark A Fleischer
(74) *Attorney, Agent, or Firm* — Conley Rose, P.C.; Rodney B. Carroll

(57) ABSTRACT

A method for creating an authentication tag includes receiving, at an authentication server, tagging device data and item data from a tagging device, authenticating, by the authentication server, the tagging device using the tagging device data, generating an authentication tag, and sending, by the authentication server, the authentication tag to the electronic device. The tagging device is affixed to an item, and the authentication tag comprises a digital signature provided by the authentication server.

24 Claims, 18 Drawing Sheets

Related U.S. Application Data

(60) Provisional application No. 61/901,924, filed on Nov. 8, 2013.

(51) Int. Cl.

| | |
|---|---|
| *H04W 4/80* | (2018.01) |
| *G06Q 30/00* | (2012.01) |
| *G06Q 10/08* | (2012.01) |
| *H04W 12/12* | (2009.01) |
| *H04L 9/32* | (2006.01) |
| *G06K 19/06* | (2006.01) |
| *G06K 19/07* | (2006.01) |
| *H04W 4/21* | (2018.01) |
| *G06Q 30/06* | (2012.01) |

(52) U.S. Cl.
CPC ............ *H04L 9/3297* (2013.01); *H04W 4/80* (2018.02); *H04W 12/06* (2013.01); *H04W 12/12* (2013.01); *G06Q 30/06* (2013.01); *H04L 2209/805* (2013.01); *H04L 2463/121* (2013.01); *H04W 4/21* (2018.02)

(56) References Cited

U.S. PATENT DOCUMENTS

| | | |
|---|---|---|
| 7,852,195 B2 | 12/2010 | Costa et al. |
| 8,234,185 B2 | 7/2012 | Davis |
| 2003/0130912 A1 | 7/2003 | Davis, Jr. et al. |
| 2004/0066278 A1 | 4/2004 | Hughes et al. |
| 2004/0088231 A1* | 5/2004 | Davis, Jr. .............. G06Q 10/087 705/28 |
| 2005/0193198 A1 | 9/2005 | Livowsky |
| 2005/0218209 A1 | 10/2005 | Heilper et al. |
| 2005/0289061 A1* | 12/2005 | Kulakowski ........... G06Q 99/00 705/50 |
| 2007/0234058 A1* | 10/2007 | White ................... H04L 9/3247 713/176 |
| 2010/0148935 A1 | 6/2010 | Graf Von Reischach et al. |
| 2012/0089835 A1 | 4/2012 | Peckover |
| 2014/0263677 A1 | 9/2014 | Divringi et al. |
| 2015/0035650 A1* | 2/2015 | Lind .................... H04B 5/0056 340/10.1 |
| 2015/0134552 A1 | 5/2015 | Engels et al. |

OTHER PUBLICATIONS

Foreign communication from a related counterpart application—International Search Report and Written Opinion, PCT/US2014/064613, dated May 18, 2015, 13 pages.

Foreign communication from a related counterpart application—Invitation to Pay Additional Fees, PCT/US2014/064613, dated Mar. 19, 2015, 6 pages.

Foreign communication from a related application—First Examination Report of EP Patent Application No. 14819114.1, dated Mar. 21, 2019, 5 pages.

* cited by examiner

AUTHENTICATING AND MANAGING ITEM OWNERSHIP AND AUTHENTICITY

CROSS-REFERENCE TO RELATED APPLICATIONS

The present application is a continuation of and claims priority to U.S. patent application Ser. No. 14/536,098 filed on Nov. 7, 2014, published as U.S. Patent Application Publication No. US 2015/0134552 A1, which claims priority to U.S. Provisional Patent Application No. 61/901,924, filed Nov. 8, 2013, by Daniel W. Engels and entitled "Authenticating and Managing Item Ownership and Authenticity," which applications are incorporated herein by reference as if produced in their entirety.

BACKGROUND

The global supply chain enables goods to be manufactured anywhere in the world and then transported to a distant market for sale. The business incentive to minimize manufacturing and transportation costs associated with an object results in items being manufactured in low-cost manufacturing facilities around the globe and then shipped to their final markets that are often half the world away. The lengthening of the supply chain from near the market to the other side of the world for a vast majority of items has resulted in long complex supply chains that span the globe for nearly every item that is sold in a global marketplace.

The near ubiquity of long, complex supply chains affords criminals multiple opportunities to introduce counterfeit products into the supply chains. Counterfeit products can be made to look identical to their cloned products, making it difficult if not impossible for a consumer to identify a counterfeit item either before or after purchase. Similarly, non-counterfeit specialists within the supply chains for a product may find it impossible to identify counterfeit products merely by looking at them. Thus, counterfeit specialists and strict processes and procedures must be employed at great expense to combat the intrusion of counterfeit products into a supply chain.

Inventory tracking systems based upon automated identification and data capture ("AIDC") technologies such as magnetic stripes, bar codes and radio frequency identification ("RFID") technologies are known in the art. Inventory tracking systems are used primarily to manage inventory within defined segments of a supply chain that exists from the point of manufacture to the point of sale ("POS"). A single inventory tracking and management system does not exist throughout the entirety of this supply chain. Instead, multiple inventory tracking and inventory management systems exist within this supply chain, with each system operating within a limited segment of the overall supply chain. Inventory management systems may be used to detect potential counterfeit products that exist within a single segment of the supply chain (for example, when multiple items with the same unique serial number exist in the same supply chain segment simultaneously), but they are not used to detect counterfeit products that exist between supply chains or supply chain segments. Inventory management systems also do not interrogate the authenticity of objects within their supply chain, and these systems have limited to no interactions with other systems that extend beyond their segment of the supply chain. Thus, while inventory management systems track an object during a specific portion of its life, they do not track the object either before or after that portion of its life, and they do not provide more than rudimentary capabilities to detect counterfeit products. Inventory management systems do not provide for ownership information as the owner of an object may not be the same as the owner of the supply chain in which an object finds itself. Furthermore, inventory tracking systems are targeted at industrial users and are not generally available to consumers.

Pedigree systems based upon either AIDC technologies or paper-based systems are known in the art. Pedigree systems provide a proof of chain-of-custody of an object, but they are unable to be used for inventory management or inventory tracking. Pedigree systems do not provide for item authentication. Instead, they provide for information authentication. Pedigrees may be generated for counterfeit items and for non-existent items since information only is being authenticated. Pedigree systems work based on the trust that the supply chain is physically secure and the trust that the actors within the supply chain are trustworthy. Pedigree systems do not provide chain-of-custody information for items traveling through supply chains that do not participate in the pedigree system. Further, pedigree systems do not provide for counterfeit product detection based upon global information, such as the duplication of an item identifier. Furthermore, pedigree systems do not provide for ownership information as the owner of an item is not always the entity in possession of the item, particularly in supply chains prior to the purchase by the end user. Pedigree systems are typically designed for the manufacturing, distribution and retail entities (including hospitals and pharmacies) involved with a product. Consumers are not the intended users of pedigree systems.

Counterfeit products have an impact on both the finances and the reputation of the victim manufacturers since the counterfeit products steal sales away from the victim manufacturer and are often of inferior quality to the authentic product. Distributors and retailers selling or handling counterfeit products may be similarly impacted and may have other legal liabilities incurred by their selling of counterfeit products. Consumers are impacted financially as well as experientially since the counterfeit product robs the consumer of the performance and capabilities of the authentic products. Inventory management and pedigree systems do not protect the consumer from counterfeit products that enter the primary supply channels or come through secondary channels or direct to the consumer.

The rise of social media and electronic auction sites has allowed criminals to market counterfeit products direct to consumers; thereby, bypassing the inventory management and pedigree systems utilized within the global supply chains. Individuals utilize these same media to sell their used or previously owned items which may or may not be counterfeit. When buying products from a reputable retailer, a consumer has confidence that they are purchasing an authentic product. When buying from another individual or over social media, such as an electronic auction site, a consumer has limited confidence in the authenticity of a product. Overt authenticity mechanisms such as holograms and bar codes are easily counterfeited along with the products themselves. And, for products bought used or pre-owned, the purchaser has limited confidence that the product is owned by the seller as opposed to being a lost or stolen item.

SUMMARY

The present invention pertains to the field of authentication systems, and more particularly to a system and method for authenticating items and managing the authenticity, history, and ownership of items over time.

A system for authenticating and managing the ownership of an item comprises a physical tagging device affixed to the item, wherein the physical tagging device comprises tagging device data, an item information system receiving the tagging device data and associated item data and storing the tagging device data and the item data, an owner registration and transfer system receiving owner registration data and ownership change requests and storing the ownership history, and an authentication system receiving authentication requests and generating a response based upon the information stored in the system or a connected system. The physical tagging device may be a linear bar code. The linear bar code may be printed directly on the item, and/or the linear bar code may be affixed to a peel-away adhesive layer that may be configured to remain affixed to the item if the physical tagging device is removed from the item. The physical tagging device may be a QR code. The QR code may be printed directly on the item and/or physically etched into the item. The QR code may be affixed to a peel-away adhesive layer, and a portion of the peel-away adhesive layer may be configured to remain affixed to the item if the physical tagging device is removed from the item. The physical tagging device may be an RFID device. The RFID device may be embedded within the item, and/or the RFID device may be affixed to a peel-away adhesive layer. A portion of the peel-away adhesive layer may be configured to remain affixed to the item if the physical tagging device is removed from the item. The physical tagging device may be an NFC compatible device. The NFC device may be embedded within the item, and/or the NFC device may be affixed to a peel-away adhesive layer. A portion of the peel-away adhesive layer may be configured to remain affixed to the item if the physical physical tagging device is removed from the item. The physical tagging device may be a Bluetooth enabled device (e.g., a Bluetooth Low Energy enabled device, etc.). The Bluetooth device may be embedded within the item. The Bluetooth device may be affixed to a peel-away adhesive layer, and/or a portion of the peel-away adhesive layer may be configured to remain affixed to the item if the physical tagging device is removed from the item. The physical tagging device may comprise an optically readable pattern. The optically readable pattern may be printed directly on the item or etched into the item. The optically readable pattern may be printed on a peel-away adhesive layer, and a portion of the peel-away adhesive layer may be configured to remain affixed to the item if the physical tagging device is removed from the item. The physical tagging device may comprise a WiFi enabled device. The item information system may further receive data and information related to the item and store the information for use by one or more of the item information system, the owner registration and transfer system, or the authentication system. The data and information related to the item may comprise information from an authentication request, tagging device read event data, authentication request event data, item information system event data, owner registration and transfer event data, authentication system event data, ownership event data, updated owner data, product registration data, manufacturer event data. The an owner registration and transfer system may further provide product registration information to an item manufacturer or item registration service. The system may also include a key management system, and the authentication system may communicate with the key management system. The key management system may comprise a hardware security module (HSM), and the HSM may stores one or more authentication keys. The authentication system may be configured to generate a response to the authentication request by accessing at least one authentication key in the key management system. The owner registration and transfer system may also include an owner registration system receiving one or more requests, owner data, and owner authentication to establish the current owner of the item, an owner release system receiving one or more requests, current owner data, and current owner authentication to remove the current owner of the item, an owner transfer system receiving one or more requests, current owner data, second owner data, current owner authentication, and second owner authentication to establish the second owner as the current owner of the item, and an owner history system that records the requests and activities regarding the ownership of the item. The system may also include a notification system generating a notification message to one or more users involved in an ownership request. The notification system may also generate a notification message to one or more entities after a change in the current ownership of an item. The item data may comprise a serial number of the item, and/or the item data may comprise image data of the item. The notification system may be configured to generate a message based upon the information stored in the system or a connected system. The system may also include an advertisement server. At least one of the item information system, the owner registration and transfer system, or the authentication system may be configured to supply information to the advertisement server, and at least one of the item information system, the owner registration and transfer system, or the authentication system may be configured to receive an advertisement from the ad server.

In an embodiment, a method for authenticating an item comprises storing authentication information, tagging device data, and item data associated with a tagging device in a server, receiving tagging device data and authentication information from a tagging device, wherein the tagging device is attached to an item, receiving the tagging device data and the authentication information from the server, correlating the tagging device data and the authentication information in the server with the tagging device data and the authentication information from the tagging device, and generating confirmation data when the tagging device data and authentication information are correlated. The method may also include commissioning the tagging device, and inserting the authentication information, the tagging device data, and the item data into the tagging device. The method may also include generating one or more notification messages indicating at least the authentication request and confirmation data and sending the one or more messages to one or more entities. One of the entities may be the registered owner of the item authenticated. The method may also include receiving the item data from server. Receiving the tagging device data and the authentication information from a tagging device and from server may be performed by a mobile tag reading device. The mobile tag reading device may be a mobile phone. The method may also include receiving an ad from an ad server in response to the correlating. The ad may be based on a type of the item, and/or the ad may be based on demographic data associated with one or more owners of the item or similar items or the usage history of the reading device and/or the location of the reading device. The method may also include generating a certificate of authenticity when the tagging device data and authentication information are correlated. The method may also include receiving a coupon from a coupon server in response to the correlating. The coupon may be based on a type of the item, and/or the coupon may be based on demographic data associated with one or more owners of the item or similar items or the usage history of the reading device and/or the location of the reading device.

In an embodiment, an item authentication system comprises a processor, and an authentication application. When executed on the processor, the authentication application configures the processor to: generate a first challenge data, send the first challenge data to a tagging device, receive a first response message and a tag identification from the tagging device, send the first challenge data, the first response message, and the tag identification to an authentication server, wherein the authentication server verifies the first response message based on the first challenge data, creates a second challenge data, and a second challenge response based on the tag identification, receive the second challenge data and the second challenge response from the authentication server based on the server verifying the first response message, send the second challenge data to the tagging device, receive a third challenge response, verify that the second challenge response matches the third challenge response, and authenticate the tagging device when the second challenge response matches the third challenge response. The tagging device may comprise a first encryption key, and the first challenge response may comprise the first challenge data encrypted with the first encryption key. The second challenge response may comprise the second challenge data encrypted with a second encryption key. The third challenge response may comprise the second challenge data encrypted with the first encryption key, and/or the first encryption key and the second encryption key may be the same shared key. The authentication application may further configure the processor to receive item information from an item information system based on the tag identification, and display the item information on an output device.

In an embodiment, a method for authenticating an item comprises storing tagging device data and certificate information associated with a first tagging device and a second tagging device in a storage, receiving first tagging device data from the first tagging device, wherein the first tagging device is associated with an item, receiving second tagging device data and second tagging device certificate information from the second tagging device, wherein the second tagging device is associated with the item, and wherein the second tagging device certificate information comprises a signature over at least a portion of the second tagging device data and at least a portion of the first tagging device data, verifying the second tagging device certificate information based on at least a portion of the first tagging device data, the second tagging device data, and the certificate information in the storage, and generating confirmation data when the second tagging device certificate information is verified. The method may also include authenticating the first tagging device based on the first tagging device data and the tagging device data stored in the storage. The method may also include authenticating the second tagging device based on the second tagging device data and the tagging device data stored in the storage. The second tagging device certificate information may comprise a signature over at least UID of the first tagging device. The confirmation data may comprise a verification that the first tagging device is associated with the second tagging device. The first tagging device and the second tagging device may be different types of devices.

In an embodiment, a method for authenticating an item comprises storing tagging device data and certificate information associated with a first tagging device and a second tagging device in a storage, receiving first tagging device data and first tagging device certificate information from the first tagging device, wherein the first tagging device is associated with an item, receiving second tagging device data and second tagging device certificate information from the second tagging device, wherein the second tagging device is associated with the item, wherein the first tagging device certificate information comprises a signature over at least a portion of the first tagging device data and at least a portion of the second tagging device data, and wherein the second tagging device certificate information comprises a signature over at least a portion of the second tagging device data and at least a portion of the first tagging device data, verifying at least one of the first tagging device certificate information or the second tagging device certificate information based on at least a portion of the first tagging device data, at least a portion of the second tagging device data, and at least a portion of the certificate information in the storage, and generating confirmation data when the first tagging device certificate information or the second tagging device certificate information is verified. The method may also include authenticating the first tagging device based on the first tagging device data and the tagging device data stored in the storage. The method may also include authenticating the second tagging device based on the second tagging device data and the tagging device data stored in the storage. The method may also include verifying both of the first tagging device certificate information and the second tagging device certificate information based on at least a portion of the first tagging device data, at least a portion of the second tagging device data, and at least a portion of the certificate information in the storage. The first tagging device certificate information may comprise a signature over at least UID of the second tagging device. The second tagging device certificate information may comprise a signature over at least UID of the first tagging device. The confirmation data may comprise a verification that the first tagging device is associated with the second tagging device.

In an embodiment, a method of updating registered ownership of an item from a presently unassigned owner to a subsequent registered owner in an authentication system comprises receiving first data at the authentication system, the first data associated with a first registered user of the authentication system, authenticating the first registered user of the authentication system based on the first data, receiving an ownership change request from the first registered user, receiving second data at the authentication system, the second data associated with the item, authenticating the second data as data associated with the item, verifying that the item has no current registered owner, and associating the first registered user as the current owner of the item based on verifying that the item has no current registered owner, authenticating the first data, and authenticating the second data. The method may also include archiving selected information associated with the updating of the ownership to maintain a historical record of ownership transactions. The authentication system may require the first registered user to have ownership privileges in the authentication system. The method may also include providing notification, by the authentication system, of the change of ownership transaction to the first registered user. The method may also include providing notification, by the authentication system, of the change of ownership transaction to a third party. The method may also include reading the second data from a QR code attached to the item. The method may also include reading the second data from an RFID tag attached to the item. The method may also include reading the second data from an active wireless communication device.

In an embodiment, a method of releasing the present owner of an item in an authentication system comprises receiving first data at the authentication system, the first data associated with a first registered user of the authentication system, authenticating the first registered user of the authentication system based on the first data, receiving an ownership change request from the first registered user, verifying the first registered user is a current owner of the item, setting the first registered user as a past owner of the item based on authenticating the first registered user and receiving the ownership change, and setting the current owner of the item as unassigned. The method may also include receiving second data at the authentication system, the second data associated with the item, authenticating the second data as data associated with the item, wherein setting the first registered user as the past owner of the item is further based on authenticating the second data. The method may also include the step of archiving selected information associated with the updating of the ownership to maintain a historical record of ownership transactions. The authentication system may require the first registered user having ownership privileges in the authentication system. The method may also include providing notification, by the authentication system, of the change of ownership transaction to the first registered user. The method may also include providing notification, by the authentication system, of the change of ownership transaction to a third party.

In an embodiment, a method of updating registered ownership of an item from a current owner to a subsequent owner in an authentication system comprises receiving first data at the authentication system, the first data associated with a first registered user of the authentication system, authenticating the first registered user of the authentication system based on the first data, receiving an ownership change request from the first registered user, wherein the ownership change request comprises second data, the second data associated with a second registered user of the authentication system, verifying the first registered user is the current owner of the item based on the first data, verifying the second registered user as a valid registered user, setting the first registered user as a past owner of the item, and setting the current owner of the item as the second registered user. The method may also include receiving third data at the authentication system, the third data associated with the item, and authenticating the third data as data associated with the item, wherein setting the first registered user as the past owner of the item and setting the current owner of the item as the second registered user is based on authenticating the third data. The method may also include archiving selected information associated with the updating of the ownership to maintain a historical record of ownership transactions. The authentication system may require the first registered user having ownership privileges in the authentication system. The method may also include providing notification, by the authentication system, of the change of ownership transaction to the first registered user. The method may also include providing notification, by the authentication system, of the change of ownership transaction to a third party. The third party may be the manufacturer of the item.

In an embodiment, a method of for creating an authentication tag comprises communicating with a tagging device affixed to an item, receiving tagging device data and item data from the tagging device, wherein the tagging device data comprises a first digital signature and a first time stamp, sending the tagging device data and the item data to the authentication server, receiving an authentication of the tagging device from the authentication server, requesting an authentication tag based on the authentication of the tagging device, receiving the authentication tag, wherein the authentication tag comprises a second digital signature and a second time stamp, wherein the second digital signature covers the tagging device data and the item data. The tagging device may comprise a linear bar code, QR code, an RFID device, an NFC compatible device, or a Bluetooth enabled device. The authentication tag may comprise a linear bar code or a QR code. The first digital signature may comprise at least one of a public key cipher, a hash function, or a keyed hash function. The authentication tag may verify the authenticity of the item at a time identified by the second time stamp. The method may also include receiving user credentials, sending the user credentials to an authentication server, receiving user verification based on the sending the user credentials to the authentication server, wherein communicating with a tagging device affixed to an item is based on the user verification. The user credentials may be for an owner of the item. At least one of the first digital signature or the second digital signature may be generated by a signing authority.

In an embodiment, a method of tracking an item comprises communicating, by a reading device, with a tagging device, wherein the tagging device is associated with an item, retrieving tagging device data from the tagging device, determining a first location of the tagging device, retrieving a location reference based on the tagging device data, calculating a distance between the first location and the location reference, and generating a message when the distance exceeds a threshold. The location reference may define a predetermined location. The determining of the first location may occur at a second time, and the location reference defines a previous location of the tagging device as determined at a first time. The method may also include calculating a time difference between the first time and the second time, where the threshold is based on the time difference being less than a time threshold. Generating the message may comprise generating the message when the distance exceeds the threshold and when the first location of the tagging device is outside a defined geographic area. Generating the message comprises generating the message when the distance exceeds the threshold and when the first location of the tagging device is within a defined geographic area. The message may comprise the first location of the tagging device and at least a portion of the tagging device data.

In an embodiment, a method of tracking an item comprises communicating, by a reading device, with a tagging device at a first time, wherein the tagging device is associated with an item, retrieving tagging device data from the tagging device, attempting to communicate, by the reading device, with the tagging device at a second time, wherein the second time is after the first time, failing to communicate with the tagging device at the second time, and generating a message in response to failing to communicate with the tagging device. The first time and the second time may occur at periodic intervals, and/or the first time and the second time may occur at predefined times. The method may also include determining a signal strength in response to communicating with the tagging device, and the second time may be based on the signal strength. The method may also include attempting to communicate with the tagging device at one or more intermediate times, and the one or more intermediate times may fall between the first time and the second time. The method may also include authenticating the tagging device based on the tagging device data retrieved from the tagging device.

These and other features will be more clearly understood from the following detailed description taken in conjunction with the accompanying drawings and claims.

DETAILED DESCRIPTION

Figure 1:
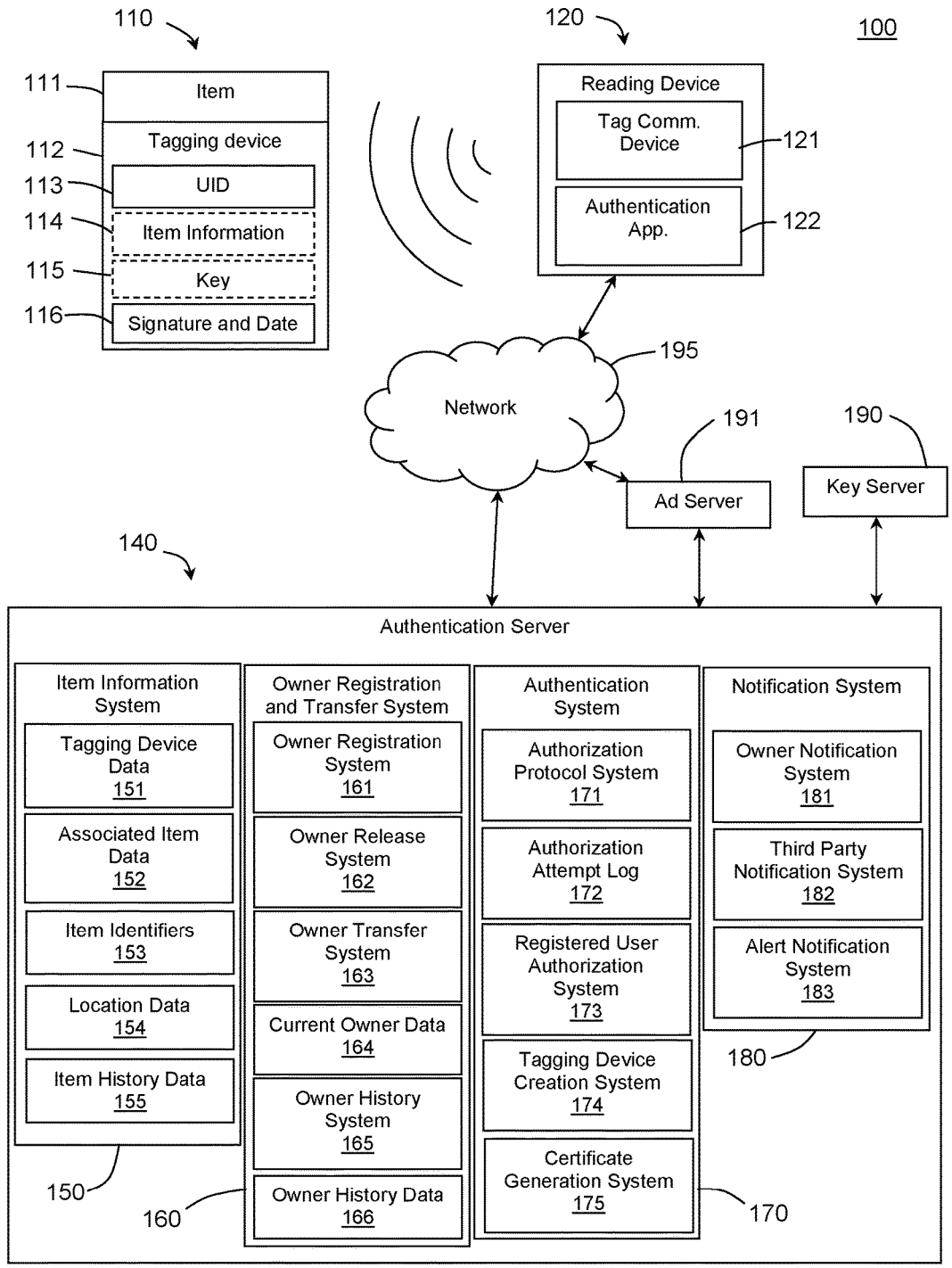
FIG. 1 is a system for item authentication and ownership management of an object throughout its lifetime in accordance with an exemplary embodiment.

The present disclosure is directed to systems and methods for managing the authenticity of and information about an item throughout its lifetime, and particularly to the prevention of and early detection of counterfeit items. The systems and methods identify an item, provide multiple mechanisms to authenticate the identity of the item, provide for an owner of the item to manage the information available about an item at one or more servers accessible over a communication network, provide for those servers to report transactions related to an item back to the item's owner or some other entity, and provides services to third parties such as advertisements, coupons, and notifications to users and anonymized data aggregation.

A system is disclosed herein that can be used by consumers and by the various entities in the global supply chains to verify the authenticity of items throughout each item's lifetime and to verify the owner and ownership history of that item. A number of anti-counterfeiting technologies have been utilized in products including holograms, color shifting ink, security graphics, sequential product numbering, on-product marking, invisible printing, watermarks, substrate embedded materials, taggants, and RFID tagging for track and trace. These technologies have been adopted for both overt and covert mechanisms, and they have been deployed such that consumers can utilize the anti-counterfeiting mechanism directly (overt technologies) or require specialized services from a certified specialist (covert technologies). Only with the use of a certified specialist to investigate the covert technologies might the owner or some other entity such as the official manufacturer gain knowledge about the current situation of the item.

The use of AIDC technologies, such as RFID systems and bar code systems, or other wireless communication devices, such as a Bluetooth, WiFi, or Zigbee device, allows for improved supply chain management through track and trace capabilities and provide opportunities for consumers to authenticate an item, such as by reading a signed certificate from the memory of an RFID tag. In order to protect consumers, manufacturers, and all parties within a supply chain, from counterfeits and the resale of lost or stolen items, a system can be used that allows for all entities that come in contact with an item, especially consumers, to verify the authenticity of that item directly and to verify the ownership of that item to ensure that it is not lost or stolen even if it is authentic.

The disclosed system incorporates a tagging device that is affixed to an item and is used to uniquely identify and authenticate the item to which it is affixed. The tagging device may be used also to determine the location of the device. Reading device or tag communication device is used to retrieve information from the tagging device. The reading device may have multiple communications with the tagging device during an authentication process. The reading device may communicate with a local authentication system, such as an application executing on the reading device. The local authentication system communicates with an authentication server over a communication network. Either the reading device or the authentication system may use the one or more communications with the tagging device either alone or in conjunction with additional information to determine the location of the tagging device. Alternatively, the tagging device, reading device or the authentication system may determine the location of the reading device. The local authentication system may obtain data or information from the server that is used to authenticate the object. The server may obtain data or information from the local authentication system regarding the tagging device, the reading device, the local authentication system and other associated information such as location, user, and network and other communication information. The server provides for the declaration of an owner of the object and for the transfer of ownership of the object. The current owner of an item may limit access to the information and services available on the server and related to that item. An owner may provide credentials to the local authentication system that then acts as a proxy for the owner in interactions with the server. An owner may also access the server directly. The server maintains information on transactions involving an item and may report transaction information to the owner or other entity. The owner may add and/or modify the item information in the server. The ownership pedigree and item transaction information may serve as the basis for secondary authentication mechanisms for the object.

FIG. 1 is a schematic diagram of a system 100 for authenticating items and managing the ownership of items throughout their lifetimes in accordance with an exemplary embodiment. System 100 comprises one or more tagged items 110 comprising a tag 112 associated with an item 111, a reading device 120, which may comprise a local authentication application 122, an authentication and management system 140, and an optional key server 190. The components of the system may communicate directly or indirectly over one or more wired or wireless communication protocols and/or over a network 195. System 100 allows items to be authenticated using multiple mechanisms and the ownership history of the items to be maintained and managed by the owner(s) of the item throughout its lifetime. One or more components of the system 100 can be implemented in hardware and/or software, which can include one or more software systems operating on one or more servers or computers. Servers and computers are described in more detail below.

Each component of the system 100 may communicate directly or through one or more intervening systems and components including wired and/or wireless connections. In an embodiment, the components of the system 100 may be communicatively coupled using a public communication network, a private communication network, or a combination thereof. Various components of the system may communicate over one or more wireless links or channels, which may or may not include communications through the network 195. The wireless communication couplings may occur over a short range communication protocol such as WiFi, Bluetooth, Near Field Communication ("NFC"), or the like. In some embodiments, one or more components of the system may communicate over the network 195 through a wireless communication protocol such as a code division multiple access ("CDMA") wireless protocol, a global system for mobile communications ("GSM") wireless protocol, a long term evolution ("LTE") wireless protocol, a worldwide interoperability for microwave access ("WiMAX") wireless protocol, or another wireless communication protocol.

System 100 includes one or more tagged items 110. A tagged item generally comprises an item 111 that is to be authenticated and managed and a tagging device 112 associated with the item 111. The tagging device 112 may be any device that allows for the identification, verification, and/or authentication of the item 111. In an embodiment, the tagging device 112 is a physical device. In an embodiment, the tagging device 112 may comprise human readable printed date, a physical label, and/or an active or passive machine readable device. In an embodiment, the tagging device may be an optically readable pattern that is composed of numbers, letters, and/or symbols. The optically readable pattern may be printed directly on the item, and/or the optically readable pattern may be printed on an adhesive label that is affixed to the item. The optically readable pattern may be etched into the item. In an embodiment, the tagging device 112 may be an AIDC tagging device, such as a linear bar code with encoded data, a multidimensional bar code such as a QR code with encoded data, an RFID tag that stores at least an identifier, an RFID tag with cryptographic functionality, a Near Field Communication NFC tag (a type of RFID tag), an active communication device such as a Bluetooth device (e.g., a Bluetooth Low Energy ("BLE") device), a WiFi enabled device, or a combination of multiple tagging devices. Print markings, such as color barcodes or encoded color sequences that may be interpreted by a system designed to decode the markings, may also be used as a tagging device 112. In an embodiment, an RFID tag containing cryptographic functionality, such as the NXP DESFire tag or the Mifare Ultralight C tag, a QR code encoding at least an identifier and cryptographically signed hash, or both are used as the tagging device 112 for an item 111. While described in the context of a single tagging device 112 being associated with an item 111, a tagged item 110 may comprise one or more tagging devices 112. Redundancy with different tagging technologies provides for a robust system design. When multiple tagging devices are utilized, a single tagging device may be used for item authentication and ownership management. Additionally, the multiple tagging devices may be used to authenticate each other in addition to providing for item authentication when a plurality of tagging devices (e.g., less than all the tagging devices, the totality of the tagging devices, etc.) are authenticated.

In general, the tagging device 112 may be coupled, affixed, embedded, or otherwise attached to the item 111. As used herein, the terms couple, affix, embed, attach, or any other like term describing an interaction between elements is not meant to limit the interaction to direct interaction between the elements or limit the interaction to physical interaction between the elements and may also include indirect or non-physical interaction between the elements described (e.g., associated with through either an electronic connection, proximity, or other physical or logical connection with an item). While directly affixing or otherwise physically attaching the tagging device 112 to the item 111 may provide an improved degree of security, the tagging device 112 may also be associated with the item 111 while not being directly affixed to the item 111. For example, the tagging device 112 may be coupled either directly or indirectly to the item when it is included with an item 111 in the item's packaging, within paperwork accompanying the item 111, or the like.

In some embodiments, the tagging device 112 may comprise a computer program or application that is associated with the item 111. For example, the purchaser of an item may download a tagging device program to their computing device (e.g., a mobile device). The purchaser may enter information unique to the purchased item 110, such as a serial number or unique item identifier. In some embodiments, the tagging device program may be downloaded and the item specific information filled in in response to scanning a bar code, QR code, or the like on a piece of paper packaged with the item 110. In some embodiments, the tagging device may comprise a digital presentation, and the reading device may be able to read the tagging device from a digital source such as a monitor, tablet, computer screen, or the like. This may be useful for digitally purchased products. The tagging device program may comprise the same or similar information, albeit in electronically stored form, as the other tagging devices described herein. The tagging device program, being a tagging device 112, may utilize a camera or other optical input device to take a picture or movie of the item 110. The tagging device program may analyze the optical feed to identify characteristics such as lettering, length, width, and other visual characteristics. The tagging device program may send this information to the authentication and management system 140 or a component thereof (e.g., the authentication system 170), and the authentication and management system 140 may inform the tagging device program as to the likelihood of the item 110 being authentic. Various physical characteristics or identifiers such as dings, dents, scratches, or the like may be captured by the tagging device program to allow for visually identifiable features to be updated through the life of the item 110. These updates may allow for unique features to be captured and used for identification as the appearance of an item 110 is altered over its lifetime.

As shown in FIG. 1, the tagging device 112 can comprise data stored in various forms. Each tagging device 112 comprises uniquely coded identifying data ("UID") 113, such as a unique Electronic Product Code ("EPC"), encoded within the tagging device 112. Depending on the writable memory storage capacity of the tagging device 112, additional data may also be included. In an embodiment, the tagging device 112 may also comprise item information 114 such as the type, category, manufacturer, model number, serial number, manufacturing date, or the like of the item 111. In an embodiment, the tagging device 112 may also comprise a cryptographic signature 116 over data related to the item, and such data may or may not be stored on or in the tagging device. The tagging device 112 may also comprise a timestamp, date information, and/or version information pertaining to when the cryptographic signed signature 116 was generated. Tagging devices 112 comprising cryptographic functionality such as RFID tags, including NFC tags, and Bluetooth devices, may have a cryptographic key 115 such as a secret key written into the tagging device 112. The secret key may be written during the commissioning process. Tagging devices 112 such as QR codes, linear bar codes, and RFID tags with sufficient writable memory may comprise one or more cryptographically generated signatures 116 and optional corresponding signature dates or version numbers. The cryptographic signature 116 may be obtained using any number of available digital signature algorithms such as a public key cipher like RSA, a keyed hash function, a hash function whose result is signed by a public key cipher, or a symmetric key cipher such as AES. The cryptographic signature can be written to the memory of the tagging device or included in the data encoded by the encoding mechanism of the device (such as the black and white lines in a linear bar code). Any of the data stored on the tagging device 112 may be stored as unencrypted or encrypted data, and/or used in the creation of a data structure on the tagging device 112.

In an embodiment, attaching, equivalently affixing, a tagging device 112 to an item can include physically attaching the tagging device 112 to an item 111 such as by an adhesive label, by riveting the tagging device 112 to the item 111, by bolting the tagging device 112 to the item 111, and by other physical attachments such that the removal of the tagging device 112 from the item 111 requires specialized tools or the breaking or damaging of the item 111. Attaching a tagging device 112 to an item 111 may include physically attaching the tagging device 112 to the item 111 so that the removal of the tagging device 112 leaves evidence that the tagging device 112 was removed (such as by using a tamper evident adhesive). Attaching a tagging device 112 to an item 111 may further include physically embedding the tagging device 112 within the item 111 such that the item 111 must be damaged or destroyed in order to remove the tagging device 112. In some embodiment, attaching a tagging device 112 to an item 111 may include printing the tagging device 112, such as a bar code, QR code, or the like, directly onto the item 111. Attaching a tagging device 112 to an item 111 may also include physically etching the item 111 with the tagging device 112, for example by laser etching a QR code into the item 111.

Figure 2A:
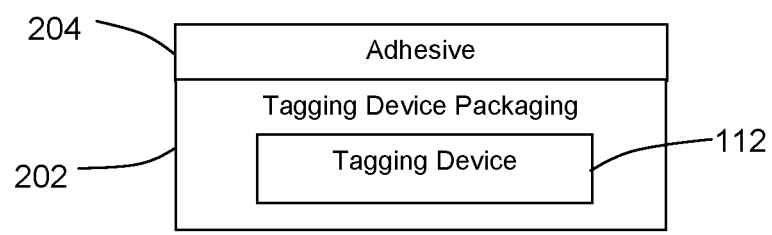
FIGS. 2A and 2B are diagrams of a tamper evident tagging device in accordance with exemplary embodiments.
Figure 2B:
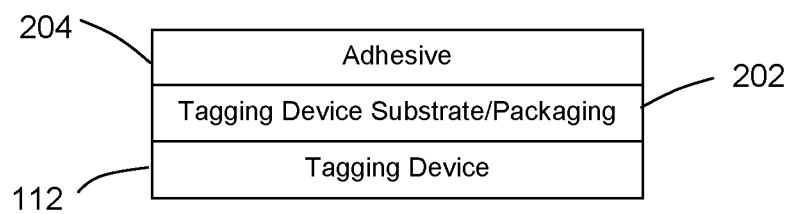

An embodiment of the tagging device 112 is provided with reference to FIGS. 2A and 2B. As shown in FIG. 2A, the tagging device may be disposed or embedded within a packaging material 202. The packaging material may comprise any material allowing the tagging device to be read without being obscured by a suitable communication medium. For example, when the tag comprises an RFID device or NFC enabled device, the packaging material may comprise a non-metallic material that allows radio frequency waves or communications to communicate between the tagging device 112 and a reader device adjacent to or within communication range of the tagging device in the packaging material 202. Similarly, for a barcode or QR code or other tagging device requiring line-of-sight between the tagging device and the reading device such as an infrared-based tagging device, the packaging material may be translucent to allow a reader to communicate with or read the tagging device 112, such as allowing the reader to optically see the pattern of a QR code. The packaging material 202 may be coupled to a tamper resistant adhesive 204 such as a permanent, strong adhesive (e.g., to permanently affix the tagging device 112 to the item, etc.) or a peel-away layer. The tamper resistant adhesive may be configured to physically leave identifying data or tamper evidence if an attempt to remove the tagging device and/or packaging material is made.

In some embodiments, the tamper resistant adhesive 204 may be electrically conductive such that an attempt to remove the tagging device 112 and/or packaging material 202 changes the electrical properties of the adhesive 204 in a manner that is detectable by the tagging device 112 or the reader in communication with the tagging device 112. For example, an electrically conductive adhesive used for a passive RFID tag may be designed to be connected directly to metal where the metal is electrically connected and form a portion of the tagging device's antenna. Removing the tagging device from the metal may alter the adhesive and change the electrical properties of the tagging device's response signal. In some embodiments, the removal may be detected and logged in the memory (e.g., as a special bit). The memory may be sent during normal communications with a reader, for example, when the tagging device comprises a BLE or other powered device, which may be an effective manner of electronically signaling that tampering has occurred. In this manner, any potential tampering with an item may be detected as well as an attempt to re-associate the tagging device 112 with a new item.

FIG. 2B illustrates a similar tamper resistant tagging device 112. In this embodiment, the tagging device forms a layer that is coupled to a layer of packaging material 202. The packaging material is coupled to the tamper resistant adhesive 204 to indicate if an attempt to remove or otherwise alter the tagging device 112 is made. In the embodiment of FIG. 2B, the tag may be read directly since it is not embedded within the packaging material, which may provide a broader range of compounds that can be used for the packaging and/or tamper resistant materials.

Returning to FIG. 1, the reading device 120 is configured to communicate with and obtain information such as the UID from the tagging device 112. In an embodiment, the reading device 120 comprises a tag communication device 121 that establishes a communication sequence with the tagging device in order to validate and/or obtain the tagging device information. For example, an RFID tag containing cryptographic functionality may utilize a sequence of communications in order to execute that cryptographic functionality. In some embodiments, the cryptographic functionality can be obtained in a single reading of the tagging device, such as when the tagging device 112 comprises a QR code or the tagging device 112 communicates a self-signed message. Various devices can be used as the reading device 120 including, but not limited to, a bar code scanner, an RFID reader, an NFC enabled device, an optical recognition system, an infrared reader, or any combination thereof. The reading device 120 may allow a tagging device to be read in one or more forms such as a tagging device affixed to an item, a visual representation of the tagging device (e.g., a digital image of a QR code, bar code, or the like), or the like. In an embodiment, a mobile device such as a mobile phone may serve as the reading device, wherein the mobile device may have an optical receiver (e.g., a camera, etc.) or any other electronic communication and reading systems. In an embodiment, the reading device 120 may comprise an indication of where the tagging device 112 should be placed or positioned to allow the tagging device to be read. In some embodiments, the indication may be presented on a display of the reading device 120. For example, a symbol may be displayed on the display of a mobile device indicating how the tagging device 112 should be aligned relative to the mobile device for the tagging device 112 to be properly read.

The reading device 120 may communicate with an authentication system 170, which may be a local authentication system 122 and/or a server based authentication system 170. The local authentication system 122 may be an application that executes on the reading device 120. The local authentication system 122 can communicate with the authentication system 170 to assist in the authentication process based upon the data and other information obtained from the tagging device 112 and one or more reading devices. The use of a local authentication system 122 may provide for automated data retrieval and communication with the authentication server 170. A local authentication system 122 is described in more detail herein.

When a server based authentication system 170 is used, the reading device 120 may serve as an input device for the authentication system 170. The input device may comprise an automated reading device or a manual entry system that communicates with the authentication server 170 and allows for the input of information to the authentication server 170. This information may be input prior to the authentication process beginning or may be input as part of the authentication process. The input device may be used to allow for manual entry and validation of the tagging device 112, which may be useful when an automated reading device 120 is not available.

As shown in FIG. 1, the authentication and management system 140 may comprise an item information system 150, an owner registration and transfer system 160, an authentication system 170, and/or a notification system 180. The item information system 150 receives tagging device data 151 including the UID 113 of the tagging device 112, and optionally the associated item data 152, any additional item identifier or identifiers 153, and location data 154. The information can be received from one or more reading devices 120. In some embodiments, the information is created by a commissioning device or system at the time of the creation of the tagging device 112, and the information can be received directly from the commissioning device rather than from the tagging device 112. The item information system 150 is in communication with the remaining portions of the system 100 and stores the tagging device data 151 and the optional item data 152 and/or item identifier(s) 153 for use with the system 100.

In an embodiment, the tagging device data 151 and/or the item data 152 can be provided by an owner of the item 111 or by a third party (e.g., a manufacturer, dealer, repair provider, etc.). Various information about the item can be included in the item data 152 including information about the item 111 in its original condition (e.g., serial number, make, model, manufacturing date, etc.), information about maintenance (e.g., a maintenance history), and various information about damage, theft, and the like. The information may be provided by the owner and/or directly from third parties, which may or may not be the third parties responsible for the maintenance or reporting about the item. For example, a maintenance provider may provide information about work performed on the item directly to the system 100 for updating the item data 152. As another example, a law enforcement agency may provide information directly to the system 100 to update the item data 152 with reports of stolen items, recovered items, or the like. In some embodiments, the item information system 150 may be configured to actively poll the owner and/or various third party providers to obtain updates to the item data 152. This may allow the information stored in the item information system to be modified by the owner of the item.

The item history data 155 can store information related to the item. The information can be received from other data stores in the item information system 150, the owner registration and transfer system 160, the authentication system 170, and/or the notification system 180. Various data can be stored in the item history data 155 such data associated with an authentication request, a tag read, a query or access into the information system, owner updated information such as pictures of the item, purchase information, product registration information, and additional information provided by the item manufacturer such as recall notifications or software update information. In an embodiment, the item history data 155 can include, but it not limited to, data for an authentication request, tagging device read event data, authentication request event data, item information system event data, owner registration and transfer event data, authentication system event data, ownership event data, updated owner data, product registration data, manufacturer event data. The information can be provided to other systems for use in the authentication process, the ownership validation/transfer process, or any of the other processes described herein.

The owner registration and transfer system 160 receives owner registration data and ownership change requests and stores an ownership history for the item 111. The owner registration and transfer system 160 can serve to carry out an ownership change in response to receiving an ownership change request. When an item 111 does not have a registered owner, the owner registration and transfer system 160 allows a possessor of the item 111 to register as the owner of the item 111 based on authenticating one or more tagging device 112 and/or the item 111. Once an owner is registered for an item, the owner registration and transfer system 160 allows a registered owner to release ownership and/or transfer ownership to a subsequent owner of the item 111. The ownership transfer process may be contingent upon authenticating one or more tagging device 112 and/or item 111.

In order to perform its various functions, the owner registration and transfer system 160 may comprise one or more of an owner registration system 161, an owner release system 162, owner transfer system 163, current owner data 164, and an owner history system 165. The owner registration system 161 is configured to receive one or more requests, owner data, and owner authentication information (e.g., from the authentication system 170) to establish the current owner of the item 111. The owner registration system 161 may be used to establish the initial ownership of the item 111 and/or the ownership of the item 111 after the ownership has been released by a previous owner. The owner registration system 161 may be configured to receive item authentication information from the authentication system 170, and premise the registration of the ownership upon verification of this information. This may help reduce the likelihood that a person other than the true owner or possessor of the item 111 becomes registered as the owner.

The owner release system 162 may be configured to receive one or more requests to release the ownership of the item 111, the current owner data, and the current owner authentication information and use this information to release the current ownership claim to the item 111. The owner release system 162 may serve to allow a present owner of the item to release an ownership claim to allow a subsequent owner to register as the owner of the item. As with the owner registration system 161, the owner release system 162 may be configured to receive item authentication information from the authentication system 170 prior to allowing the ownership claim to be released. In some embodiments, the owner release system 162 may allow the ownership claim to be released based only on a verification of the current owner authentication information.

The owner transfer system 163 may be configured to receive one or more requests from an owner and/or a subsequent purchaser to transfer the ownership of the item 111 from the current owner to a subsequent owner. In order to carry out the ownership transfer, the owner transfer system 163 may receive the one or more requests, current owner data, second owner data, current owner authentication information (e.g., from the authentication system 170), and second owner authentication information (e.g., also from the authentication system 170) to allow the ownership claim to be released for the first owner and established for the second owner. The owner transfer system 163 may be configured to receive item authentication information from the authentication system 170 prior to allowing the ownership claim to be released. In an embodiment, the item authentication information may be supplied by either the current owner or the second owner, thereby verifying that the item is in the possession of one of the parties to the transaction. In some embodiments, the owner transfer system 162 may allow the ownership claim to be transferred from the current owner to the second owner based only on a verification of the current owner authentication information and the second owner authentication information.

The current owner data 164 comprises information related to the current owner of the item 111 when the ownership status is claimed. The owner history system 165 generates the current owner data 164 during the ownership management process from the data within the owner registration and transfer system 160 and provides a pedigree for the item 111. The pedigree can extend over various time periods, and in an embodiment, can extend from the commissioning of the tagging device 112 to the current owner of the item 111. The owner history can be updated in response to an ownership status change for the item 111. For example, the current owner data 164 can be amended to include an ending date for the ownership claim, and the data can then be moved by the owner history system 165 to the owner history data 166. The ownership registration and transfer system 160 can also monitor the ownership status and history of an item 111 and send an alert to the notification system 180 in the event that an improper transfer request is processed or upon an indication that a counterfeit or fraudulent transaction is occurring.

Within the owner registration and transfer system 160, the ownership data and information can be maintained by the various systems in several forms. In an embodiment, ownership of an item 111 can be maintained as a linked list of owner data structures. Each owner data structure may include information on an owner in the owner pedigree including, but not limited to, the beginning date of ownership and the ending date of ownership. A current owner of the item 111 would not have an ending date of ownership in the data structure. When the current owner is unassigned or unclaimed, the owner data structure comprises an indication that the ownership belongs to an unassigned owner. In some embodiments, an ownership history and the current owner identification are maintained in a database, and the elements of the ownership data structure may be translated into fields in the database. The current owner of an item may be determined by identifying the owner whose ending date of ownership has not been set. All past owners may be identified as those owners whose ending date of ownership has been set to a day less than or equal to the current day in which a query is made.

The authentication system 170 is configured to receive various authentication information and requests and generate a response based upon the information stored in the system authentication and management system 100 or a connected system (e.g., key server 190). The authentication information may be stored in various components of the system 100 and may include, but is not limited to, passwords, cryptographic keys, cryptographic messages in an authentication message sequence, and any combination thereof. The authentication system 170 may serve to receive information from the tagging device 112 and verify that the tagging device 112 is the same tagging device that should be associated with the item 111. The authentication system 170 may also serve to authenticate registered users of the system 100. For example, the authentication system may be configured to receive user credentials and verify the authority of a user to access the system to verify a tagging device, request an ownership registration or change, create a new tagging device, or the like. In some embodiments, the authentication system 170 may serve to create the data associated with the tagging device 112 such as the UID, a digital signature, a cryptographic key, or any of the other data associated with the tagging device 112. The authentication system 170 may also maintain a log of authentication requests, attempts, result, and information related to such activities which may be used with the notification system 180.

The authentication system 170 can be used to maintain and manage the authentication information used in the tagging device 112 and/or item 111 verification process. The authentication system 170 stores information such as a tagging device identifier, an object identifier, or other object or tagging device information that is associated with the tagging device 112.

The authentication system 170 and key server 190 may also store one or more cryptographic keys used during the commissioning process and associate the keys to the data contained within the tagging devices. The authentication system 170 may be used to maintain and manage the public keys used during the authentication processes and may manage communications with the key server 190 that protects and manages the secret and private keys used to authenticate the tagging device 112 and its associated data. When cryptographic functions are used, it is preferred that the cryptographic keys be maintained at the authentication system 170 (e.g., in data associated with the authentication protocol system 171) and/or in the key server 190 that communicates with the authentication system 170. The key server 190 may represent a secure storage facility, and the use of a key server 190 may mitigate the risks associated with distributing keys outside of a secure environment. In an embodiment, a dedicated key server 190 may comprise one or more hardware security modules ("HSM"s) that may be used to perform all server side operations involving cryptographic keys such as secret keys and/or private keys. For tagging devices that do not have data storage or data encoding capabilities, such as RFID tags that can store only an identifier, a cryptographic key may not be stored in the authentication system 170 associated with that tagging device 112.

The authentication system 170 may comprise an authentication protocol system 171, an authentication attempt log 172, a registered user authentication system 173, and/or a tagging device creation system 174. The authentication protocol system 171 provides for communication with and verification of the tagging device 112, which may occur directly and/or through the reading device 120. The communication sequence may comprise obtaining tagging device data from read only tagging devices such as bar codes, QR codes, and the like. When cryptographic tagging devices are used, the authentication protocol system 171 may assist the reading device 120 in performing a multi-message communication sequence between the reading device 120 and the tagging device 112. The communication sequence may comprise sending a series of challenge-response requests used to authenticate the tagging device 112 and optionally the authentication system 170. The communication sequence may rely on the cryptographic keys stored in the authentication system 170 and/or the key server 190. In an embodiment, the authentication process may comprise a mutual authentication between the authentication system 170 and the tagging device 112.

The registered user authentication system 173 may be used to store information related to registered users of the system 100, validate a registered user to the system, and create new registered user credentials. A registered user of the system 100 is a user that has performed a registration process to make the user known to the authentication system and receive access privileges to the authentication system. During the registration process, a user may supply identifying information and credentials (e.g., a user ID, password, email, challenge questions, etc.) for future log-in attempts or authentication attempts to the system.

In an embodiment, the registered users may have different levels of access to the functionality and data of the authentication system 170. For example, a registered user that has paid for access may have ownership privileges that allow the user to register as the owner of any number of items. Registered user that has not paid for such premium access may have a limited number of items for which that user may be the registered owner. Once ownership is established in the maximum number of allowable items, ownership privileges may be revoked until such time as the user either pays for premium access or releases ownership of one or more items.

Upon performing an authentication of the tagging device 112 and/or the user, an authentication attempt log 172 may be updated with the relevant information and data collected during the transaction. For example, the authentication of the tagging device 112 may generate or supplement a log of the tagging device UID, item data, key identifier, time of request, and the like. Similarly, the attempted authentication of a user may generate or supplement the authentication attempt log 172 data with the user ID, device performing the request, time of the request, and the like. The authentication attempt log 172 may be accessed by other components of the system such as the notification system 180 in performing various monitoring and fraud prevention checks.

The tagging device creation system 174 may be used to generate a tagging device for the item 111, which may occur at the time of commissioning a tagging device 112 associated with the item 111 or at a later date to verify authentication of the item 111 at a particular time. For the commissioning of a tagging device 112, the tagging device creation system 174 may generate the information associated with the tagging device such as the UID, optionally any known item data, a cryptographic key, a digital signature, and the commissioning time stamp. The data may be stored in the authentication system 170 for use in validating the tagging device 112. As described below, the tagging device may then be coupled to the item 111, at which point additional data may be provided to the tagging device 112. The information may be communicated back to the tagging device creation system 174, which may store the additional information.

The tagging device creation system 174 may also receive a request to create a new tagging device for the item 111 after the creation of the first tagging device 112. The new tagging device can be used to verify the authenticity of the tagging device 112 and/or the item 111 at the time that the second tagging device is created. The tagging device creation system 174 may receive authentication information for the tagging device 112 and verify the authenticity of the tagging device 112 and/or data based on the authentication information. The tagging device creation system 174 may then provide a new tagging device containing at least a portion of the information from the original tagging device as well as a digital signature that covers some or all of the original information. Alternatively, the new tagging device may contain no portion of the original information retrieved from the authenticated tagging device. A time stamp representing the time of the creation of the second tagging device may also be included in the second tagging device. The digital signature and the second time stamp may be used to authenticate the item 111 as well as authenticating its possession at the time of creation of the second tagging device.

The certificate generation system 175 may allow a registered user to generate a second tagging device and/or a certificate of authenticity for the item once the item is authenticated. The certificate generation system 175 may obtain data from the remaining systems and may be invoked when the authentication process indicates that an item is authentic. The certificate of authenticity may allow a user to validate the authenticity of an item, for example during a sale. The certificate of authenticity may include various item data, ownership data, the authentication time, and any other details used in the authentication process (e.g., as shown in the exemplary certificate of authenticity shown in FIG. 14 and discussed in more detail herein).

The notification system 180 is configured to generate one or more notification messages to one or more users or third parties. The notifications may comprise routine notification messages to users of the system or responses to authentication requests. The notifications may also comprise marketing or product information that can be sent to one or more third parties such as a manufacturer of the item, thereby providing feedback on the secondary market transaction of the item 111. The notifications may also be in the form of one or more alerts.

In an embodiment, the notification system 180 may comprise one or more of an owner notification system 181, a third party notification system 182, and an alert notification system 183. The owner notification system 181 may respond to actions within the system 100 such as an authentication request passing to the authentication system 170. The owner notification system 181 may be configured to generate a notification that is sent to an owner when a claim of ownership to the item is made, when a release of ownership request is made, when a change of ownership request is made, when an authentication request is made, or upon any number of additional events. The owner notification system 181 may also store an owner possession status to allow an owner to report an item as being lost or stolen. Any subsequent action involving the item 111 may then result in an owner notification of the action along with the information associated with the action such as the user ID associated with the request, the item information, the time of the request, the device sending the request, and the like.

The third party notification system 182 may be configured to send notifications of the various transactions (e.g., authentications, ownership change requests, etc.) to a third party. It can be difficult for manufacturers and other third parties to track the resale of their products. The present system allows the resale of a general type of product as well as specific products to be tracked. The information may be useful to various third parties such as manufacturers, trade associations, advertising providers, marking firms, and the like for marketing research. The third party notification system 182 may provide aggregated data and/or data on individual transactions and items to a third party. The third party notification system 182 may automatically generate the notices once the third party data is registered with the system.

The alert notification system 183 may be configured to provide one or more alerts to an owner, a user, and/or a third party. The alerts may be generated based on various fraud and/or theft prevention indications. For example, when an ownership transfer request is received from an unauthorized user or a user not in possession of the item, an alert may be sent to the present owner of the item. When an item authentication request fails, which may indicate that the item has been counterfeited, an alert message may be sent to the user requesting the authentication as well as the item owner, a third party (e.g., the manufacturer), and/or other authorized body, such as the police. When multiple item authentication requests arrive for a particular item, and those requests have specific characteristics, such as arriving within minutes of one another from disparate geographic locations that indicate the existence of two of the same item, an alert message may be sent to the users requesting the authentication as well as the item owner and/or the manufacturer or other authorized body. The alert notification system 183 may also generate alert messages to the owner of the system 100, or any other suitable person.

The alert notification system 183 may receive various data from the other systems to generate alert messages indicating the potential for fraud in a transaction, ownership request, or other action of the system. In an embodiment, the alert notification system 183 may take an action based on the data associated with the tagging device 112 and/or item 111, a positioning input, a visual input, or the like. With respect to the data associated with the tagging device 112 and/or the item 111, the alert notification system 183 may generate an alert message when the data within the tagging device 112 and/or the associated item 111 does not match the data or information recorded for the tagging device 112 and/or item 111. For example, when the digital signature comprising a signed hash inclusive of the data in the tagging item does not match the data contained in the tagging device 112, the alert notification system 183 may generate a message indicating that the data within the tagging device 112 may have been altered or otherwise manipulated. Similarly, when any of the data associated with the tagging device 112 and/or item 111 does not match the information stored in the item information system 150, the ownership registration system 160, the authentication system 170, and/or the notification system 180 records, an alert may be generated to indicate that a potential fraud has occurred. For example, when the tagging device 112 comprises the correct information, but a serial number associated with the item does not match the serial number stored in the item information system 150, an alert message may be generated indicating that the tagging device 112 may have been placed on a different item than the one it was originally associated with.

The alert notification system 183 may also be configured to generate an alert message based on a positioning input. A positioning input may be generated by the tagging device itself when the tagging device 112 comprises a positioning sensor, and/or a positioning input may be provided by one or more reading devices 120 at the time it obtains data or communicates with the tagging device 112. Various location determination techniques and technologies may be included in the reading device 120. For example, the location determination can be based on a global positioning system (GPS) sensor within the reading device 120. In another embodiment, the location of the reading device 120 may be determined based on an available Worldwide Interoperability for Microwave Access (WiMAX) access point, an available WiFi access point, an available femtocell access point; or other available wireless access points regardless of whether the reading device 120 is actually connected to the available wireless access point. For example, the reading device 120 may receive a broadcast signal from a wireless access point that contains an identifier for the subject access point. In this case, the indication of current location may comprise an identity of one access point, identities of a plurality of access points, or other information about what wireless access points are in range of the reading device 120. In an embodiment, the location of the reading device 120 may be determined based on triangulation of the strength of signals between a plurality of available wireless access points. In an embodiment, the location may be determined based on using combinations of different types of location determination methods. As such, the disclosed methods and systems are not limited to a particular method of determining the location of the reading device 120.

The alert notification system 183 may be configured to generate an alert message when the location input indicates that the reading device 120 is communicating with a given tagging device 112 that is at a different location greater than a threshold distance away from a previous location input within a threshold time limit. In general, the location input may be used to detect that communications with the tagging device are occurring at different locations that are beyond an expected travel speed of the tagging device. For example, when the alert notification system 183 determines that one or more reading devices 120 are communicating with one or more tagging devices having the same tagging device and/or item information in two different states within an hour of each other, the alert notification system 183 may determine that there is a likelihood that the tagging device has been copied or counterfeited. An alert notification can then be sent to the owner of the item, the operator of the reading device(s) communicating with the tagging device(s), and/or the operator of the system 100 to indicate the potential for the fraudulent activity.

The alert notification system 183 may also be configured to generate an alert message when the location input indicates that the item is located a certain distance away from a predefined location and/or when the reading device cannot communicate with the tagging device, which may indicate that the item has moved beyond a certain distance from the reading device. In an embodiment, the location input may be used to determine that the item remains within a certain geographic area. For example, the location input may be used to determine the location of the tagging device, and therefore the item. The alert notification system 183 may be configured to analyze the location input and determine whether the location input falls within a geographic area (e.g., a city, zip code, neighborhood, state, country, etc.), a predetermined radius of a predefined point, or the like. This type of analysis may allow the alert notification system 183 to establish a geofence alert that can notify an owner, a third party, or other person when the tagging device moves outside the predefined area. Such an alert may be used to indicate the unauthorized transport of the item outside of the geographic area.

In an embodiment, the alert notification system 183 may be configured to attempt to read the tagging device at one or more time periods. The time periods can be periodic, at predefined times, or set on a schedule based on signal strength. For example, the reading device may attempt to read or communicate with the tagging device once an hour, once a day, or the like. In some embodiments, the signal strength as measured by the reading device may affect the reading intervals or times. For example, as the signal strength drops, the reading device may attempt to read or communicate with the tagging device more often. One or more missed readings or communications may indicate that the tagging device and the item have moved beyond the range of the reading device. This type of determination may be used to indicate the unauthorized transport of the item outside of the geographic area or communication area or radius associated with the reading device.

The alert notification system 183 may also be configured to analyze various other inputs associated with the item such as a visual input to track the potential for fraud. For example, a picture of the item may be recorded at various points during the life of the item. For example, a picture, video, or other visual input can be obtained when the tagging device is commissioned, during one or more ownership transfer processes, or upon request. The visual inputs can be automatically analyzed to generate a probability that the item is the same item for which the previous visual input was provided, using for example a visual recognition system. In some embodiments, when the tagging device is subsequently read by the reading device, the visual input may be provided to the reading device 120 or another designated system to allow the user to compare the image with the item associated with the tagging device. When the system automatically detects a difference in the visual inputs taken at different times and/or when a user provides an indication that the visual input does not match the current item, the alert notification system 183 may be configured to generate an alert message indicating the discrepancy that can be sent to the owner of the item, the operator of the reading device(s) communicating with the tagging device(s), a third party involved with identifying and addressing potential counterfeit items, and/or the operator of the system 100.

In an embodiment, the system 100 may be in communication with an ad server 191 directly or through the network 195. Various components of the system 100 may be configured to communicate with the ad server to supply data to the ad server and/or retrieve an advertisement from the ad server 191. The ad server 191 may be owned or operated by the operator of the system 100 or any other third party. In an embodiment, the ad server 191 may represent one or more servers used for advertisement and/or marketing purposes. In some embodiments, the ad server 191 may include a coupon server to provide coupons or other marketing materials in addition to any, or in place of, advertisements.

Initially, the system 100 may be configured to supply data to the ad server 191. The data may include any of the data stored in the system 100 such as the data obtained and stored by the authentication system 140. In some embodiments, the data may include records of transactions involving one or more tagging devices, ownership records indicating current ownership of the items, user information such as demographic data, and/or item information such as location, condition, etc. The data provided to the system may allow the advertisement server 191 to develop profiles and/or demographic data correlating the types of items owned by types of owners. Authentication requests and ownership transfers may further indicate the types of users shopping for certain items. The location data may be useful in developing regional profiles of users and items. Finally, individual ownership information can be supplied to the ad server 191.

The ad server 191 may be configured to supply ads to the system 100, for example to the reading device 120 or any other device associated with an item, an owner of an item, a registered user, or the like. The ads may be tailored for a user or owner of an item. For example, demographic data supplied to the ad server 191 may be used to supply an ad targeted to the demographic profile of the user. One or more ads may also be selected based on the current ownership records within the system. Thus, an owner may receive ads for new products that are the same or similar to those owned, or that compliment those already owned. For example, if the ownership records indicate that a user owns a golf club, the ad server 191 may provide ads for golf balls, shoes, golf courses, new clubs, golf lessons, etc. The ad server 191 may also be configured to supply ads based on authentication requests. In general, a user performing an authentication request may be interested in purchasing the item, and the authentication request may be used to verify the authenticity of the item prior to completing the purchase. The ad server 191 may be configured to supply an ad for the same item that is being authenticated, associated items, or other ads targeted to the demographic of the average user who purchases the item. For example, a user authenticating a golf club may be sent an ad for a store selling the same type of new golf clubs to compete with the potential purchase of a used item. In some embodiments, a user's location may be used by the ad server 191 to provide ads directed to regional items, items available in a close proximity, or the like. Various ads and types of targeting can be utilized based on the type of data available to the ad server 191 from the system 100.

In an embodiment, a single tagging device 112 may be used to authenticate an item 111. In some embodiments, a plurality of tagging devices can be associated with an item 111 and used to verify or authenticate the item 111 during an authentication process. For example, a plurality of tagging devices may be coupled to the item 111, and the authentication of the item 111 may involve reading or communicating with two or more of the tagging devices affixed to or coupled to the item 111. The plurality of tagging devices can be independent of one another, loosely coupled, or tightly coupled. When the plurality of tagging devices are independent of one another, each tagging device may comprise its own information and not refer to or contain any information for any other tagging device. The tagging device may be authenticated on its own without the need to read or communicate with any other tagging device. In this embodiment, each tagging device of the plurality of tagging devices may be capable of independently verifying or authenticating the item 111.

Figure 3A:
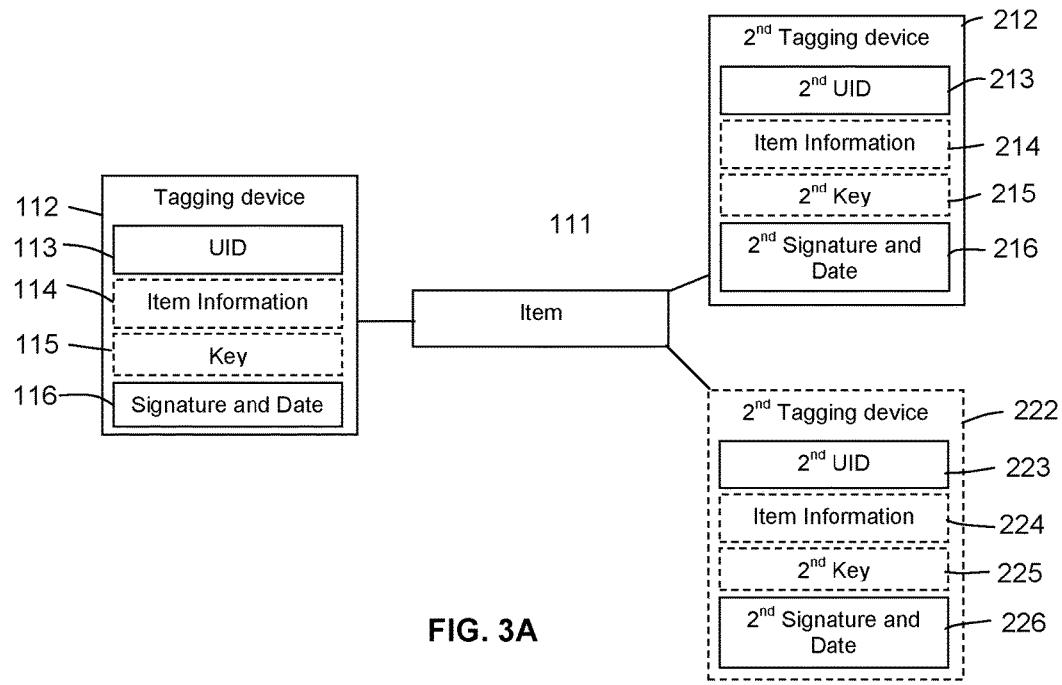
FIGS. 3A and 3B are schematic illustrations of a plurality of tagging devices associated with an item in accordance with exemplary embodiments.

As shown in FIG. 3A, a plurality of tagging devices 112, 212, 222 may be associated with an item 111, and the plurality of tagging devices 112, 212, 222 may be loosely coupled. The use of loosely coupled tagging devices refers to the use of one or more primary tagging devices and one or more secondary tagging devices, where the secondary tagging devices are associated with the primary tagging devices but not necessarily with each other. When the tagging devices 112, 212, 222 are loosely coupled, a first tagging device 112 may be affixed to or coupled to the item 111. The first tagging device 112 may include any of those tagging devices described above. For example, the first tagging device 112 may comprise a QR code or an NFC tag. The tagging device 112 may include any of the information or data described above. For example, the first tagging device 112 may have a first UID 113, and may have additional data such as item information 114, one or more cryptographic keys 115, and/or a certificate date and a certificate 116 over the first tagging device 112 information and/or optionally over the additional data. A secondary tagging device 212 may be coupled or affixed to the same item 111 as the first tagging device 112. The secondary tagging device 212 may include any of those tagging devices described above. For example, the secondary tagging device 212 may comprise a QR code or an NFC tag. The secondary tagging device 212 may include any of the information or data described above. For example, the secondary tagging device 212 may have a second UID 213, a second certificate date and a second certificate 216, a second cryptographic key 215, and possibly other second data 214 that may or may not be the same in whole or in part as the data 114, if any, encoded in the first tagging device 112. The second certificate 216 may be provided over the second UID 213, the second certificate date, any second data 214, the first UID 113, and possibly other item data or other data associated with the first tagging device 112. While the certificate may be provided over the first UID 113, the secondary tagging device 212 may not store the first UID 113.

When used in an authentication or verification process, the first tagging device 112 may be used for item authentication without the need to communicate with the secondary tagging device 212. When an authentication or verification process is performed using the secondary tagging device 212, the secondary tagging device 212 may require at least the first UID 113 be obtained from the first tagging device 112 in order for the second certificate 216 to be authenticated.

The system comprising loosely coupled tagging devices may be extended with a plurality of first tagging devices 112 being associated with one secondary tagging device 212 in this way. Further, a plurality of secondary tagging devices 212, 222 may be associated with an item 111. For example, an additional secondary tagging device 222 may comprise the same or similar information as the secondary tagging device 212, which may include a second UID 223, a second certificate date and a second certificate 226, a second cryptographic key 225, and possibly other second data 224 that may or may not be the same in whole or in part as the data 114, if any, encoded in the first tagging device 112. Each pair of the first tagging device 112 and a secondary tagging device 212, 222 (e.g., a first pair comprising the first tagging device 112 and the secondary tagging device 212, a second pair comprising the first tagging device 112 and the additional secondary tagging device 222, etc.) may not intersect or overlap with any of the other pairs of the first tagging device 112 and secondary tagging device. This may allow any secondary tagging device of a potential plurality of secondary tagging devices 212, 222 to be authenticated or verified by reading the first tagging device 112 along with the chosen secondary tagging device. In some embodiments, any pair of the first tagging device 112 coupled to a secondary tagging device 212 may intersect either partially or completely with any other pair of the first tagging device 112 coupled to another secondary tagging device 222.

Figure 3B:
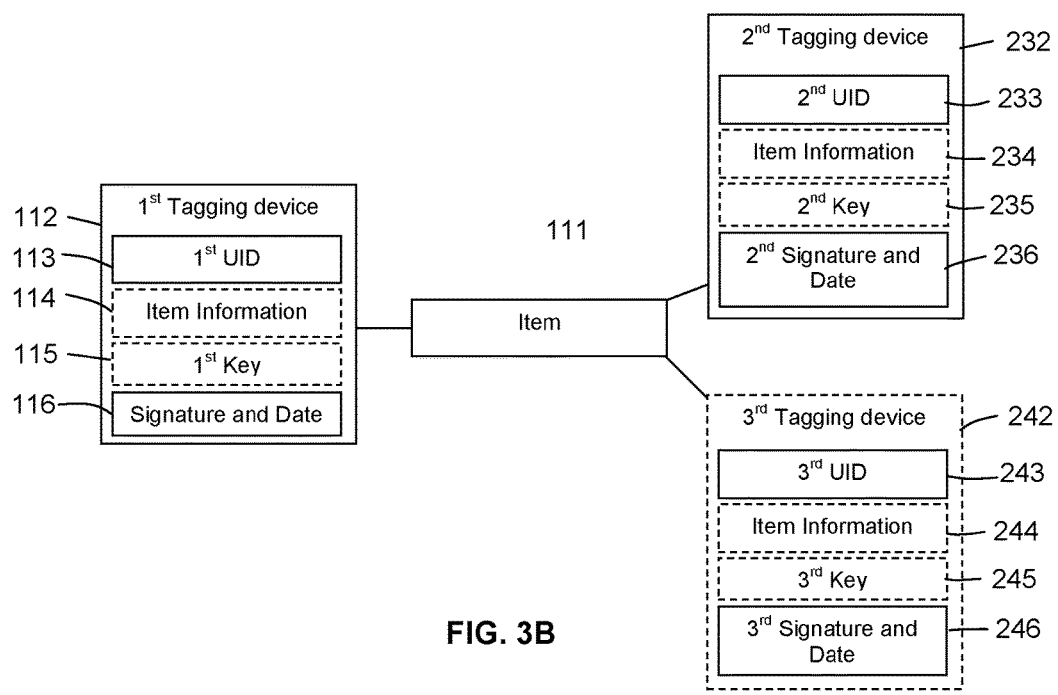

As shown in FIG. 3B, a plurality of tagging devices 112, 232 may be associated with an item 111, and the plurality of tagging devices 112, 232 may be tightly coupled. The use of tightly coupled tagging devices refers to the use of a plurality of tagging devices that are associated with each other and, optionally, one or more additional tagging devices. When the tagging devices 112, 232 are tightly coupled, a first tagging device 112 may be affixed to or coupled to the item 111. The first tagging device 112 may include any of those tagging devices described above. The first tagging device 112 may have a first UID 113, and may have additional data such as item information 114, one or more first cryptographic keys 115, and/or a first certificate date and a first certificate 116. The first certificate 116 may be provided over the data associated with the first tagging device 112 such as the first UID 113, certificate date, and optionally other information associated with the first tagging device 112 such as the item information 114 and one or more cryptographic keys 115. The certificate 116 may also be provided over the second UID 233 and possibly other data associated with a second tagging device 232. In an embodiment, signature 116 or certificate may be included over the second UID 233 even though the second UID 233 is not stored in the first tagging device 112. In some embodiments, the certificate or signature 116 may also be over data contained in the third tagging device 242 such as the third UID 243 or other data contained in the third tagging device 242.

The second tagging device 232 may be linked to the first tagging device 112 by including a signature or certificate over data from the first tagging device 112. In an embodiment, a second tagging device 232 may be coupled or affixed to the same item 111 as the first tagging device 112, though in some embodiments, the second tagging device 232 may be coupled or affixed to a different part or portion of the item 111. The second tagging device 232 may include any of those tagging devices described above, and the second tagging device 232 may include any of the information or data described above. In an embodiment, the second tagging device 232 may have a second UID 233, a second certificate date and a second certificate 236, a second cryptographic key 235, and possibly other second data 234 that may or may not be the same in whole or in part as the data 114, if any, encoded in the first tagging device 112. The second certificate 236 may be provided over the second UID 233, the second certificate date, any second data 234, along with the first UID 113 and possibly other item data or other data associated with the first tagging device 112. While the certificate may be provided over the first UID 113, the second tagging device 212 may not store the first UID 113.

When used in an authentication or verification process, the first tagging device 112 may be used for item authentication along with the secondary tagging device 232. The information, or at least a portion thereof, in each tagging device 112, 232 may be read or obtained by the reading device, and an authentication or verification process may be performed using the information from both tagging devices 112, 232. For example, each tagging device 112, 232 may be read to obtain both the first UID 113 and the second UID 233. The certificates or signatures for each tagging device can then be verified based at least in part on the information obtained from the other tagging device.

The system comprising tightly coupled tagging devices may be extended to three or more tagging devices 112, 232, 242. The plurality of tagging devices can be related and include information from all of the other tagging devices within a signature or certificate. Each tagging device that is related can then be read during the verification or authentication process. For example, an optional third tagging device 242 may include a third UID 243, a third certificate date and a third certificate 246, a third cryptographic key 245, and possibly other data 244 that may or may not be the same in whole or in part as the data 114 from the first tagging device 112 and/or the data 234 from the second tagging device 232. The third signature 246 of the third tagging device 242 may be provided over data comprising the first UID 113, the second UID 233, and the third UID 243. As a result, each tagging device 112, 232, 242 may be read in order to authenticate or verify any one of the tagging devices 112, 232, 242.

Figure 4:
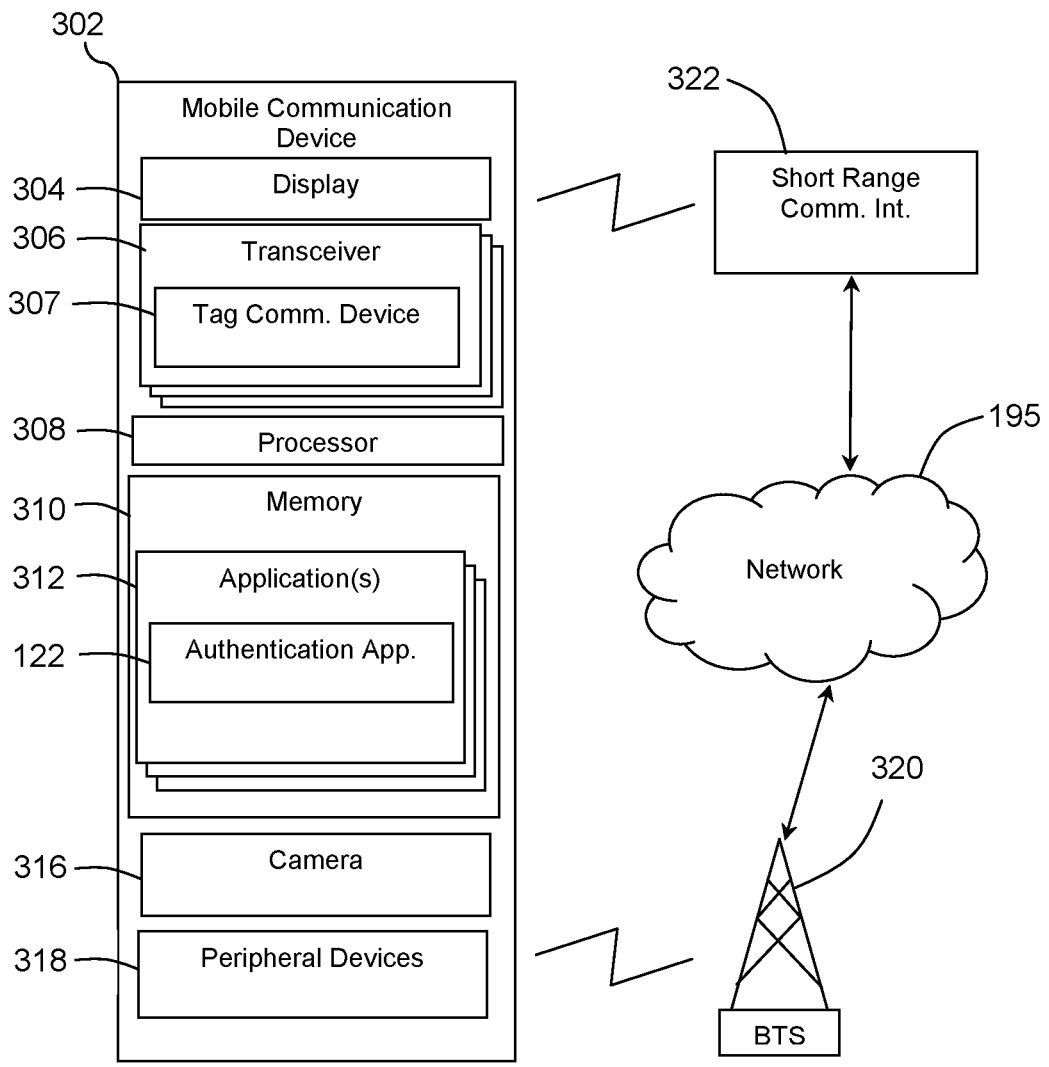
FIG. 4 is a schematic illustration of a system of a reading device according to an exemplary embodiment.

The reading device 120 of FIG. 1 may form a portion of the authentication system 170 and/or the authentication system 171. For example, the reading device 120 may execute an authentication application 122 configured to operate to obtain tagging device 112 data, communicate the data to the authentication system 170, and potentially mediate the authentication of the tagging device 112. As shown in FIG. 4, a reading device 120 may comprise a mobile device 302. The mobile device 302 may comprise a display 304, a radio transceiver 306, a processor 308, a memory 310, an optional camera 316, and one or more optional peripheral devices 318. The memory 310 of the mobile device 302 may further comprise a plurality of applications 312 including an authentication application 122. The radio transceiver 306 may comprise a tag communication device 307. In an embodiment the mobile device 302 may include, but is not limited to, a mobile phone, a laptop computer, a notebook computer, a tablet computer, a personal digital assistant, or a media player. In an embodiment, the mobile device 302 may be implemented as a handset.

The authentication application 122 may be stored in the memory 310 and execute on the processor 308. When executed on the processor 308, the authentication application 122 may configure the processor 308 to communicate with the tagging device and/or the authentication system using the radio transceiver 306 or the tag communication device 307. In an embodiment, the authentication application 122 may configure the processor 308 to communicate with the tagging device and obtain at least a portion of the tagging device data. When the tagging device comprises a visually readable tagging device such as a linear bar code, a QR code, or the like, the authentication application 122 may interact with the camera 316 or other peripheral device to obtain an image of the tagging device. The authentication application 122 may then be configured to decode, decrypt, or otherwise obtain the information from the tagging device image. In some embodiments, the authentication application 122 may act as an information portal for the authentication system and send the image of the tagging device back to the authentication system for decoding at an authentication system server.

In an embodiment, the tagging device may comprise a wirelessly enabled communication device such as an RFID tag, an NFC tag, or the like. The authentication application 122 may interact with the radio transceiver 306 and/or a specialized tag communication device 307 to communicate wirelessly with the tagging device. The authentication application 122 may then be configured to decode, decrypt, or otherwise obtain the information from the tagging device image. The authentication application 122 may be configured to execute a series of communications according to a communication protocol with or without the aid of the authentication system in order to obtain the tagging device data from the tagging device. This process may be referred to as mediating the communications with the tagging device in some contexts. In some embodiments, the authentication application 122 may act as an information portal for the authentication system and route communications and messages to and from the authentication system for communicating with the tagging device to obtain the tagging device data.

In an embodiment, the authentication application 122 may also be configured to execute on the processor 308 to perform an authentication or verification process for the tagging device. In addition to mediating the communications with the tagging device, the authentication application 122 may serve to compare one or more communications, responses, data, or other indicators to determine when the tagging device is verified or authenticated. For example, the authentication application 122 may receive an expected response from the authentication system and compare that response with a response received from a tagging device resulting from a challenge. The authentication application 122 can then compare the two responses to see if the responses correspond, and the authentication application 122 can generate the verification of the tagging device based on the results of the comparison. The communication protocols and authentication process that may be carried out by the authentication application 122 are described in more detail herein.

The system 100 may further comprise a base transceiver station ("BTS") 320, a short range communication interface 322, and a network 195. The network 195 may be communicatively coupled to the BTS 320 and/or the short range communication interface 322. In an embodiment, the base transceiver station 320 may provide a wireless communication link to the mobile device 302 and communicatively couple it to the network 195. In an embodiment, the base transceiver station 320 may provide a wireless communication link to the mobile communication device 302 according to one of a CDMA wireless protocol, a GSM wireless protocol, an LTE wireless protocol, a WiMAX wireless protocol, or another wireless communication protocol. Similarly, the short range communication interface 322 may provide a wired or wireless communication link to the mobile device 302 and communicatively couple it to the network 195. The short range communication interface 322 may communicate with the mobile device 302 using various wireless communication protocols such as WiFi and Bluetooth, and/or various wired communication protocols. While one base transceiver station 320 and one short range communication interface 322 are illustrated in FIG. 4, it is understood that the system may comprise any number of mobile devices 302, any number of base transceiver stations 320, and any number of short range communication interface 322.

In order to utilize the system 100, the tagging device can be created and coupled or affixed to the item. The tagging device is generally created or commissioned at or near the time it is coupled or affixed to the item to allow the item to be tracked as it enters a stream of commerce. Various commissioning processes can be used to generate the tagging device and the data/information associated with the tagging device, which can comprise any of the information described herein.

Figure 5:
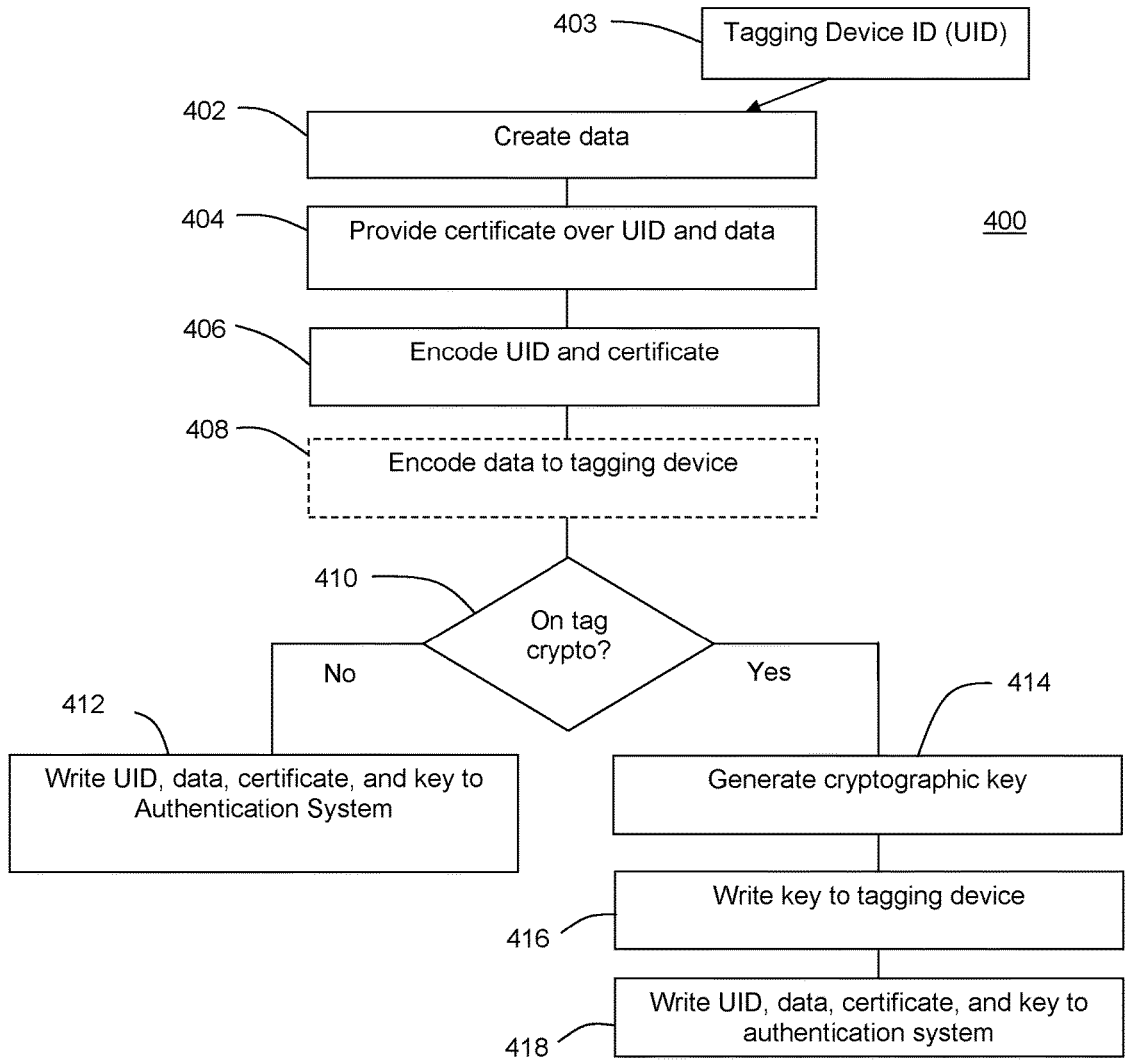
FIG. 5 is a flowchart of a method for providing tag commissioning in accordance with an exemplary embodiment.

FIG. 5 is a flowchart of a process 400 for commissioning a tagging device. In operation, the system 100 allows one or more items to be tagged, tracked, and an ownership history to be developed. The commissioning process 400 begins with the creation of the data for the tagging device at step 402. The tagging device can include any of those tagging devices described above (e.g., any of the tagging devices 112 described with respect to FIG. 1 and FIG. 2), and the data may include any of the data described above and may vary depending on the type of tagging device selected. The tagging device data may comprise at least a unique ID (UID) 403 individually identifying the tagging device. Additional data may include item data such as a manufacturer or serial number.

At step 404, a digital signature may be signed over the UID 403 and a time stamp representing the time of the commissioning of the tagging device may be generated. Tagging devices such as QR codes, linear bar codes, and RFID tags with sufficient writable memory may have a cryptographically generated signature, for example obtained with a public key cipher like RSA, a keyed hash function, or a hash function, written to the device or as the data encoded by the encoding mechanism of the device (such as the black and white lines in a linear bar code). The amount of data and complexity of the digital signature may depend on the type of tagging device being commissioned as well as the writable memory available in the tagging device.

At step 406, the UID and certificate for the chosen tag may optionally be encoded. The amount and type of encoding may also depend on the type of tagging device being commissioned as well as the writable memory available in the tagging device. The UID and certificate can then be written to the tagging device. As noted below, the UID, certificate, and/or the time stamp may be written to the authentication system at this point, or at any point before step 418.

At step 408, the additional data, including the date, can be optionally written or encoded on the tagging device. For a bar code or QR code, the code may be printed on a label, directly on the item, and/or provided on a tamper resistant packaging. For more complex tagging devices such as RFID tags, NFC enabled tags, Bluetooth devices, and the like, the information may be transmitted or otherwise stored in the tagging device.

At step 410, it is determined whether a cryptographic functionality is to be included on the tagging device. This determination may be based in part on the type of tagging device selected as only some types of tagging devices support cryptographic functionality. When it is determined that no cryptographic functionality is to be included on the tagging device, the tagging device UID, data, key or key pair used to generate the certificate, and the certificate may be transmitted to the authentication system 170 and stored for future use in step 412.

When it is determined at step 410 that cryptographic functionality is to be included on the tagging device, a secret key or key pair may be generated at step 414. RFID tags, including NFC tags that contain cryptographic functionality, may have one or more secret keys or key pairs written into the tagging device during the commissioning process. The keys may be written to the tagging device at step 416. At step 418, the tagging device UID, data, certificate, and keys may be transmitted to the authentication system 170 and stored for future use. For security purposes, the secret key may be commissioned to the key server 190 rather than the authentication server 170. The key server 190 may then maintain the secret key for use with verification requests. The authentication system 170 and key server 190 may store the cryptographic keys used during the commissioning process 400 and associate the keys to the data contained within the tagging devices commissioned with them. The authentication system 170 stores information such as the tagging device identifier (UID), the item identifier, or other item or tagging device information that is associated with a tagging device. For tagging devices that do not have data storage or data encoding capabilities, such as RFID tags that can store only an identifier, a cryptographic key may not be stored in the authentication server associated with that tagging device.

In some embodiments, the commissioning process 400 may be carried out in a different order or series of steps to accomplish the same or similar result. For example, steps 410, 414, and 416 may be performed after the UID is generated and before the item data is created at step 402. Thus, the process 400 may be carried out in any order that generates and encodes the information to the tagging device and reports the information to the authentication system for use in subsequent authentication processes.

When multiple tagging devices are associated with a single device, the commissioning process of each tag may occur sequentially or in parallel. In an embodiment in which the tagging devices are independent of each other, the commissioning process may proceed sequentially. Each tag may be independently created and the information may be stored in the authentication system 170. Subsequently, each tag may be independently verified using the authentication system 170.

In an embodiment in which the tagging devices are loosely coupled, a first tagging device may be commissioned, and the data used to create the first tagging device may be saved and used to create one or more secondary tagging devices. For example, a first tagging device may be created and the UID of the first tagging device may be saved in the commissioning system. When one or more secondary tagging devices are created, the UID from the first tagging device may be used during the signing process to create the signature or certificate over the data in the secondary tagging device. This process may link one or more secondary tagging devices to the first tagging device.

In an embodiment in which the tagging devices are tightly coupled, the plurality of tagging devices may be created in parallel. The UID of each tagging device may be created along with any additional data for each tagging device. One or more UID for tightly coupled tagging devices may then be used during the signing process to create the signatures or certificates over the data in each tagging device. This process may link the one or more tagging devices.

The commissioning process 400 may be carried out by the owner of the system 100 or another entity (e.g., the manufacturer of the item 111), and the commissioning may occur before, after, or partially before and partially after the tagging device 112 is affixed to the item 111. Commissioned tagging devices may have generic information encoded within them, no information encoded within them, or item specific information encoded within them. The tagging device 112 may be partially commissioned prior to being affixed to an item 111, for example by having a secret key written into the tagging device 112 with the secret key and the identity of the tagging device 112 (e.g., the UID) being stored in the authentication system 170. The commissioning may then be completed after the tagging device 112 is coupled to a specific item 111, for example by writing item specific data such as the item identifier into the memory of the tagging device 112.

After the commissioning process, the tagging device may be coupled, attached, affixed, or otherwise associated with the item. The tagged item may enter circulation either as an item owned by an individual or as an item moving through a supply chain or both. The owner, a prospective purchaser, or both may desire to authenticate the item to ensure that it is authentic at any number of times. For example, the owner may wish to authenticate the item to verify that the item has not been tampered with or exchanged for a different item of the same type. Further, the owner, the prospective purchaser, or both may wish to authenticate the item when the item is to be transferred from one owner to the potential purchaser. One or both of the parties may initiate the authentication process. In general, the authentication process may involve one or more communications with the authentication system 170 to verify the information in the tagging device. The information can be automatically obtained by a reading device 120 and/or the information can be manually entered. The resulting authentication may provide a reasonable likelihood that the item associated with the tagging device at the time of commissioning and/or manufacturing is the same item having the same tagging device.

Figure 6:
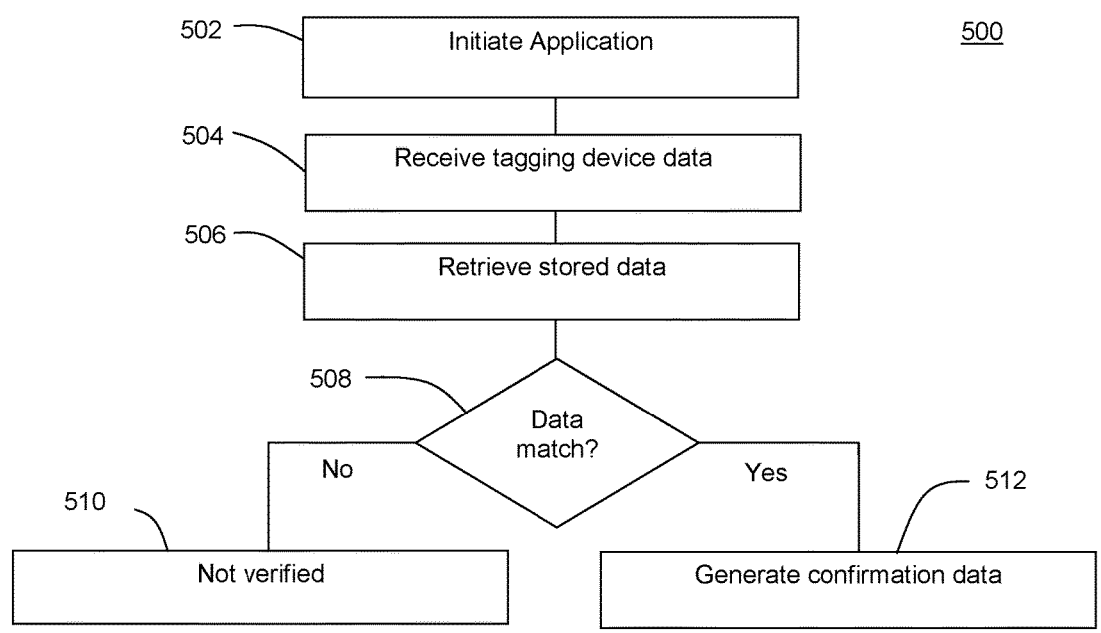
FIG. 6 is a flowchart of a method for authenticating a tagging device in accordance with an exemplary embodiment.

Various processes may be used to perform the authentication process. FIG. 6 illustrates a flowchart of a process 500 for authenticating a tagging device. When a person chooses to authenticate the item, that person may begin the authentication process by executing an authentication application in step 502. In an embodiment, the authentication application comprises a computer program on a local computing device such as the reading device, which may comprise a mobile device capable of reading or communicating with the tagging device. In some embodiments, the authentication application may be part of the authentication system 170 and execute on the authentication system server. The information from the tagging device can be manually entered and transmitted to the authentication application on the authentication system 170 using, for example, a web portal or other input structure. In either event, the authentication application may provide the functionality for the authentication system 170 to verify that the person has permission to authenticate the item. For example, the authentication application may receive user credentials to verify the identity and rights of the user requesting the authentication of the item.

At step 504, the tagging device data in the tagging device is retrieved. The tagging device data may include a tagging device ID (e.g., the UID), authentication information, item data, and/or any other data stored in the tagging device. The authentication application may communicate with the reading device and allow it to obtain the data encoded within the tagging device. For tagging devices with cryptographic functionality, the authentication application may begin a communication sequence to allow for authentication of the tagging device, and therefore the item. If tagging device data plus a certificate is retrieved from the tagging device, the authentication application may communicate with the authentication server in order to authenticate the data protected by the certificate.

At step 506, the data stored within the authentication system may be retrieved for use with the authentication application. The data stored in the authentication system application may comprise tagging device data, item data, digital certificates, cryptographic keys, and the like. The data may be stored in the authentication system at the time of commissioning the tagging device, when the tagging device is coupled to the item, and/or at a later time (e.g., when the item having the tagging device is first sold by the manufacturer, etc.). The stored tagging device data may be obtained from the authentication system and/or a component in communication with the authentication system. For example, a cryptographic key may be obtained from the key server for use in authenticating the tagging device.

At step 508, the tagging device data can be correlated with the information retrieved from the authentication system. Correlating the information can include a comparison performed by one or more components of the authentication system, the authentication application, and/or the reading device. Correlating the information can also include a direct comparison, an authentication process involving the information, any number of cryptographic authentications, or the like. The use of the term "correlate" should not limit the verification or authentication to a direct comparison between the information.

When the information obtained from the tagging device does not correlate to the information stored in the authentication system, the tagging device may not be authenticated. In this event, the process 500 may proceed to step 510 where a message may be generated by the authentication application indicating that the tagging device, and thereby the item, is not verified. The message may include additional information about the tagging device or the item that was obtained from either the tagging device or the authentication server or some other server. For example, the message may comprise item information such as a model number or serial number associated with the tagging device, which may not match that of the item when the item is not verified.

When the information obtained from the tagging device correlates with the information stored in the authentication system, the tagging device may be authenticated. The process 500 may then proceed to step 512 where a verification message may be generated indicating that the tagging device is verified, thereby verifying the item associated with the tagging device. The message may include additional information about the tagging device or the item that was obtained from the tagging device, the authentication server, and/or some other server.

The authentication server may record and store the data associated with an item authenticity request. This data may include, but is not limited to, the time and date, user information, data associated with the authentication request, network information associated with the request, location data, and/or information associated with the authentication application that performed the authenticity request. The information may be stored whether or not the tagging device is verified as being authenticated. In some embodiments, some or all of the information related to the authentication request can be supplied to an ad server 191.

In an embodiment, one or more ads may be supplied to a user, for example over the reading device, in response to the authentication request. The ads may be based on the subject of the authentication request. For example, an ad server may be configured to provide ads based on the item authenticated in the authentication process or any item related to the item authenticated in the authentication process. In some embodiments, the ads may be based on one or more characteristics (e.g., demographics, location, etc.) of the user initiating the authentication request. Any of the types of ads or considerations for providing the ads described herein can be used to supply one or more ads to a user.

In some counterfeiting schemes, data and certificates may be read from one tagging device and written to another tagging device to copy or counterfeit the tagging device. For example, a first QR code may be read by one reading device and then a second QR code encoding the same information just read from the first QR code may be printed on a label that is affixed to a different item. In order to mitigate the impact of this type of counterfeiting, complex tagging devices such as cryptographically enabled RFID tags may be used. The authentication application, through the reading device, may establish a communication channel with the complex tagging device. Through a sequence of communications with the authentication system and the tagging device where the authentication application acts as an intermediary between the two, the authentication application may determine the authenticity of the tagging device and therefore the item. The authentication application may inform the person initiating the authentication process of the authenticity of the tagging device and possibly additional information about the tagging device or the item that was obtained from either the tagging device or the authentication server or some other server.

Figure 7:
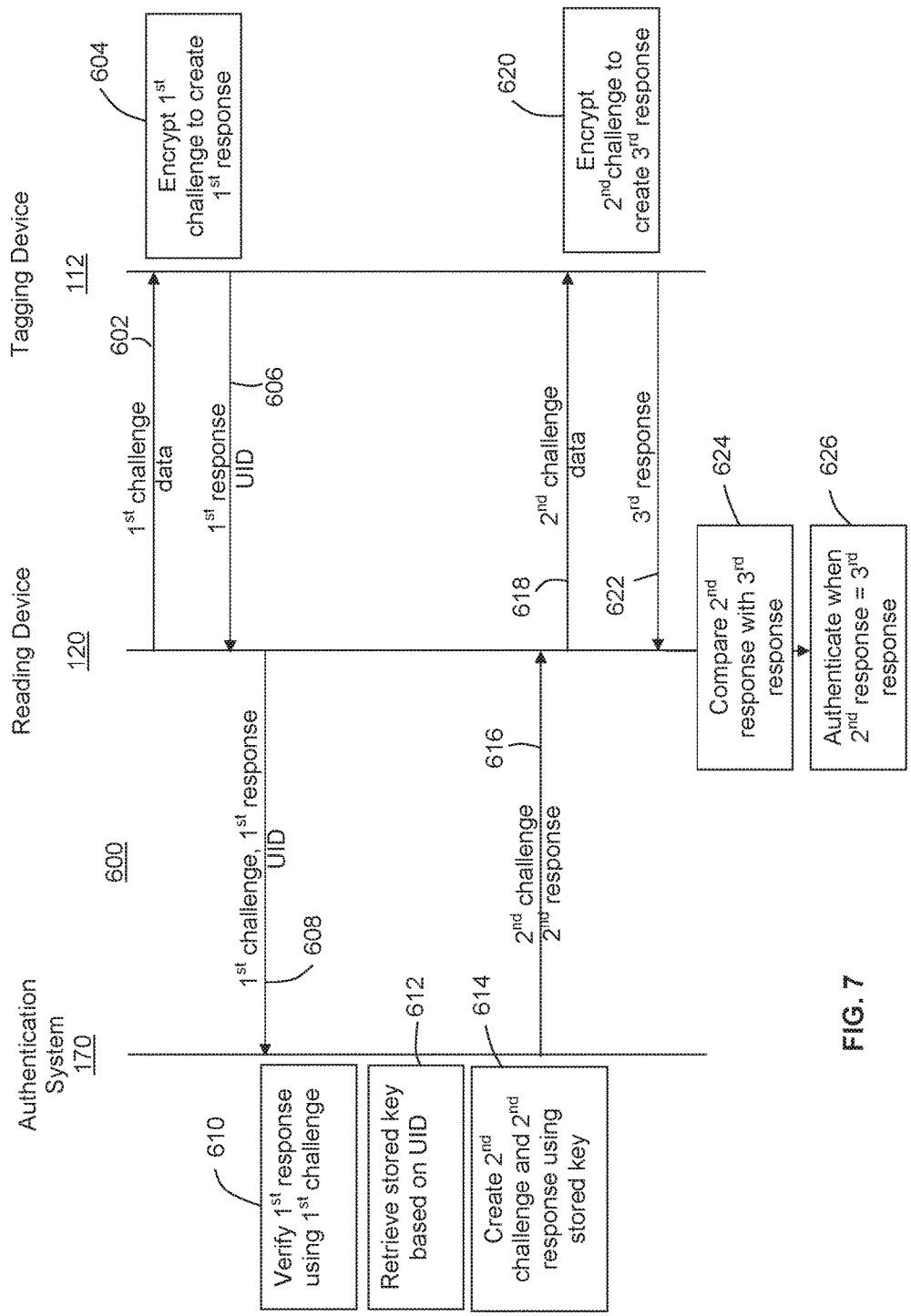
FIG. 7 is a messaging diagram illustrating another method for authenticating a tagging device in accordance with an exemplary embodiment.

FIG. 7 illustrates a messaging diagram 600 of a process for authenticating a cryptographically enabled tagging device. The process 600 may begin at step 602 with the reading device 120 sending a first challenge message to the tagging device 112. The first challenge message may be created and sent by an authentication application executing on the reading device 120. One or more messages or communications may be sent between the reading device 120 and the tagging device 112 prior to the reading device 120 sending the first challenge message 602 in order to establish communications between the tagging device 112 and the reading device 120. The first challenge message may comprise challenge data as part of the authentication process.

At step 604, the tagging device may encrypt the challenge data in the challenge message. In an embodiment, the tagging device 112 may use a private key stored in the tagging device to encrypt the challenge data. In some embodiments, the tagging device 112 may use a private key to sign the challenge data. The tagging device 112 may then send the encrypted challenge data as a first response back to the reading device 120 in step 606. The tagging device 112 may also send additional information in the first response such as the UID of the tagging device 112, item data, a digital signature, a signature date, and/or any additional information stored in the tagging device 112. At step 608, the reading device 120 may send the first challenge message and data, the first response message, and any of the additional information obtained from the tagging device 112 to the authentication system 170.

The information may be processed by the authentication system 170. At step 610, the authentication system 170 may receive the information from the reading device 120 and utilize the UID or other identifier from the tagging device 112 to locate the cryptographic key, such as the secret key and/or the public key, of the tagging device. In some embodiments, the cryptographic key may be stored in a secure server such as the key server. Upon locating the cryptographic key, the authentication server may verify the response received in the first response message. For example, the authentication server 170 may decrypt the first response using the public key associated with a private key on the tagging device. The authentication server 170 may then compare the decrypted first response message with the first challenge message. A match may indicate that the tagging device 112 is storing the appropriate cryptographic key. This may allow the authentication system 170 to verify the cryptographic key stored in the tagging device.

At step 612, the authentication server 170 may retrieve or locate a cryptographic key such as a secret key and/or a public key associated with the tagging device 112. The cryptographic key may be located in a key server in communication with the authentication system 170. At step 614, the authentication system 170 may create a second challenge message comprising second challenge data. The authentication server 170 may encrypt the second challenge data to create a second response message comprising the encrypted second challenge data. The second challenge message may be encrypted using the key retrieved in step 612. When a private key is used to sign the challenge data in step 604, the key retrieved in step 612 may be a public key, and the second challenge message may be encrypted using the public key. This information may then be sent to the reading device 120 from the authentication server 170 in step 616.

At step 618, the second challenge message comprising the second challenge data can be sent to the tagging device 112. The tagging device 112 can then encrypt the second challenge data in step 620. The second challenge data may be encrypted using the same key or a different key than the one used to encrypt the first challenge data. The resulting encryption process may generate a third response comprising the encrypted data. The tagging device 112 may then send the third response to the reading device 120.

Upon being received by the reading device 120, the third response may be compared to the second response generated by the authentication server 170 in step 624. The authentication application operating on the reading device 120 may perform the comparison of the second response and the third response. A match between the second response and the third response in step 626 may further verify the authenticity of the tagging device based on the information stored in the authentication system 170 or an associated server (e.g., the key server).

In some embodiments, the authentication process 600 can comprise different types of authentications of the tagging device 112. For example, the authentication system 170 may send a second challenge and a public key corresponding to the tagging device 112 in step 616. In some embodiments, the authentication system 170 may only send a public key of corresponding to the tagging device 112 in step 616, and the reading device 120 can generate the second challenge and corresponding data. The second challenge can then be send to the tagging device 112 as described above. The second challenge data may be encrypted using a private key stored in the tagging device 112 to generate the third response. Upon receiving the third response, the reading device 120 may decrypt the third response using the public key received from the authentication system. The reading device 120 may compare the decrypted third response to the second challenge, which may be received from the authentication system 170 or generated within the reading device 120 itself, as described above. A match would indicate that the tagging device 112 is verified.

In some embodiments, the authentication system 170 may send a second challenge and a public key corresponding to the tagging device 112 in step 616. The authentication system 170 may only send a public key of corresponding to the tagging device 112 in step 616, and the reading device 120 can generate the second challenge and corresponding data using the public key received from the authentication system 170. In this embodiment, the encrypted second challenge can then be send to the tagging device 112 where the encrypted second challenge can be decrypted using the private key stored on the tagging device 112. The decrypted challenge can be returned as the third response. The second challenge can then be compared to the third response by the reading device 120 as described above with respect to steps 624 and 626. A match would indicate that the tagging device 112 is verified.

The authentication server may catalogue the data associated with an item authenticity request(s). This data may include any of the data received by the authentication server 170 during the authentication process as well as information sent from the reading device 120 to the authentication system 170 upon performing the matching step 626, which may indicate that a match is found or not found.

The authentication process may also be used when multiple tagging devices are associated with the item. When multiple tagging devices are used that are independent of each other, each tagging device can be authenticated using the authentication processes described above. Each authentication process may individually authenticate the corresponding tagging device and the authentication process can be repeated any number of times to authenticate each tagging device. Individual authentication may be useful to authenticate an item having multiple tagging devices associated with different parts or portions. The use of individual tagging devices may allow each part or piece of the item to be authenticated. However, the use of individual tagging devices may not provide for an authentication of the item as a whole. For example, the individual authentication may indicate that each part is authentic, but not that the parts were not originally associated with each other in the item as they are at the time that the tagging devices are separately authenticated.

In an embodiment in which multiple, loosely coupled tagging devices are used, a first tagging device may be independent of any other tagging devices associated with an item. The first tagging device may be authenticated using the authentication processes described above. A second tagging device may comprise a signature or certificate provided over information contained within the first tagging device. For example, a signature or certificate in the second tagging device may be provided over the UID of the first tagging device. This may require that both the first and second tagging devices be read in order to authenticate the second tagging device. The loosely coupled tagging devices may allow for distinct parts of an item to be individually authenticated, and the authenticity and originality of the entire item to be authenticated.

Figure 8:
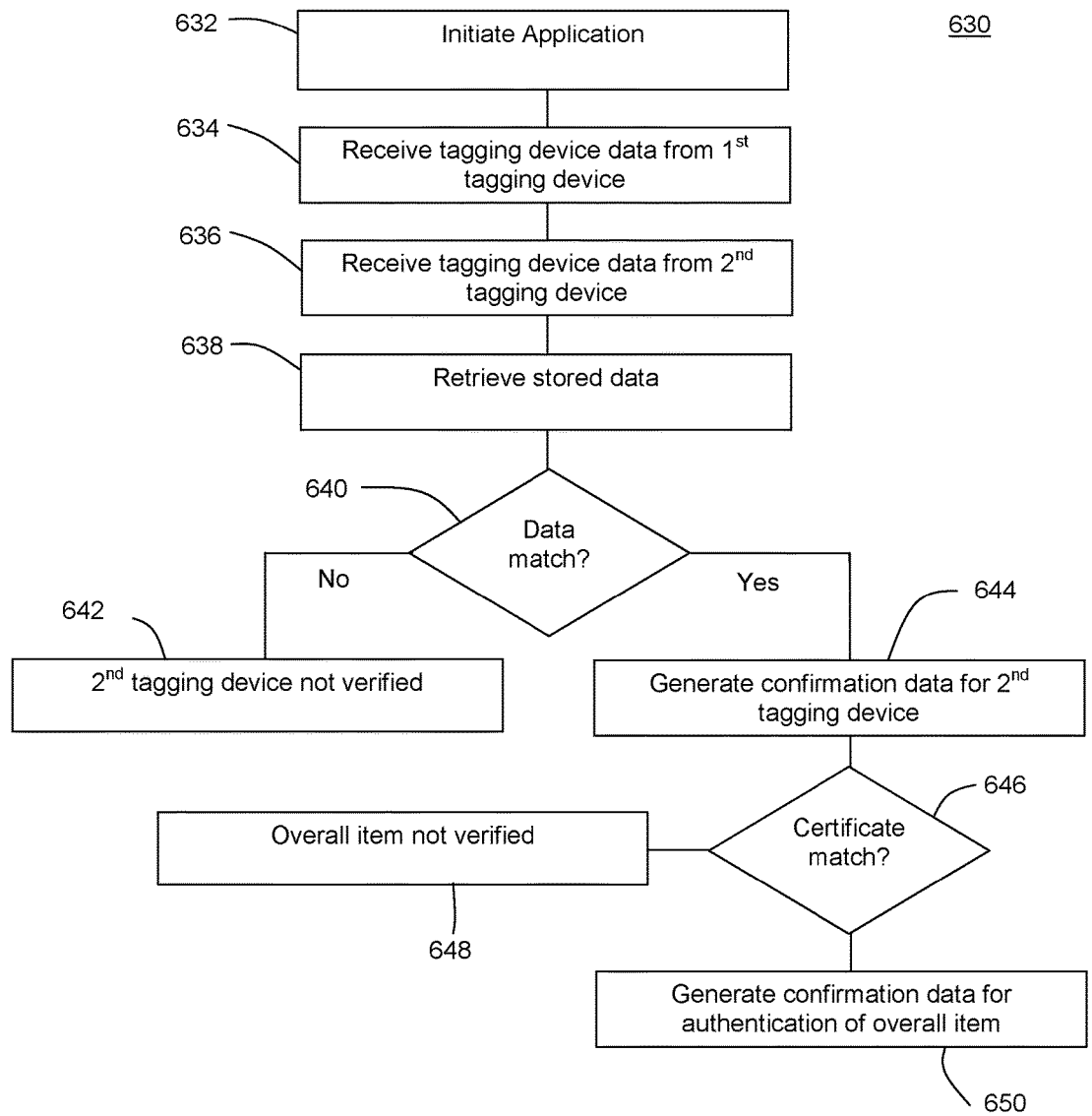
FIG. 8 is a flowchart of another method for authenticating a tagging device in accordance with an exemplary embodiment.

FIG. 8 illustrates a flowchart of a process 630 for authenticating an item comprising loosely coupled tagging devices, where a first tagging device is independent and a second tagging device is loosely coupled to the first tagging device. As a non-limiting example, the process 630 may be used to authenticate a golf club having a club head and a shaft, which are different parts that can be assembled and/or replaced to form a golf club. The authentication process can be used to verify that the club head and shaft are the original components used to form the club and that one of the component has not been counterfeited or replaced. In this example, the first tagging device may be associated with the club head, and the second tagging device may be associated with the shaft. In general, the first tagging device can be authenticated independently of the second tagging device using any of the methods described herein. The authentication of the first tagging device may indicate that the item, or portion thereof, associated with the first tagging device is authenticate. For example, authentication of the first tagging device may indicate that the club head represents an authentic club head. However, this authentication or verification may not provide an indication that the overall club is authentic or that the shaft is the shaft that was associated with the club head when the club was manufactured.

When a person chooses to authenticate the second tagging device, that person may begin the authentication process by executing an authentication application in step 632, which can be the same or similar authentication application described with respect to FIG. 6 or FIG. 7. At step 634, the tagging device data in the first tagging device may be retrieved. The tagging device data may include a tagging device ID (e.g., the UID), authentication information, item data, and/or any other data stored in the tagging device. This information may include any data included in the signature or certificate of the second tagging device. The information from the first tagging device may be retrieved from memory if the first tagging device is authenticated before the second tagging device.

At step 636, the second tagging device data can be retrieved. In some embodiments, the second tagging device data can be retrieved prior to retrieving the tagging device data from the first tagging device. The second tagging device data may include a certificate or signature along with a tagging device UID, authentication information, item data, any other data stored in the tagging device. The certificate or signature of the second tagging device may be provided over at least the UID of the second tagging device and at least some data (e.g., the UID) of the first tagging device. The authentication application may communicate with the reading device and allow it to obtain the data encoded within the second tagging device. For tagging devices with cryptographic functionality, the authentication application may begin a communication sequence to allow for the data to be obtained from the second tagging device.

At step 638, the data stored within the authentication system may be retrieved for use with the authentication application. The data stored in the authentication system may comprise tagging device data, item data, digital certificates, cryptographic keys, and the like. The data may be stored in the authentication system at the time of commissioning the tagging device, when the tagging device is coupled to the item, and/or at a later time (e.g., when the item having the tagging device is first sold by the manufacturer, etc.). The stored tagging device data may be obtained from the authentication system and/or a component in communication with the authentication system. For example, a cryptographic key may be obtained from the key server for use in authenticating the tagging device.

In order to authenticate the second tagging device, the second tagging device data can be correlated with the information retrieved from the authentication system in step 640. When the information obtained from the second tagging device does not correlate to the information stored in the authentication system, the second tagging device may not be authenticated. In this event, the process 630 may proceed to step 642 where a message may be generated by the authentication application indicating that the second tagging device, and thereby the item, is not verified. The message may include additional information about the tagging device or the item that was obtained from either the tagging device or the authentication server or some other server.

When the information obtained from the second tagging device correlates with the information stored in the authentication system, the second tagging device may be authenticated. The process 630 may then proceed to step 644 where a verification message may be generated indicating that the second tagging device is verified, thereby verifying the item, or the portion of the item, associated with the second tagging device. The message may include additional information about the tagging device or the item that was obtained from the tagging device, the authentication server, and/or some other server.

In the example, the verification of the second tagging device may indicate that the golf club shaft is authenticated. The authentication of the second tagging device may be limited to an authentication of the portion of the item to which the second tagging device is affixed or coupled. In this example, the shaft may itself be an authenticated shaft, but the authentication of the second tagging device by itself may not indicate that the club head and the shaft are authenticated as belonging together.

In order to authenticate the second tagging device as being loosely coupled to the first tagging device, the certificate or signature obtained from the second tagging device may be validated based on the information obtained from both the first tagging device and the second tagging device. At step 646, the certificate or signature associated with the second tagging device data can be analyzed based on the information obtained from the second tagging device as well as the first tagging device. The analysis may be used to determine if the certificate or signature in the second tagging device was signed over the data in the second tagging device as well as one or more elements of information from the first tagging device (e.g., the UID of the first tagging device).

When the information obtained from the analysis in step 646 does not indicate that the signature or certificate from the second tagging device was signed over the information from the first tagging device, the authentication of the item as a whole may fail. In this event, the process 630 may proceed to step 648 where a message may be generated by the authentication application indicating that the second tagging device does not correlate to the first tagging device, and therefore the overall item is not verified.

In the example, such a finding may indicate that while each component is itself authenticated, the club head was not originally associated with the shaft. This may indicate that the shaft or the club head was replaced at some point in time between the commissioning of the first and second tagging devices and execution of the authentication process 630.

When the information obtained from the analysis in step 646 indicates that the signature or certificate from the second tagging device was signed over the information from the first tagging device, the item as a whole may be verified. In this event, the process 630 may proceed to step 650 where a message may be generated by the authentication application indicating that the second tagging device correlates with the first tagging device, and therefore the overall item is verified.

In the example, such a finding may indicate that the club head is properly associated with the shaft in the overall golf club. For example, the analysis may indicate that the same club head is still associated with the same shaft that existed at the time the first and second tagging devices were commissioned. A prospective purchaser, owner, or the like may use this information to verify that the golf club is still genuine.

The authentication server may record and store the data associated with an item authenticity request. This data may include, but is not limited to, the time and date, user information, data associated with the authentication request, network information associated with the request, location data, information associated with the authentication application that performed the authenticity request, and/or information associated with the first tagging device and the second tagging device. The information may be stored whether or not the tagging device is verified as being authenticated and whether or not the first tagging device is correlated with the second tagging device as being loosely coupled.

In an embodiment in which the tagging devices are tightly coupled, each of a plurality of devices are related. For example, a first and second tagging device may be tightly coupled with each being signed over data including the other tagging device's UID. The verification of each tagging device then depends on obtaining information from the other tagging device. Further, the verification of an overall item may be based upon reading or communicating with all of the tagging devices. In the example provided above, a golf club head and shaft may be individually authenticated only after reading both tags, which may also provide an authentication of the overall golf club.

Figure 9:
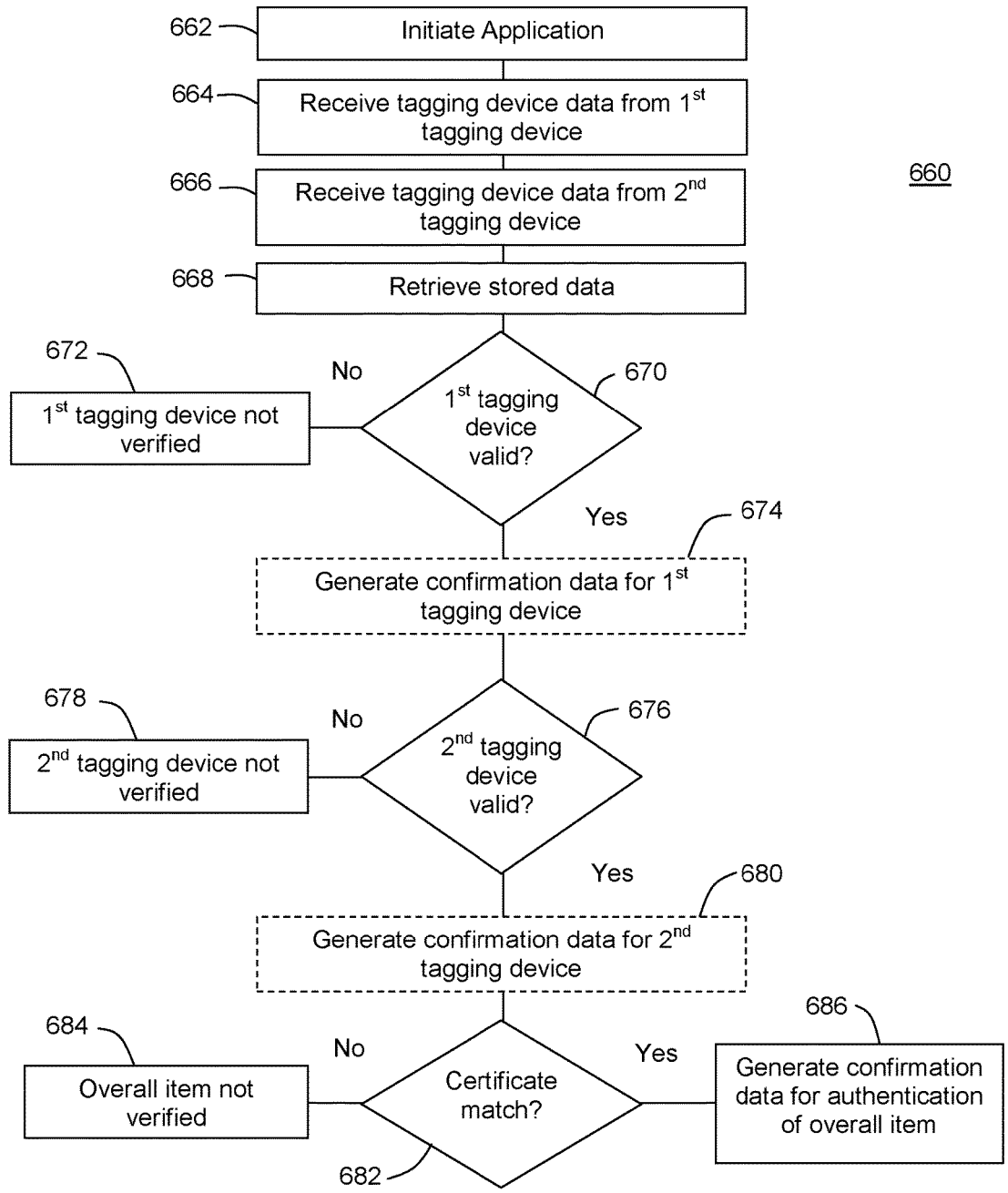
FIG. 9 is a flowchart of still another method for authenticating a tagging device in accordance with an exemplary embodiment.

FIG. 9 illustrates a flowchart of a method for authenticating a plurality of tagging devices that are tightly coupled. When a person chooses to authenticate the tagging devices associated with an item, that person may begin the authentication process by executing an authentication application in step 662, which can be the same or similar authentication application described with respect to FIG. 6 or FIG. 7. At step 664, the tagging device data in the first tagging device may be retrieved. At step 666, the tagging device data in the second tagging device may be retrieved. In some embodiments, the order of steps 664 and 666 may be reversed. The tagging device data obtained from the first tagging device and/or the second tagging device may include a tagging device UID, item data, keys, signatures and dates, and/or any other data stored in the tagging device. This information may include any data included in the signature or certificate of the corresponding tightly coupled tagging device or devices.

At step 668, the data stored within the authentication system may be retrieved for use with the authentication application. The data stored in the authentication system may comprise tagging device data, item data, digital certificates, cryptographic keys, and the like. The data may be stored in the authentication system at the time of commissioning the tagging device, when the tagging device is coupled to the item, and/or at a later time (e.g., when the item having the tagging device is first sold by the manufacturer, etc.). The stored tagging device data may be obtained from the authentication system and/or a component in communication with the authentication system. For example, a cryptographic key may be obtained from the key server for use in authenticating the tagging device. In some embodiments, the authentication application may serve as the authentication system, and the data may be retrieved from memory or other location associated with the authentication application.

In order to authenticate the first tagging device, the first tagging device data can be correlated with the information retrieved from the authentication system in step 670. The correlation may include verifying the certificate or signature associated with the first tagging device, which may require data from the second tagging device. When the information obtained from the first tagging device does not correlate to the information stored in the authentication system, the first tagging device may not be authenticated. In this event, the process 660 may proceed to step 672 where an optional message may be generated by the authentication application indicating that the first tagging device, and thereby the item, is not verified. The message may include additional information about the tagging device or the item that was obtained from either the tagging device or the authentication server or some other server.

When the information obtained from the first tagging device correlates with the information stored in the authentication system, the first tagging device may be authenticated. The process 660 may then proceed to step 674 where an optional verification message may be generated indicating that the first tagging device is verified, thereby verifying the item, or the portion of the item, associated with the second tagging device. The message may include additional information about the tagging device or the item that was obtained from the tagging device, the authentication server, and/or some other server.

In order to authenticate the second tagging device, the second tagging device data can be correlated with the information retrieved from the authentication system in step 676. The correlation may be the same or similar to the correlation carried out with respect to step 670. When the information obtained from the second tagging device does not correlate to the information stored in the authentication system, the second tagging device may not be authenticated. In this event, the process 660 may proceed to step 678 where an optional message may be generated by the authentication application indicating that the second tagging device, and thereby the item, is not verified.

When the information obtained from the second tagging device correlates with the information stored in the authentication system, the second tagging device may be authenticated. The process 660 may then proceed to step 680 where an optional verification message may be generated indicating that the first tagging device is verified, thereby verifying the item, or the portion of the item, associated with the second tagging device.

In order to authenticate the first and second tagging devices as being tightly coupled to each other, the certificate or signature obtained from each tagging device may be validated based on the information obtained from both the first tagging device and the second tagging device. At step 682, the certificate or signature associated with the first tagging device and/or the certificate or signature associated with the second tagging device can be analyzed based on the information obtained from both the first and second tagging devices. The analysis may be used to determine if the certificate or signature in the first tagging device was signed over data that includes information from the second tagging device and/or the analysis may be used to determine if the certificate or signature in the second tagging device was signed over data that includes information from the first tagging device. In some embodiments, only a single certificate or signature needs to be verified based on information from both tagging devices in order to verify whether or not the tagging devices are tightly coupled.

When the information obtained from the analysis in step 682 does not indicate that the signature or certificate from the one or both of the tagging devices was signed over the information from the both tagging devices, the authentication of the item as a whole may fail. In this event, the process 660 may proceed to step 684 where a message may be generated by the authentication application indicating that the first tagging device does not correlate to the second tagging device, and therefore the overall item is not verified. When the information obtained from the analysis in step 682 indicates that the signature or certificate from the one or both of the tagging devices was signed over the information from the both tagging devices, the item as a whole may be verified. In this event, the process 682 may proceed to step 686 where a message may be generated by the authentication application indicating that the first tagging device correlates with the second tagging device, and therefore the overall item is verified. The information associated with the authentication process 660 may optionally be recorded and stored as described herein.

In the example above, a golf club can be authenticated using two tightly coupled tagging devices. In this example, the first tagging device on the club head can contain at least a first UID, a date stamp, optionally additional data (i.e., keys, item data, etc.), and a first certificate over the data in the first tagging device associated with the club head. The first certificate may also be over data associated with the second tagging device on the club shaft such as the second tagging device UID. Similarly, the second tagging device in the shaft would contain in its memory a second UID, a date stamp, optionally additional data (i.e., keys, item data, etc.), and a second certificate over the data in the second tagging device associated with the shaft. The second certificate may also be over data associated with the first tagging device in the club head such as the first UID. The tightly coupled tagging device may require that both the first tagging device on the club head and the second tagging device on the shaft must be communicated with in order to obtain all of the data necessary to validate the certificates stored in both of the tagging devices affixed to the golf club.

In some embodiments, the owner of an item may register his/her ownership in the authentication server. The owner may establish ownership through an ownership change process. The initial owner may be established in any number of ways. For example, the owner may be established through a product registration process that includes a mail in post card. Alternatively, the owner may be established through the reading of a tagging device, such as a QR code, that is contained within the product documentation that only an owner will be able to read. Yet another approach is for the owner to be established at the point of sale in a retail establishment where a purchased product is registered to the purchaser through the reading at the point of sale of the tagging device used for item authentication. An affinity card or credit card can be used to obtain all or a portion of the purchaser's personal information needed for product registration and ownership registration. The initial ownership registration process can be identical to the initial product registration process.

Figure 10:
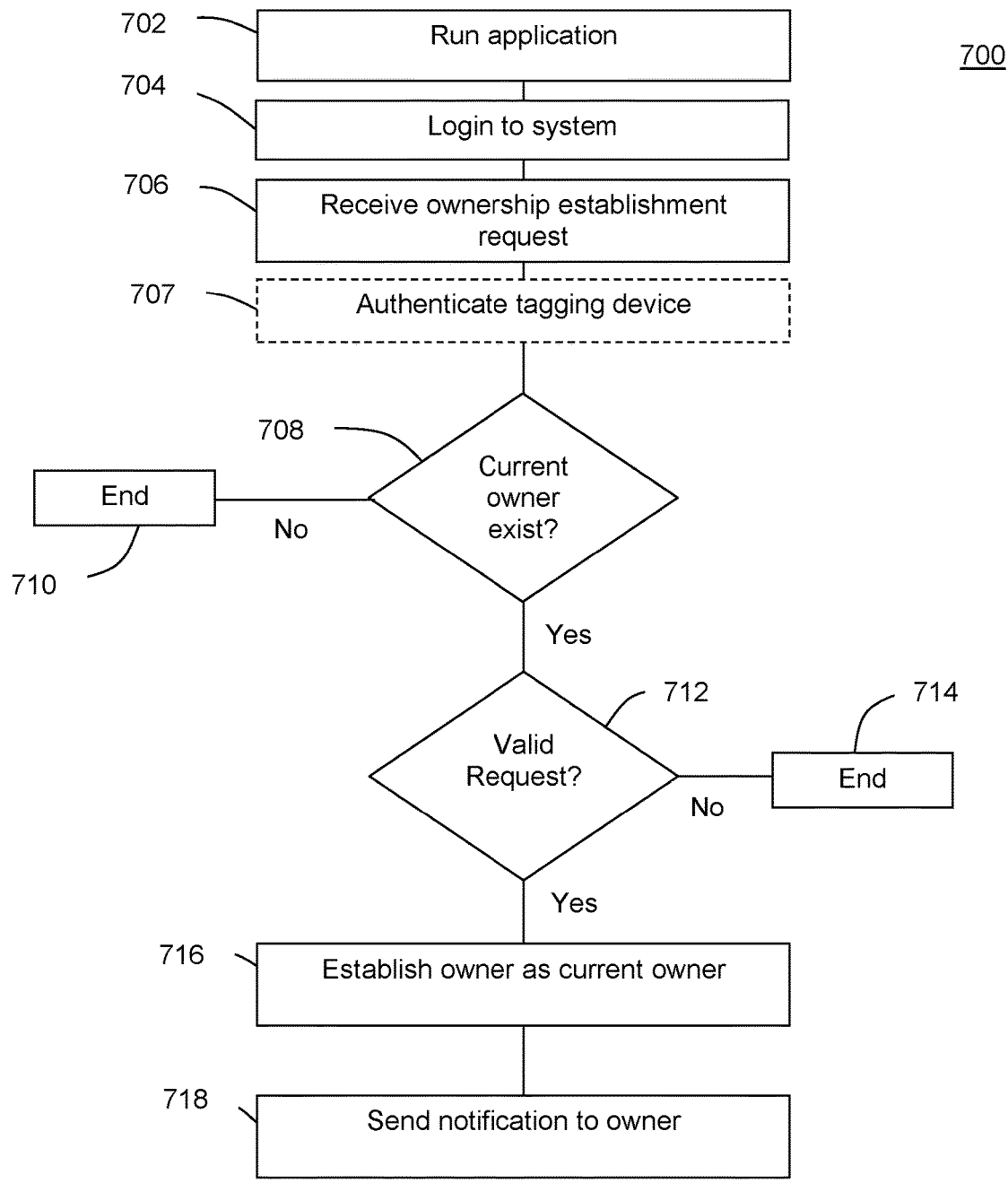
FIG. 10 is a flowchart of a method for establishing ownership of an object in accordance with an exemplary embodiment.

FIG. 10 illustrates a flow chart for an embodiment of a process 700 for registering the ownership of an item from a presently unassigned owner to a subsequent registered owner. This process may be used for the initial ownership claim as well as any subsequent ownership claim where the previous ownership claim has been relinquished. The process 700 may begin at step 702 with executing an authentication application. The authentication application may execute on the reading device 120 or the reading device may serve as an input device for communicating with the authentication application running on an authentication system server.

At step 704, a user may login to the authentication system using the authentication application. The login may verify that a user is a registered user of the system. The login may request user data such as a user ID, a password, and any suitable additional identifying information such as a device ID associated with the login request. The user data may be sent to the authentication system for comparison and verification with existing information stored in the authentication system. Upon verifying the user data based on the information in the authentication system, the authentication system may return an authentication to the authentication application.

At step 706, the authentication application may receive an ownership change request. The ownership change request may comprise data associated with the item that is the subject of the ownership change request. The data may be input manually (e.g., a serial number), and/or the reading device 120 may obtain the data from the tagging device associated with the item. When the data is obtained from the tagging device, the data may comprise the UID of the tagging device, and optionally any available item data, a digital signature, or the like. The data may then be sent to the authentication system for use in processing the ownership change request.

At step 707, the authentication application may optionally authenticate the tagging device and/or item. While the item may be identified without authenticating the tagging device, the optional authentication step may ensure that the user requesting the ownership change request actually possesses the item, thereby reducing the likelihood that the request is directed to an item not in the user's possession. In order to authenticate the tagging device, the reading device may obtain the tagging device data from the tagging device, for example by reading a bar code, communicating with an RFID chip, or the like. The information may then be sent to the authentication server to authenticate the tagging device. When the tagging device comprises cryptographic functionality, the authentication application may mediate a one-way or mutual authentication between the authentication server and the tagging device, for example, using the mutual authentication processes described herein.

At step 708, the system may determine if a current owner exists for the item. For example, the authentication system may retrieve the ownership records or ownership pedigree for the item to determine if the current owner is unassigned or comprises an identifier for a registered user. If a current owner is identified for the item, the process may proceed to step 710 and end. An optional message may then be sent to the current owner to provide notification of the attempt to change the ownership of the item.

When the current ownership status of the item is determined to be unassigned, open, or otherwise available, the process 700 may proceed to step 712 at which the system may determine if the request is valid. The ownership change request may be valid based on the registered user profile, and optionally, authentication of the tagging device and/or item. In an embodiment, the system may first verify that the registered user has the appropriate rights to register as the owner of the item. For example, different user rights may be based on a membership level. A free or lower level membership may only allow a user to register a limited number of items. The system may verify whether the user has exceeded the available number of items prior to proceeding past step 712. In some embodiments, the authorization may come in the form of a tagging device, information, or other entity found in the product packaging or received from the point of sales system. In some embodiments, the system may verify the authenticity of the tagging device before proceeding past step 712. For example, the system may only allow authenticated tagging devices to be registered. When the request is determined by the system to be invalid, the process 700 may proceed to step 714 and end. An optional message may then be sent to the registered user to provide notification of the reason for the request being determined to be invalid.

When the request is determined to be valid at step 712, the process 700 may proceed to step 716 in which the registered user may be associated with the item as the current owner. Establishing the user as the owner of the item may be based on verifying that the item does not have a current owner, and in some embodiments, on the authentication of the tagging device associated with the item. The updated ownership status may be stored in the appropriate data structure in the authentication system, and the owner pedigree or history may be updated to reflect the change in the ownership status.

At step 718, a message may be sent to the registered user that they have been successfully registered as the current owner of the item. Additional notifications may also be sent including a notification to a third party to indicate that the item has been claimed.

When the process 700 is performed for the initial owner of an item, the ownership claim process may serve, in some embodiments, as a product registration. The registration process may utilize the user credentials to provide the information on the user, and the authentication of the tagging device may serve to provide the necessary information on the item being registered. By providing registration by registered users in this manner, the system may be able to register an owner of the item for warranty and other services with a single click or process. The ability to perform the ownership registration as well as the product registration may also encourage some users to register their items, which may provide valuable feedback to third parties on the status of the items they create.

In some embodiments, some or all of the information related to the ownership claim process can be supplied to an ad server 191. In an embodiment, one or more ads may be supplied to a user, for example over the reading device, in response to the ownership claim process. The ads may be based on the subject of the ownership claim process. For example, an ad server may be configured to provide ads based on the item being claimed or any item related to the item being claimed. In some embodiments, the ads may be based on one or more characteristics (e.g., demographics, location, etc.) of the user initiating the ownership claim process. Any of the types of ads or considerations for providing the ads described herein can be used to supply one or more ads to a user.

An item may have multiple owners over its lifetime. For example, once an item has been registered as being owned by a user, the user may continue to own and use the item. At a subsequent time, the owner may wish to transfer the ownership of the item to a second user. Ownership may be transferred to the second user by either being relinquished by the first user and subsequently claimed by the second user, or the ownership may be directly transferred from the first user to the second user. In an embodiment, the current owner of an item may relinquish ownership of an item by requesting that the authentication server set the current owner to unassigned. This allows any subsequent owner to claim ownership as if the item were initially purchased.

Figure 11:
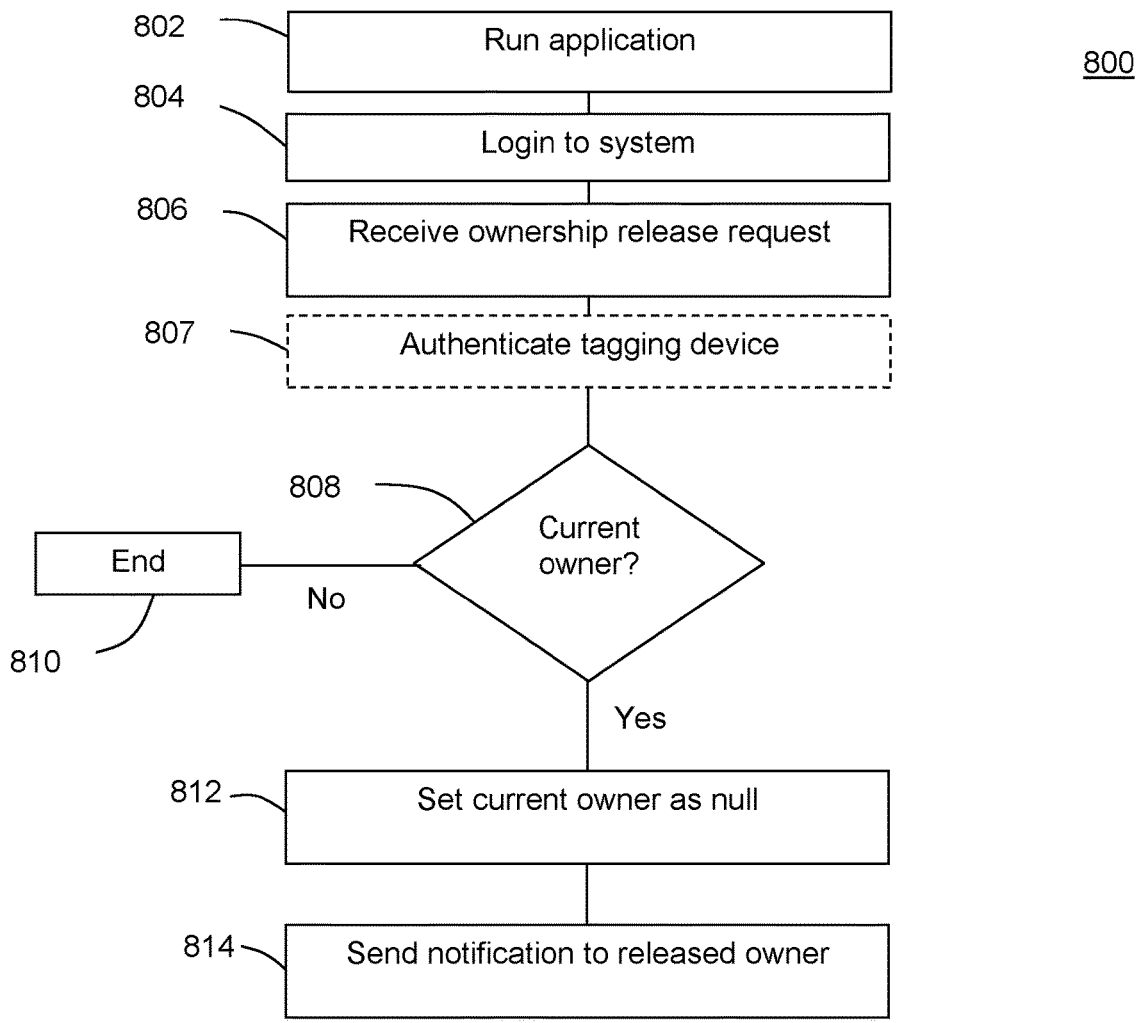
FIG. 11 is a flowchart of a method for relinquishing ownership of an object in accordance with an exemplary embodiment.

FIG. 11 illustrates a flow chart for an embodiment of a process 800 for releasing the ownership of an item from a presently assigned owner, which can be used to allow a subsequent owner to register as the owner of an item. The process 800 may begin at step 802 with executing the authentication application. As in the process 800, the authentication application may execute on the reading device or the reading device may serve as an input device for communicating with the authentication application running on an authentication system server.

At step 804, a user may login to the authentication system using the authentication application. The login may verify that a user is a registered user of the system. The login may request user data such as a user ID, a password, and any suitable additional identifying information. The user data may be sent to the authentication system for comparison and verification with existing user information stored in the authentication system. Upon verifying the user data based on the information in the authentication system, the authentication system may return an authentication of the user to the authentication application.

At step 806, the authentication application may receive an ownership release request. The ownership release request may comprise data associated with the item that may serve to identify the item. The data may be input manually, for example, by entering a serial number, selecting the item from a list of items indicated as having the user as the owner, and the like. In some embodiments, the reading device may obtain the item data from the tagging device associated with the item. When the data is obtained from the tagging device, the data may comprise the UID of the tagging device, and optionally any available item data, a digital signature, or the like. The data may then be sent to the authentication system for use in processing the ownership release request.

At step 807, the authentication application may optionally authenticate the tagging device and/or item. For an ownership release, the item may generally not need to be authenticated. For example, when the item has already been transferred to a subsequent purchaser, the item may not be available for authentication. However, authentication of the item may be useful in some instances in order to prevent a third party who may have obtained the user's credentials from releasing the ownership of an item. In order to authenticate the tagging device, the reading device may obtain the tagging device data from the tagging device for example by reading a bar code, communicating with an RFID tag, or the like. The information may then be sent to the authentication server to authenticate the tagging device. When the tagging device comprises cryptographic functionality, the authentication application may mediate a one-way authentication or mutual authentication between the authentication server and the tagging device, for example, using the mutual authentication processes described herein.

At step 808, the system may determine if a current owner exists for the item and if the current owner is the user attempting to release the ownership. For example, the authentication system may retrieve the ownership records or ownership pedigree for the item to determine if the current owner is unassigned or comprises an identifier for a registered user. If a current owner is not identified for the item, the process may proceed to step 810 and end. When an owner is identified, the authentication system may verify that the identification of the owner in the ownership records matches the user credentials for the user providing the owner release request. If the current owner does not match the owner of the item in the ownership records, the process 800 may proceed to step 810 and end. An optional message may then be sent to the user to indicate that the ownership of the item is currently unassigned and/or that the ownership does not match the identity of the user attempting to release the ownership of the item.

When the current ownership status of the item is determined to be assigned and the ownership records indicate that the user is the owner of the item, the process 800 may proceed to step 812 where the ownership status of the item may be set to unassigned, null, or otherwise indicate that the ownership is unclaimed.

At step 814, a message may be sent to the user to provide notification that the user is now listed as a past owner of the item and that the ownership is currently unassigned. The updated ownership status may be stored in the appropriate data structure in the authentication system, and the owner pedigree or history may be updated to reflect the release of ownership of the item. In some embodiments, an optional message may be sent to a third party such as the manufacturer of the item to indicate that the ownership of the item has been released.

Figure 12:
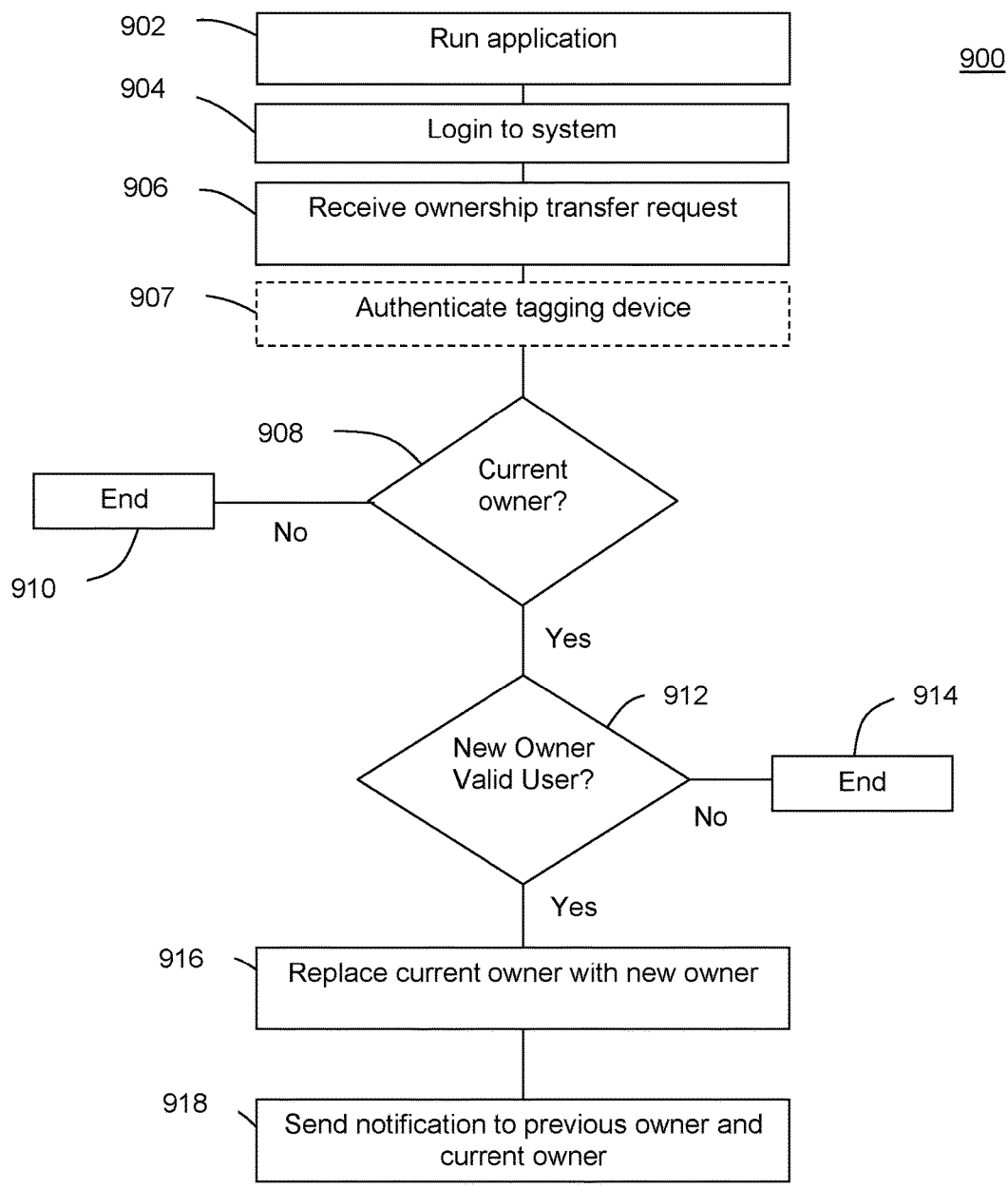
FIG. 12 is a flowchart of a method for transferring ownership of an object in accordance with an exemplary embodiment.

In addition to releasing the ownership to allow a subsequent owner to claim the ownership, the current owner may also transfer ownership to another user. FIG. 12 illustrates a flow chart for an embodiment of a process 900 for transferring the ownership claim of an item from a first owner to a second owner. The process 900 may begin at step 902 with executing an authentication application. The authentication application may execute on the reading device 120 or the reading device may serve as an input device for communicating with the authentication application running on an authentication system server.

At step 904, a user may login to the authentication system using the authentication application. The login may verify that a user is a registered user of the system. The login may request user data such as a user ID, a password, and any suitable additional identifying information such as a device ID associated with the login request. When the authentication application receives the user credentials for the first user, the user credentials may be sent to the authentication system for comparison and verification with existing information stored in the authentication system. Upon verifying the first user credentials based on the information in the authentication system, the authentication system may return an authentication to the authentication application for the first user.

At step 906, the authentication application may receive an ownership transfer request from the first user. The ownership transfer request may comprise data associated with the item that may serve to identify the item. The data may be input manually, for example, by entering a serial number, selecting the item from a list of items indicated as having the user as the owner, and the like. In some embodiments, the reading device may obtain the item data from the tagging device associated with the item. When the data is obtained from the tagging device, the data may comprise the UID of the tagging device, and optionally any available item data, a digital signature, or the like. The data may then be sent to the authentication system for use in processing the ownership transfer request.

At step 907, the authentication application may optionally authenticate the tagging device and/or item. For an ownership transfer, the item may generally not need to be authenticated. For example, when the item has already been transferred to a subsequent purchaser, the item may not be available for authentication by the first user. However, authentication of the item may be useful in some instances. In order to authenticate the tagging device, the reading device may obtain the tagging device data from the tagging device, for example by reading a bar code, communicating with an RFID tag, or the like. The information may then be sent to the authentication server to authenticate the tagging device. When the tagging device comprises cryptographic functionality, the authentication application may mediate a one-way authentication or mutual authentication between the authentication server and the tagging device, for example, using the mutual authentication processes described herein.

At step 908, the system may determine if a current owner exists for the item and if the current owner is the first user attempting to transfer the ownership. For example, the authentication system may retrieve the ownership records or ownership pedigree for the item to determine if the current owner is unassigned or comprises an identifier for a registered user. If a current owner is not identified for the item, the process may proceed to step 910 and end. When an owner is identified, the authentication system may verify that the identification of the owner in the ownership records matches the first user credentials for the user providing the owner release request. If the current owner identified in the records does not match the identification of the first user, the process 900 may proceed to step 910 and end. An optional message may then be sent to the owner identified in the records or to a third party to indicate that another user is attempting to transfer the ownership of the item.

When the current ownership status of the item is determined to be assigned to the first user, the process 900 may proceed to step 912 where the system may verify that the second user is a registered and valid user of the system. The information for the second user may be provided by the first user and/or the second user. For example, both users may be logged into the system at the same time. Alternatively, the second user may be identified in the ownership transfer request itself. Once the second user information is provided to the authentication application, the second user information may be sent to the authentication system for confirmation that the second user is a registered user of the system. If the system determines that the second user is not a registered user, the process 900 may proceed to step 914 and end. An optional message may be sent to the first user and/or the second user indicating that the second user is not a registered user.

When the second user is verified as a registered user of the system, the process 900 may proceed to step 916 where the second owner is set as the new owner of the item. In order to set the second user as the new owner of the item, the ownership record of the first user may be modified to set the first user as a past owner of the item. The second user may then be set as the current owner of the item.

In some embodiments, transferring the ownership and setting the second user as the current owner of the item may be based on authenticating the tagging device associated with the item. The updated ownership status of the item may be stored in the appropriate data structure in the authentication system, and the owner pedigree or history may be updated to reflect the change in the ownership status. For example, the owner pedigree may be modified to reflect that the first user is a previous owner of the item, and the second user is the current owner of the item.

At step 918, a message may be sent to the first user and/or the second user indicating that the ownership status has changed to a past owner and that the second user has become the new owner of the item. In some embodiments, an optional message may be sent to a third party such as the manufacturer of the item to indicate that the ownership of the item has been transferred from the first user to the second user. The notification may serve, in some embodiments, as a transfer of the product registration.

In some embodiments, some or all of the information related to the ownership transfer process can be supplied to an ad server 191. In an embodiment, one or more ads may be supplied to a user, for example over the reading device, in response to the ownership transfer process. The ads may be based on the subject of the ownership transfer process. For example, an ad server may be configured to provide ads based on the item being transferred or any item related to the item being transferred. In some embodiments, the ads may be based on one or more characteristics (e.g., demographics, location, etc.) of the user initiating the ownership transfer process and/or the user registering as the owner of the item. Any of the types of ads or considerations for providing the ads described herein can be used to supply one or more ads to a user. The ownership change process may be part of a transaction involving the item. The use of the tagging device may provide assurances that the item being transferred is authentic. However, some transactions may take place at a distance including, for example, on-line sales, catalogue orders, and the like. In these types of transactions, the purchaser may not be able to verify the tagging device until the item is physically received, for example when the tagging device comprises an RFID tag, an NFC tag, a BLE device, and the like. Even when the tagging device comprises a bar code, QR code, or other visually readable tagging device, the seller may not provide access to the tagging device until the purchaser pays for the item. Further, a seller wanting to counterfeit an item may simply supply a previously copied tagging device such as a bar code and then send out multiple copies of the bar code to subsequent purchasers. Some selling agencies have implemented escrow arrangements that allow a purchaser an inspection period prior to the payment being sent to the seller. While an escrow arrangement may be useful in limiting a purchaser's exposure to fraud, it may not provide any indication that the seller possesses the item at the time the purchaser pays for the item.

In an embodiment, the system may allow for a secondary tagging device to be created to verify the tagging device at a time selected by a registered user. For example, a registered user may proceed to authenticate the tagging device affixed to or coupled to an item, and therefore the item, at a time after they have obtained the item. The user may then request a secondary tagging device, which may be referred to as an authentication tag. The authentication tag may be supplied by the authentication server or by a third party or by any combination thereof. The authentication tag may be in a form that can be supplied to a purchaser with or without the item, such as a QR code or an RFID tag or an application that may couple through a communications network to the tagging device affixed to or coupled to the item. The authentication tag may comprise a time stamp indicating that the tagging device was authenticated at or near the time of the creation of the authentication tag. This may allow a seller to generate an authentication tag and provide the authentication tag to a potential purchaser, who may use the tag to verify that the seller has possession of a verified tagging device at a recent time. The purchaser may be able to judge the credibility of the seller based on the time stamp associated with the authentication tag.

In an exemplary embodiment, the authentication tag may be used in a sale of an item associated with a tagging device that can occur at a distance. In this embodiment, a seller may post an item associated with a tagging device for sale on a web site. The tagging device may comprise an RFID tag, an NFC tag, a BLE device or some other tagging device communicating through a wireless communication protocol. As a result of the tagging device being associated with a non-visual communication protocol, a prospective purchaser may not be able to verify the authenticity of the item. In order to verify the authenticity of the item, the seller who is in physical possession of the item and tagging device may perform a tagging device authentication as described above. The authentication process may verify the authenticity of the tagging device at the time the authentication process is performed.

As a registered user of the system, the seller may request an authentication tag that can be sent to a purchaser, posted on the website, or otherwise provided to the purchaser. When the system authenticates the tagging device associated with the item, the system may generate an authentication tag in response to the request from the user, which may be based on the verification of the tagging device provided by the authentication process. The system, for example the authentication system, may generate the authentication tag comprising a digital signature having a time stamp indicative of the time, or the approximate time, of the verification of the tagging device resulting from the authentication process. The authentication tag may comprise a visibly identifiable tagging device such as a bar code, QR code, or the like. The authentication tag can then be sent to the prospective purchaser electronically (e.g., over the Internet), as a hard copy, using a fax machine, or using any other means. The use of a visibly identifiable tagging device may allow the tagging device to be easily posted, sent, or otherwise transmitted to a purchaser who can read the tagging device. In some embodiments, the authentication tag may comprise any type of tagging device described herein.

When the purchaser receives or views the authentication tag, the purchaser may perform a tagging device authentication process. The purchaser may be required to login to the system as a registered user in order to perform the authentication tag verification process. The system may return a verification if the authentication process indicates that the authentication tag, and therefore the tagging device, is authentic. The verification may indicate the time at which the tagging device associated with the item was last verified, item data, and/or any additional data associated with the tagging device authentication process that resulted in the creation of the authentication tag (e.g., the identity of the user creating the authentication tag, etc.). This verification may indicate to the purchaser that the seller had possession of the item at the time the authentication tag was created. Additional authentication tags can be created over time for subsequent time periods to provide evidence of the authenticity of the item for various transactions.

Figure 13:
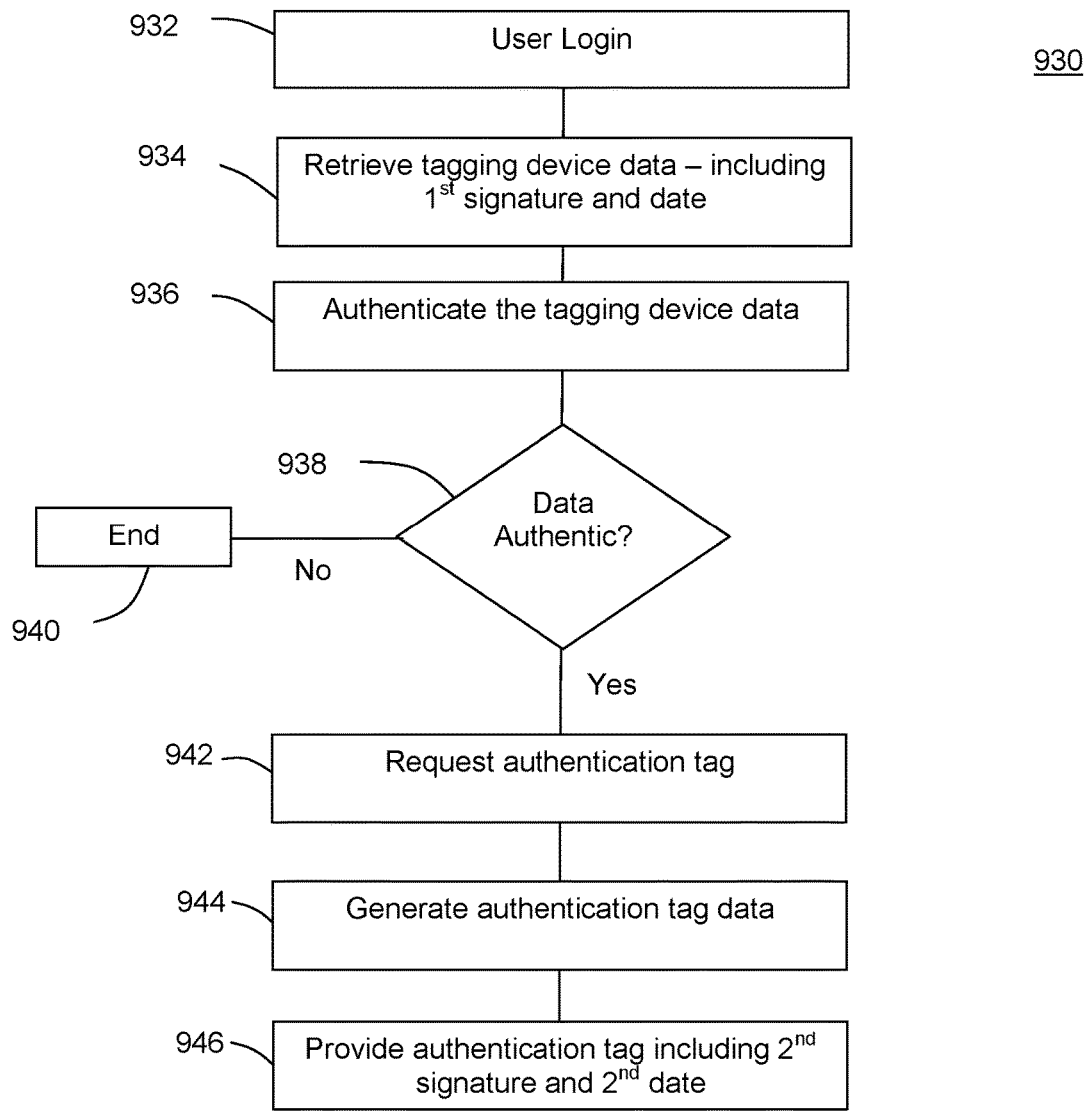
FIG. 13 is a flowchart of a method for generating a secondary tagging device in accordance with an exemplary embodiment.

FIG. 13 is a flowchart of an embodiment of a process 930 for creating an authentication tag. The process 930 may begin at step 932 with the user requesting the authentication tag providing login credentials to the system. The user may be a registered user and provide the registered user information to the system. When the system receives the user credentials, the system may verify the identity of the user and grant permission to use the system. The user may login using an authentication application executing on a reading device. In some embodiments, the authentication application may be executing on a server associated with the authentication system, and the user may login through a portal serving as a connection to the authentication system server.

At step 934, the tagging device data can be retrieved. In an embodiment, the reading device may obtain the tagging device data from the tagging device using any of the methods described herein. For example, the reading device may obtain an image of a bar code or QR code, or the reading device may initiate a communication sequence or protocol with a communication enabled device such as an RFID tag, an NFC tag, or the like. The tagging device data can include any of the information stored in the tagging device. In an embodiment, the tagging device data obtained from the tagging device can include a first digital signature and a first time stamp. The first digital signature may be the digital signature used to sign the tagging device data during the commissioning of the tagging device data, and the time stamp may be the time stamp associated with the first digital signature and the time of commissioning the tagging device.

At step 936, the tagging device may be authenticated and/or verified by the authentication system. In order to carry out the authentication process, the reading device may transmit the tagging device data to the authentication system, which may carry out the authentication of the tagging device using any of the method described herein. The authentication system may then send back a message indicating whether or not the tagging device is authenticated or verified by the authentication system.

At step 938, a determination of the authentication of the tagging device can be made. When the tagging device is not authenticated or verified by the authentication system, the process 930 may proceed to step 940 and end. A message may be sent to the user indicating that the authentication process failed to authenticate the tagging device and that a authentication tag could not be generated as a result of the failed authentication of the tagging device.

When the tagging device is authenticated or verified, the process 930 may proceed to step 942, where the user may request an authentication tag based on the authentication of the tagging device. In an embodiment, the system may only accept requests for the creation of the authentication tags from an owner of the item, and the authentication system may retrieve the ownership information based on the user credentials to verify the ownership prior to generating an authentication tag. In some embodiments, the request for the authentication tag may occur prior to step 934 and trigger the communication between the reading device and the tagging device. When the reading device obtains the request from the user, the reading device may send the authentication tag request to the authentication system.

At step 944, the authentication system may generate tagging device data comprising the information obtained from the tagging device associated with the item. The tagging device data, which may include the first signature and the first time stamp, may be signed by a second digital signature and a second time stamp. The second digital signature may cover all of the tagging device data, which may include the first digital signature and the first time stamp. The second digital signature may then be used to verify or authenticate the original tagging device data as well as identify the authentication tag as a later created tagging device. In an embodiment, the second digital signature can include a cipher, hash function, or keyed hash function. The second time stamp may represent the time or approximately the time at which the tagging device was authenticated (e.g., the most recent time).

At step 946, the authentication system may generate the authentication tag comprising the tagging device data, second digital signature, and second time stamp generated in step 944. The authentication tag may be generated as a visual tagging device such as a bar code or QR code. When the authentication tag comprises a visual tagging device, the authentication tag may be sent to the reading device and/or the user in an electronic form. The authentication tag may then be presented on a display, printed, or otherwise provided to a third party. In some embodiments, the authentication tag may be commissioned as an RFID tag, an NFC tag, a BLE device, or the like. The authentication tag could then be provided directly to a third party for verification of the item.

In some embodiments, the authentication system may follow a similar procedure to generate a certificate of authenticity rather than a second authentication tag. In this embodiment, the owner of an item may generate a certificate for that item indicating that the item was authenticated by the owner on a specific date. For example, the owner may log into the authentication system (e.g., using an authentication application) as the owner, select the generate certificate function, enter information that the owner wants in the certificate such as the tag identifier, allow the system to authenticate the tag using the authentication procedure, and then generates the certificate. This process may follow the same procedures described with respect to FIG. 13.

Figure 14:
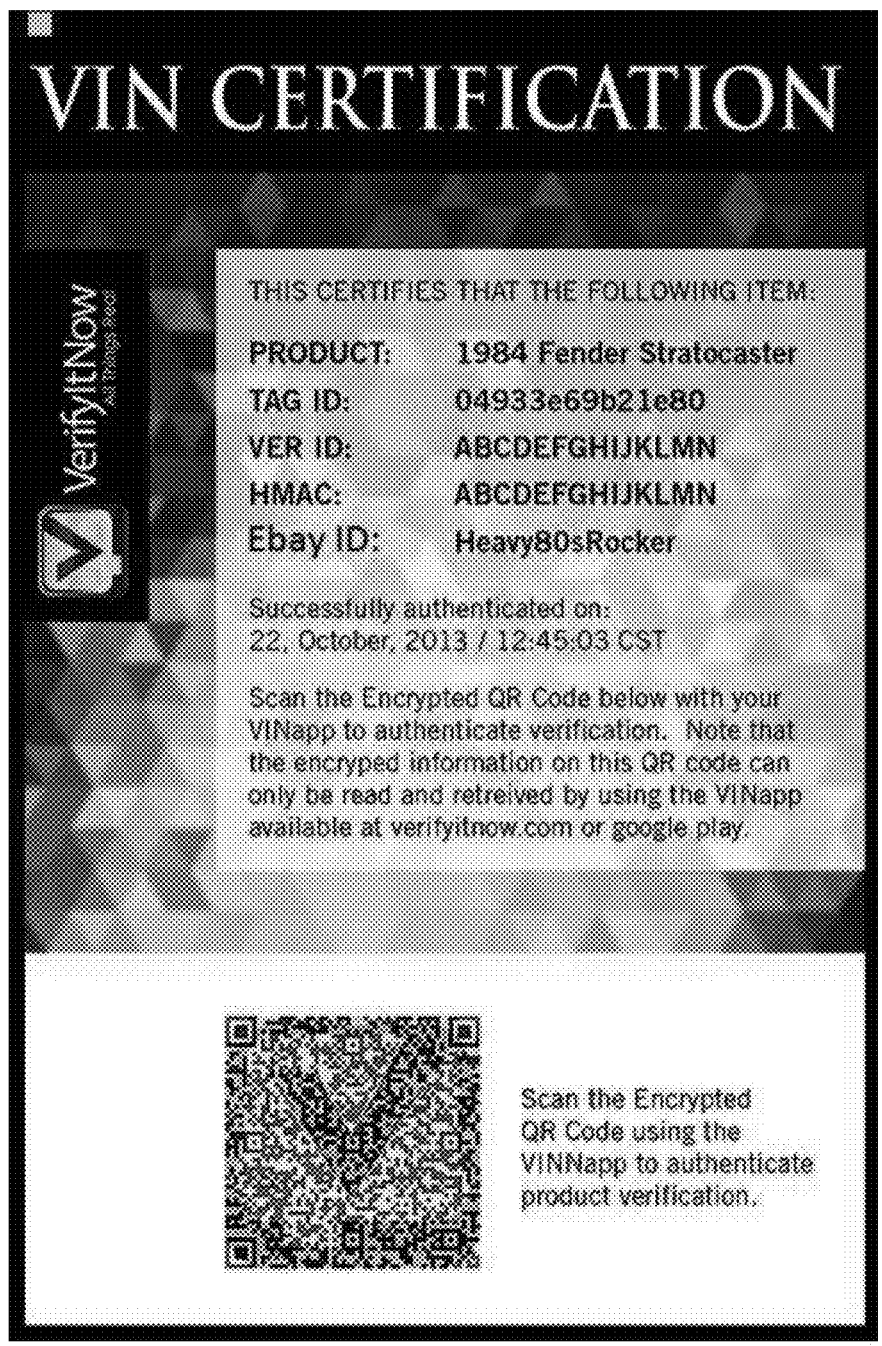
FIG. 14 is an illustration of an exemplary embodiment of a certificate of authenticity.

The resulting certificate of authenticity can be communicated to the owner and/or a third party designated by the owner through any available communication routes such as through email, text message, physical mail, or the like. An exemplary certificate of authenticity 947 is shown in FIG. 14. As illustrated, the certificate of authenticity 947 may include various item data (e.g., a product ID, vendor ID, and the like), ownership data, the authentication time, a tagging device ID associated with the item and any other details used in the authentication process. As also shown, the second authentication tag can be included with the certificate of authenticity. The second authentication tag may allow the certificate of authenticity to be verified.

Figure 15:
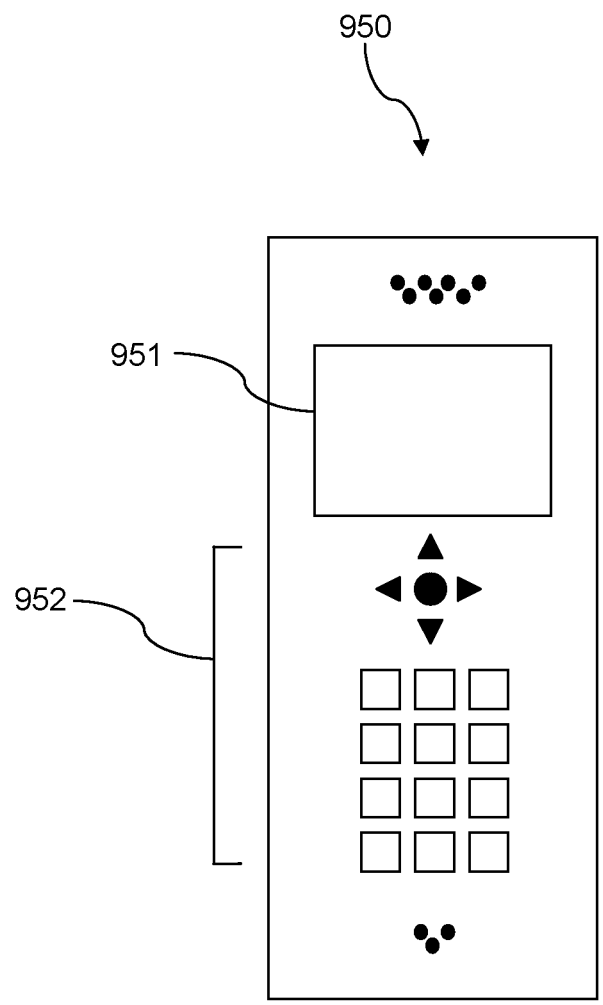
FIG. 15 is an illustration of a mobile communication device according to an exemplary embodiment.

FIG. 15 depicts the mobile device 950, which is operable for implementing aspects of the present disclosure, but the present disclosure should not be limited to these implementations. The mobile device 950 may be used as the reading device described with respect to FIG. 1 and/or the mobile device described with respect to FIG. 4 above. Though illustrated as a mobile phone, the mobile device 950 may take various forms including a wireless handset, a pager, a personal digital assistant (PDA), a gaming device, a dedicated reading device, or a media player. The mobile device 950 includes a display 951 and a touch-sensitive surface and/or keys 952 for input by a user. The mobile device 950 may present options for the user to select, controls for the user to actuate, and/or cursors or other indicators for the user to direct. The mobile device 950 may further accept data entry from the user, including numbers to dial or various parameter values for configuring the operation of the handset. The mobile device 950 may further execute one or more software or firmware applications in response to user commands (e.g., the authentication application). These applications may configure the mobile device 950 to perform various customized functions in response to user interaction. Additionally, the mobile device 950 may be programmed and/or configured over-the-air, for example from a wireless base station, a wireless access point, or a peer mobile device 950. The mobile device 950 may execute a web browser application which enables the display 951 to show a web page. The web page may be obtained via wireless communications with a base transceiver station, a wireless network access node, a peer mobile device 950 or any other wireless communication network or system.

Figure 16:
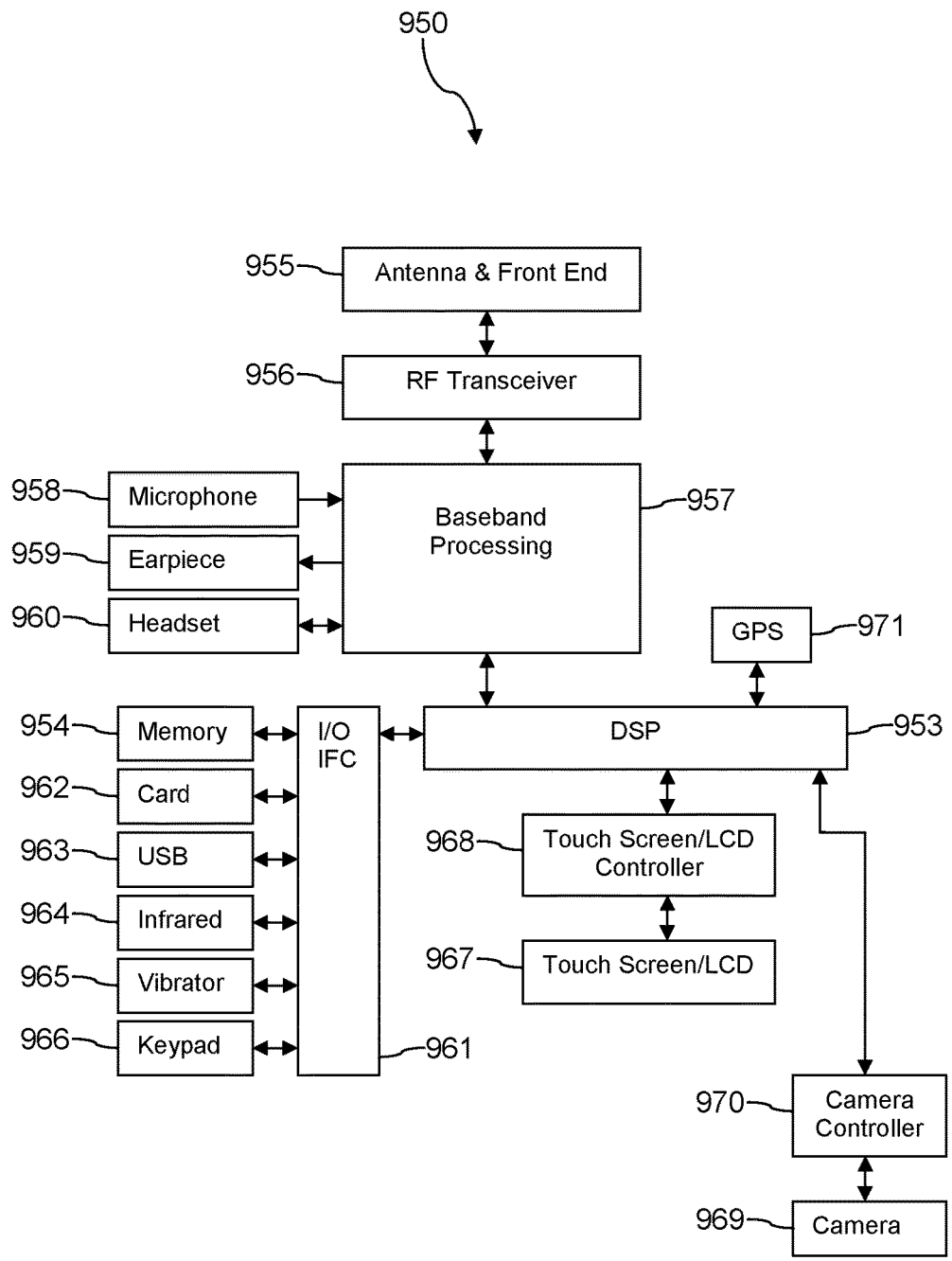
FIG. 16 is a block diagram of a mobile communication device according to an exemplary embodiment.

FIG. 16 shows a block diagram of the mobile device 950. While a variety of known components of handsets are depicted, in an embodiment a subset of the listed components and/or additional components not listed may be included in the mobile device 950. The mobile device 950 includes a digital signal processor (DSP) 953 or a processor, and a memory 954. As shown, the mobile device 950 may further include an antenna and front end unit 955, a radio frequency (RF) transceiver 956, a baseband processing unit 957, a microphone 958, an earpiece speaker 959, a headset port 960, an input/output interface 961, a removable memory card 962, a universal serial bus (USB) port 963, an infrared port 964, a vibrator 965, a keypad 966, a touch screen liquid crystal display (LCD) with a touch sensitive surface 967, a touch screen/LCD controller 968, a camera 969, a camera controller 970, and a global positioning system (GPS) receiver 971. In an embodiment, the mobile device 950 may include another kind of display that does not provide a touch sensitive screen. In an embodiment, the DSP 953 may communicate directly with the memory 954 without passing through the input/output interface 961. Additionally, in an embodiment, the mobile device 950 may comprise other peripheral devices that provide other functionality.

The DSP 953 or some other form of controller or central processing unit operates to control the various components of the mobile device 950 in accordance with embedded software or firmware stored in memory 954 or stored in memory contained within the DSP 953 itself. In addition to the embedded software or firmware, the DSP 953 may execute other applications stored in the memory 954 or made available via information carrier media such as portable data storage media like the removable memory card 962 or via wired or wireless network communications. The application software may comprise a compiled set of machine-readable instructions that configure the DSP 953 to provide the desired functionality, or the application software may be high-level software instructions to be processed by an interpreter or compiler to indirectly configure the DSP 953.

The DSP 953 may communicate with a wireless network via the analog baseband processing unit 957. In some embodiments, the communication may provide Internet connectivity, enabling a user to gain access to content on the Internet and to send and receive e-mail or text messages. The input/output interface 961 interconnects the DSP 953 and various memories and interfaces. The memory 954 and the removable memory card 962 may provide software and data to configure the operation of the DSP 953. Among the interfaces may be the USB port 963 and the infrared port 964. The USB port 963 may enable the mobile device 950 to function as a peripheral device to exchange information with a personal computer or other computer system. The infrared port 964 and other optional ports such as a Bluetooth interface or an IEEE 802.11 compliant wireless interface may enable the mobile device 950 to communicate wirelessly with other nearby handsets and/or wireless base stations in addition to tagging devices. Additional ports may also enable communication with a tagging device such as an RFID tag, an NFC tag, or the like.

The keypad 966 couples to the DSP 953 via the input/output interface 961 to provide one mechanism for the user to make selections, enter information, and otherwise provide input to the mobile device 950. Another input mechanism may be the touch screen LCD 967, which may also display text and/or graphics to the user. The touch screen LCD controller 968 couples the DSP 953 to the touch screen LCD 967. The GPS receiver 971 is coupled to the DSP 953 to decode global positioning system signals, thereby enabling the mobile device 950 to determine its position.

Figure 17A:
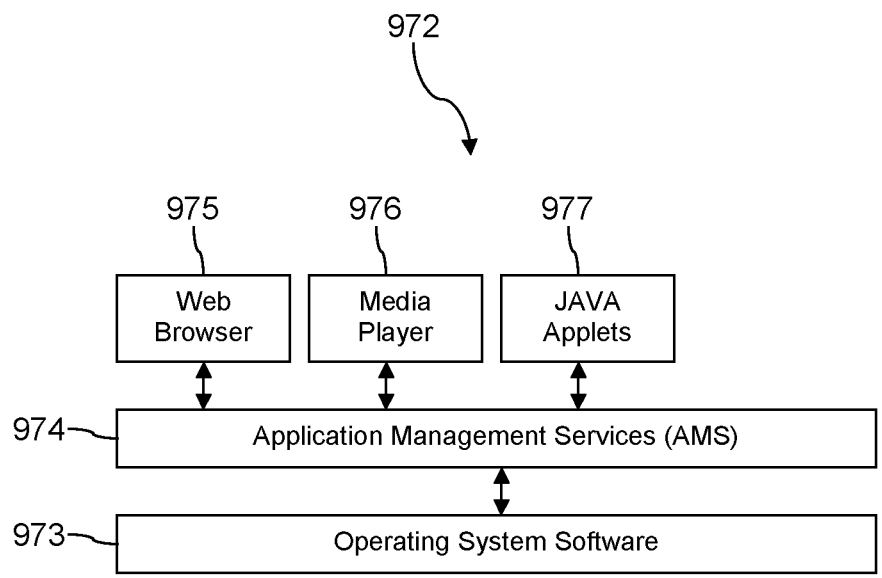
FIGS. 17A and 17B are block diagrams of software architecture for a mobile communication device according to an exemplary embodiment.

FIG. 17A illustrates a software environment 972 that may be implemented by the DSP 953. The DSP 953 may execute operating system software 973 or low-level hardware interface and management software that provides a platform from which the rest of the software operates. The operating system software 973 may provide a variety of drivers for the handset hardware with standardized interfaces that are accessible to application software. The operating system software 973 may be coupled to and interact with application management services (AMS) 974 that transfer control between applications running on the mobile device 950. Also shown in FIG. 17A are a web browser application 975, a media player application 976, and JAVA applets 977. The web browser application 975 may be executed by the mobile device 950 to browse content and/or the Internet, for example when the mobile device 950 is coupled to a network via a wireless link. The web browser application 975 may permit a user to enter information into forms and select links to retrieve and view web pages. The media player application 976 may be executed by the mobile device 950 to play audio or audiovisual media. The JAVA applets 977 may be executed by the mobile device 950 to provide a variety of functionality including games, utilities, and other functionality.

Figure 17B:
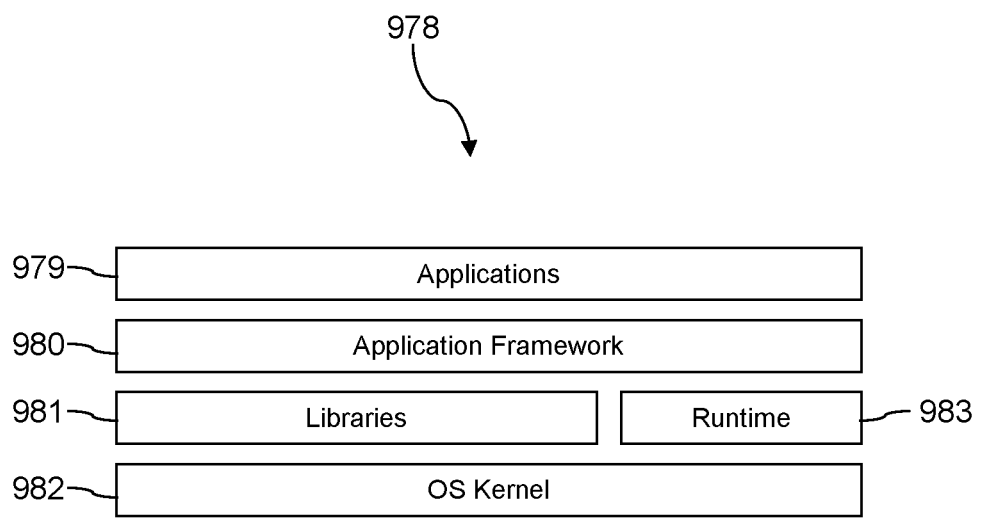

FIG. 17B illustrates an alternative software environment 978 that may be implemented by the DSP 953. The DSP 953 executes operating system kernel (OS kernel) 982 and an execution runtime 983. The DSP 953 executes applications 979 that may execute in the execution runtime 983 and may rely upon services provided by the application framework 980. Applications 979 and the application framework 980 may rely upon functionality provided via the libraries 981.

Figure 18:
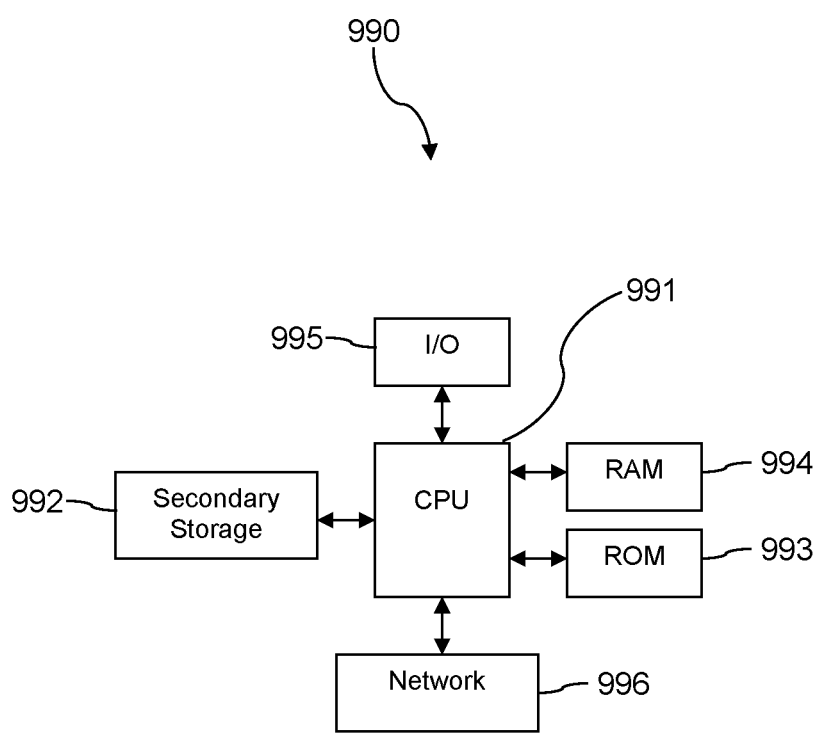
FIG. 18 illustrates an exemplary computer system suitable for implementing several an exemplary embodiments.

FIG. 18 illustrates a computer system 990 suitable for implementing one or more embodiments disclosed herein. For example, any of the systems described with respect to FIG. 1 may be implemented as one or more servers and/or computers that are the same as or similar to the computer system 990. The computer system 990 includes a processor 991 (which may be referred to as a central processor unit or CPU) that is in communication with memory devices including secondary storage 992, read only memory ("ROM") 993, random access memory ("RAM") 994, input/output ("I/O") devices 995, and network connectivity devices 996. The processor 991 may be implemented as one or more CPU chips or one more chips that together provide the functionality of the processor.

It is understood that by programming and/or loading executable instructions onto the computer system 990, at least one of the CPU 991, the RAM 994, and the ROM 993 are changed, transforming the computer system 990 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit ("ASIC"), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 992 is typically comprised of one or more disk drives or tape drives and is used for non-volatile storage of data and as an over-flow data storage device if RAM 994 is not large enough to hold all working data. Secondary storage 992 may be used to store programs which are loaded into RAM 994 when such programs are selected for execution. The ROM 993 is used to store instructions and perhaps data which are read during program execution. ROM 993 is a non-volatile memory device which typically has a small memory capacity relative to the larger memory capacity of secondary storage 992. The RAM 994 is used to store volatile data and perhaps to store instructions. Access to both ROM 993 and RAM 994 is typically faster than to secondary storage 992. The secondary storage 992, the RAM 994, and/or the ROM 993 may be referred to in some contexts as computer readable storage media and/or non-transitory computer readable media.

I/O devices 995 may include printers, video monitors, liquid crystal displays ("LCDs"), touch screen displays, keyboards, keypads, switches, dials, mice, track balls, voice recognizers, card readers, paper tape readers, or other well-known input devices.

The network connectivity devices 996 may take the form of modems, modem banks, Ethernet cards, USB interface cards, serial interfaces, token ring cards, fiber distributed data interface ("FDDI") cards, wireless local area network (WLAN) cards, radio transceiver cards such as CDMA, GSM, LTE, WiMAX, and/or other air interface protocol radio transceiver cards, and other well-known network devices. These network connectivity devices 996 may enable the processor 991 to communicate with the Internet or one or more intranets. With such a network connection, it is contemplated that the processor 991 might receive information from the network, or might output information to the network in the course of performing the above-described method steps. Such information, which is often represented as a sequence of instructions to be executed using processor 991, may be received from and outputted to the network, for example, in the form of a computer data signal embodied in a carrier wave.

Such information, which may include data or instructions to be executed using processor 991 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 991 executes instructions, codes, computer programs, scripts which it accesses from hard disk, floppy disk, optical disk (these various disk based systems may all be considered secondary storage 992), ROM 993, RAM 994, or the network connectivity devices 996. While only one processor 991 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 992, for example, hard drives, floppy disks, optical disks, and/or other device, the ROM 993, and/or the RAM 994 may be referred to in some contexts as non-transitory instructions and/or non-transitory information.

In an embodiment, the computer system 990 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 990 to provide the functionality of a number of servers that is not directly bound to the number of computers in the computer system 990. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 990, at least portions of the contents of the computer program product to the secondary storage 992, to the ROM 993, to the RAM 994, and/or to other non-volatile memory and volatile memory of the computer system 990. The processor 991 may process the executable instructions and/or data structures in part by directly accessing the computer program product, for example by reading from a CD-ROM disk inserted into a disk drive peripheral of the computer system 990. Alternatively, the processor 991 may process the executable instructions and/or data structures by remotely accessing the computer program product, for example by downloading the executable instructions and/or data structures from a remote server through the network connectivity devices 996. The computer program product may comprise instructions that promote the loading and/or copying of data, data structures, files, and/or executable instructions to the secondary storage 992, to the ROM 993, to the RAM 994, and/or to other non-volatile memory and volatile memory of the computer system 990.

In some contexts, the secondary storage 992, the ROM 993, and the RAM 994 may be referred to as a non-transitory computer readable medium or a computer readable storage media. A dynamic RAM embodiment of the RAM 994, likewise, may be referred to as a non-transitory computer readable medium in that while the dynamic RAM receives electrical power and is operated in accordance with its design, for example during a period of time during which the computer system 990 is turned on and operational, the dynamic RAM stores information that is written to it. Similarly, the processor 991 may comprise an internal RAM, an internal ROM, a cache memory, and/or other internal non-transitory storage blocks, sections, or components that may be referred to in some contexts as non-transitory computer readable media or computer readable storage media.

Having described the various systems and methods herein, various embodiments of the systems and methods can include, but are not limited to:

In a first embodiment, a system for authenticating and managing the ownership of an item comprise a physical tagging device affixed to the item, wherein the physical tagging device comprises tagging device data; an item information system receiving the tagging device data and associated item data and storing the tagging device data and the item data; an owner registration and transfer system receiving owner registration data and ownership change requests and storing the ownership history; and an authentication system receiving authentication requests and generating a response based upon the information stored in the system or a connected system.

A second embodiment may include the system of the first embodiment, wherein the physical tagging device comprises a linear bar code.

A third embodiment may include the system of the second embodiment, wherein the linear bar code is printed directly on the item.

A fourth embodiment may include the system of the second embodiment, wherein the linear bar code is affixed to a peel-away adhesive layer, and wherein a portion of the peel-away adhesive layer is configured to remain affixed to the item if the physical tagging device is removed from the item.

A fifth embodiment may include the system of any of the first to fourth embodiments, wherein the physical tagging device comprises a QR code.

A sixth embodiment may include the system of the fifth embodiment, wherein the QR code is printed directly on the item.

A seventh embodiment may include the system of the fifth embodiment, wherein the QR code is physically etched into the item.

An eighth embodiment may include the system of the fifth embodiment, wherein the QR code is affixed to a peel-away adhesive layer, and wherein a portion of the peel-away adhesive layer is configured to remain affixed to the item if the physical tagging device is removed from the item.

A ninth embodiment may include the system of any of the first to eighth embodiments, wherein the physical tagging device comprises an RFID device.

A tenth embodiment may include the system of the ninth embodiment, wherein the RFID device is embedded within the item.

An eleventh embodiment may include the system of the ninth embodiment, wherein the RFID device is affixed to a peel-away adhesive layer, and wherein a portion of the peel-away adhesive layer is configured to remain affixed to the item if the physical tagging device is removed from the item.

A twelfth embodiment may include the system of any of the first to eleventh embodiments, wherein the physical tagging device comprises an NFC compatible device.

A thirteenth embodiment may include the system of the twelfth embodiment, wherein the NFC device is embedded within the item.

A fourteenth embodiment may include the system of the twelfth embodiment, wherein the NFC device is affixed to a peel-away adhesive layer, and wherein a portion of the peel-away adhesive layer is configured to remain affixed to the item if the physical tagging device is removed from the item.

A fifteenth embodiment may include the system of any of the first to fourteenth embodiments, wherein the physical tagging device comprises a Bluetooth enabled device.

A sixteenth embodiment may include the system of the fifteenth embodiment, wherein the Bluetooth device is embedded within the item.

A seventeenth embodiment may include the system of the fifteenth embodiment, wherein the Bluetooth device is affixed to a peel-away adhesive layer, and wherein a portion of the peel-away adhesive layer is configured to remain affixed to the item if the physical tagging device is removed from the item.

An eighteenth embodiment may include the system of any of the first to seventeenth embodiments, wherein the physical tagging device comprises an optically readable pattern.

A nineteenth embodiment may include the system of the eighteenth embodiment, wherein the optically readable pattern is printed directly on the item or etched into the item.

A twentieth embodiment may include the system of the eighteenth embodiment, wherein the optically readable pattern is printed on a peel-away adhesive layer, and wherein a portion of the peel-away adhesive layer is configured to remain affixed to the item if the physical tagging device is removed from the item.

A twenty first embodiment may include the system of any of the first to twentieth embodiments, wherein the physical tagging device comprises a WiFi enabled device.

A twenty second embodiment may include the system of any of the first to twenty first embodiments, wherein the item information system further receives data and information related to the item and stores the information for use by one or more of the item information system, the owner registration and transfer system, or the authentication system.

A twenty third embodiment may include the system of the twenty second embodiment, wherein the data and information related to the item comprises information from an authentication request, tagging device read event data, authentication request event data, item information system event data, owner registration and transfer event data, authentication system event data, ownership event data, updated owner data, product registration data, manufacturer event data.

A twenty fourth embodiment may include the system of any of the first to twenty third embodiments, wherein the an owner registration and transfer system further provides product registration information to an item manufacturer or item registration service.

A twenty fifth embodiment may include the system of any of the first to twenty fourth embodiments, further comprising a key management system, wherein the authentication system communicates with the key management system.

A twenty sixth embodiment may include the system of the twenty fifth embodiment, wherein the key management system comprises a hardware security module (HSM), and wherein the HSM stores one or more authentication keys.

A twenty seventh embodiment may include the system of the twenty fifth or twenty sixth embodiment, wherein the authentication system is configured to generate a response to the authentication request by accessing at least one authentication key in the key management system.

A twenty eighth embodiment may include the system of any of the first to twenty seventh embodiments, wherein the owner registration and transfer system further comprises: an owner registration system receiving one or more requests, owner data, and owner authentication to establish the current owner of the item; an owner release system receiving one or more requests, current owner data, and current owner authentication to remove the current owner of the item; an owner transfer system receiving one or more requests, current owner data, second owner data, current owner authentication, and second owner authentication to establish the second owner as the current owner of the item, and an owner history system that records the requests and activities regarding the ownership of the item.

A twenty ninth embodiment may include the system of the twenty eighth embodiment, further comprising a notification system generating a notification message to one or more users involved in an ownership request.

A thirtieth embodiment may include the system of the twenty eighth or twenty ninth embodiment, further comprising a notification system generating a notification message to one or more entities after a change in the current ownership of an item.

A thirty first embodiment may include the system of any of the first to thirtieth embodiments, wherein the item data comprises a serial number of the item.

A thirty second embodiment may include the system of any of the first to thirty first embodiments, wherein the item data comprises image data of the item.

A thirty third embodiment may include the system of any of the first to thirty second embodiments, further comprising a notification system configured to generate a message based upon the information stored in the system or a connected system.

A thirty fourth embodiment may include the system of any of the first to thirty third embodiments, further comprising an advertisement server, wherein at least one of the item information system, the owner registration and transfer system, or the authentication system are further configured to supply information to the advertisement server, and wherein at least one of the item information system, the owner registration and transfer system, or the authentication system is configured to receive an advertisement or a coupon from the ad server.

In a thirty fifth embodiment, a method for authenticating an item comprises storing authentication information, tagging device data, and item data associated with a tagging device in a server; receiving tagging device data and authentication information from a tagging device, wherein the tagging device is attached to an item; receiving the tagging device data and the authentication information from the server; correlating the tagging device data and the authentication information in the server with the tagging device data and the authentication information from the tagging device; and generating confirmation data when the tagging device data and authentication information are correlated.

A thirty sixth embodiment may include the method of the thirty fifth embodiment, further comprising: commissioning the tagging device, and inserting the authentication information, the tagging device data, and the item data into the tagging device.

A thirty seventh embodiment may include the method of the thirty fifth or thirty sixth embodiment, further comprising generating one or more notification messages indicating at least the authentication request and confirmation data and sending the one or more messages to one or more entities.

A thirty eighth embodiment may include the method of the thirty seventh embodiment, wherein one of the entities is the registered owner of the item authenticated.

A thirty ninth embodiment may include the method of any of the thirty fifth to thirty eighth embodiments, further comprising receiving the item data from server.

A fortieth embodiment may include the method of any of the thirty fifth to thirty ninth embodiments, wherein receiving the tagging device data and the authentication information from a tagging device and from server is performed by a mobile tag reading device.

A forty first embodiment may include the method of the fortieth embodiment, wherein the mobile tag reading device is a mobile phone.

A forty second embodiment may include the method of any of the thirty fifth to forty first embodiments, further comprising: receiving an ad from an ad server in response to the correlating.

A forty third embodiment may include the method of the forty second embodiment, wherein the ad is based on a type of the item.

A forty fourth embodiment may include the method of the forty second or forty third embodiment, wherein the ad is based on demographic data associated with an owner of the item.

A forty fifth embodiment may include the method of any of the thirty fifth to forty fourth embodiments, further comprising generating a certificate of authenticity when the tagging device data and authentication information are correlated.

A forty sixth embodiment may include the method of any of the thirty fifth to forty fifth embodiments, further comprising: receiving a coupon from a coupon server in response to the correlating.

A forty seventh embodiment may include the method of the forty sixth embodiment, wherein the coupon is based on a type of the item, demographic data associated with one or more owners of the item, a usage history of a reading device, a location of the reading device, or any combination thereof.

In a forty eighth embodiment, an item authentication system comprises a processor; and an authentication application, that when executed on the processor configures the processor to: generate a first challenge data; send the first challenge data to a tagging device; receive a first response message and a tag identification from the tagging device; send the first challenge data, the first response message, and the tag identification to an authentication server, wherein the authentication server verifies the first response message based on the first challenge data, creates a second challenge data, and a second challenge response based on the tag identification; receive the second challenge data and the second challenge response from the authentication server based on the server verifying the first response message; send the second challenge data to the tagging device; receive a third challenge response; verify that the second challenge response matches the third challenge response; and authenticate the tagging device when the second challenge response matches the third challenge response.

A forty ninth embodiment may include the system of the forty eighth embodiment, wherein the tagging device comprises a first encryption key, and wherein the first challenge response comprises the first challenge data encrypted with the first encryption key.

A fiftieth embodiment may include the system of the forty ninth embodiment, wherein the second challenge response comprises the second challenge data encrypted with a second encryption key.

A fifty first embodiment may include the system of the fiftieth embodiment, wherein the third challenge response comprises the second challenge data encrypted with the first encryption key, and wherein the first encryption key and the second encryption key are the same shared key.

A fifty second embodiment may include the system of any of the forty eighth to fifty first embodiments, wherein the authentication application further configures the processor to receive item information from an item information system based on the tag identification, and display the item information on an output device.

In a fifty third embodiment, a method for authenticating an item comprises storing tagging device data and certificate information associated with a first tagging device and a second tagging device in a storage; receiving first tagging device data from the first tagging device, wherein the first tagging device is associated with an item; receiving second tagging device data and second tagging device certificate information from the second tagging device, wherein the second tagging device is associated with the item, and wherein the second tagging device certificate information comprises a signature over at least a portion of the second tagging device data and at least a portion of the first tagging device data; verifying the second tagging device certificate information based on at least a portion of the first tagging device data, the second tagging device data, and the certificate information in the storage; and generating confirmation data when the second tagging device certificate information is verified.

A fifty fourth embodiment may include the method of the fifty third embodiment, further comprising: authenticating the first tagging device based on the first tagging device data and the tagging device data stored in the storage.

A fifty fifth embodiment may include the method of the fifty third or fifty fourth embodiment, further comprising: authenticating the second tagging device based on the second tagging device data and the tagging device data stored in the storage.

A fifty sixth embodiment may include the method of any of the fifty third to fifty fifth embodiments, wherein the second tagging device certificate information comprises a signature over at least uniquely coded identifying data ("UID") of the first tagging device.

A fifty seventh embodiment may include the method of any of the fifty third to fifty sixth embodiments, wherein the confirmation data comprises a verification that the first tagging device is associated with the second tagging device.

A fifty eighth embodiment may include the method of any of the fifty third to fifty seventh embodiments, wherein the first tagging device and the second tagging device are different types of devices.

In a fifty ninth embodiment, a method for authenticating an item comprises storing tagging device data and certificate information associated with a first tagging device and a second tagging device in a storage; receiving first tagging device data and first tagging device certificate information from the first tagging device, wherein the first tagging device is associated with an item; receiving second tagging device data and second tagging device certificate information from the second tagging device, wherein the second tagging device is associated with the item, wherein the first tagging device certificate information comprises a signature over at least a portion of the first tagging device data and at least a portion of the second tagging device data, and wherein the second tagging device certificate information comprises a signature over at least a portion of the second tagging device data and at least a portion of the first tagging device data; verifying at least one of the first tagging device certificate information or the second tagging device certificate information based on at least a portion of the first tagging device data, at least a portion of the second tagging device data, and at least a portion of the certificate information in the storage; and generating confirmation data when the first tagging device certificate information or the second tagging device certificate information is verified.

A sixtieth embodiment may include the method of the fifty ninth embodiment, further comprising: authenticating the first tagging device based on the first tagging device data and the tagging device data stored in the storage.

A sixty first embodiment may include the method of any of the fifty ninth or sixtieth embodiment, further comprising: authenticating the second tagging device based on the second tagging device data and the tagging device data stored in the storage.

A sixty second embodiment may include the method of any of the fifty ninth to sixty first embodiments, further comprising: verifying both of the first tagging device certificate information and the second tagging device certificate information based on at least a portion of the first tagging device data, at least a portion of the second tagging device data, and at least a portion of the certificate information in the storage.

A sixty third embodiment may include the method of any of the fifty ninth to sixty second embodiments, wherein the first tagging device certificate information comprises a signature over at least UID of the second tagging device.

A sixty fourth embodiment may include the method of any of the fifty ninth to sixty third embodiments, wherein the second tagging device certificate information comprises a signature over at least UID of the first tagging device.

A sixty fifth embodiment may include the method of any of the fifty ninth to sixty fourth embodiments, wherein the confirmation data comprises a verification that the first tagging device is associated with the second tagging device.

In a sixty sixth embodiment, a method of updating registered ownership of an item from a presently unassigned owner to a subsequent registered owner in an authentication system comprises: receiving first data at the authentication system, the first data associated with a first registered user of the authentication system; authenticating the first registered user of the authentication system based on the first data; receiving an ownership change request from the first registered user; receiving second data at the authentication system, the second data associated with the item; authenticating the second data as data associated with the item; verifying that the item has no current registered owner; and associating the first registered user as the current owner of the item based on verifying that the item has no current registered owner, authenticating the first data, and authenticating the second data.

A sixty seventh embodiment may include the method of the sixty sixth embodiment, further comprising archiving selected information associated with the updating of the ownership to maintain a historical record of ownership transactions.

A sixty eighth embodiment may include the method of the sixty sixth or sixty seventh embodiment, wherein the authentication system requires the first registered user to have ownership privileges in the authentication system.

A sixty ninth embodiment may include the method of any of the sixty sixth to sixty eighth embodiments, further comprising providing notification, by the authentication system, of the change of ownership transaction to the first registered user.

A seventieth embodiment may include the method of any of the sixty sixth to sixty ninth embodiments, further comprising providing notification, by the authentication system, of the change of ownership transaction to a third party.

A seventy first embodiment may include the method of any of the sixty sixth to seventieth embodiments, further comprising reading the second data from a QR code attached to the item.

A seventy second embodiment may include the method of any of the sixty sixth to seventieth embodiments, further comprising reading the second data from an RFID tag attached to the item.

A seventy third embodiment may include the method of any of the sixty sixth to seventieth embodiments, further comprising reading the second data from an active wireless communication device.

In a seventy fourth embodiment, a method of releasing the present owner of an item in an authentication system comprises: receiving first data at the authentication system, the first data associated with a first registered user of the authentication system; authenticating the first registered user of the authentication system based on the first data; receiving an ownership change request from the first registered user; verifying the first registered user is a current owner of the item; setting the first registered user as a past owner of the item based on authenticating the first registered user and receiving the ownership change; and setting the current owner of the item as unassigned.

A seventy fifth embodiment may include the method of the seventy fourth embodiment, further comprising: receiving second data at the authentication system, the second data associated with the item; and authenticating the second data as data associated with the item, wherein setting the first registered user as the past owner of the item is further based on authenticating the second data.

A seventy sixth embodiment may include the method of the seventy fourth or seventy fifth embodiment, further comprising the step of archiving selected information associated with the updating of the ownership to maintain a historical record of ownership transactions.

A seventy seventh embodiment may include the method of any of the seventy fourth to seventy sixth embodiments, wherein the authentication system requires the first registered user having ownership privileges in the authentication system.

A seventy eighth embodiment may include the method of any of the seventy fourth to seventy seventh embodiments, further comprising providing notification, by the authentication system, of the change of ownership transaction to the first registered user.

A seventy ninth embodiment may include the method of any of the seventy fourth to seventy eighth embodiments, further comprising providing notification, by the authentication system, of the change of ownership transaction to a third party.

In an eightieth embodiment, a method of updating registered ownership of an item from a current owner to a subsequent owner in an authentication system comprises: receiving first data at the authentication system, the first data associated with a first registered user of the authentication system; authenticating the first registered user of the authentication system based on the first data; receiving an ownership change request from the first registered user, wherein the ownership change request comprises second data, the second data associated with a second registered user of the authentication system; verifying the first registered user is the current owner of the item based on the first data; verifying the second registered user as a valid registered user; setting the first registered user as a past owner of the item; and setting the current owner of the item as the second registered user.

An eighty first embodiment may include the method of the eightieth embodiment, further comprising: receiving third data at the authentication system, the third data associated with the item; and authenticating the third data as data associated with the item, wherein setting the first registered user as the past owner of the item and setting the current owner of the item as the second registered user is based on authenticating the third data.

An eighty second embodiment may include the method of any of the eightieth or eighty first embodiment, further comprising archiving selected information associated with the updating of the ownership to maintain a historical record of ownership transactions.

An eighty third embodiment may include the method of any of the eightieth to eighty second embodiments, wherein the authentication system requires the first registered user having ownership privileges in the authentication system.

An eighty fourth embodiment may include the method of any of the eightieth to eighty third embodiments, further comprising providing notification, by the authentication system, of the change of ownership transaction to the first registered user.

An eighty fifth embodiment may include the method of any of the eightieth to eighty fourth embodiments, further comprising providing notification, by the authentication system, of the change of ownership transaction to a third party.

An eighty sixth embodiment may include the method of the eighty fifth embodiment, wherein the third party is the manufacturer of the item.

In an eighty seventh embodiment, a method of for creating an authentication tag comprises: communicating with a tagging device affixed to an item; receiving tagging device data and item data from the tagging device, wherein the tagging device data comprises a first digital signature and a first time stamp; sending the tagging device data and the item data to the authentication server; receiving an authentication of the tagging device from the authentication server; requesting an authentication tag based on the authentication of the tagging device; and receiving the authentication tag, wherein the authentication tag comprises a second digital signature and a second time stamp, wherein the second digital signature covers the tagging device data and the item data.

An eighty eighth embodiment may include the method of the eighty seventh embodiment, wherein the tagging device comprises a linear bar code, QR code, an RFID device, an NFC compatible device, or a Bluetooth enabled device.

An eighty ninth embodiment may include the method of the eighty seventh or eighty eighth embodiments, wherein the authentication tag comprises a linear bar code or a QR code.

A ninetieth embodiment may include the method of any of the eighty seventh to eighty ninth embodiments, wherein the first digital signature comprises at least one of a public key cipher, a hash function, or a keyed hash function.

A ninety first embodiment may include the method of any of the eighty seventh to ninetieth embodiments, wherein the authentication tag verifies the authenticity of the item at a time identified by the second time stamp.

A ninety second embodiment may include the method of any of the eighty seventh to ninety first embodiments, further comprising: receiving user credentials; sending the user credentials to an authentication server; and receiving user verification based on the sending the user credentials to the authentication server, wherein communicating with a tagging device affixed to an item is based on the user verification.

A ninety third embodiment may include the method of the ninety second embodiment, wherein the user credentials are for an owner of the item.

A ninety fourth embodiment may include the method of any of the eighty seventh to ninety third embodiments, wherein at least one of the first digital signature or the second digital signature are generated by a signing authority.

In a ninety fifth embodiment, a method of tracking an item comprises: communicating, by a reading device, with a tagging device, wherein the tagging device is associated with an item; retrieving tagging device data from the tagging device; determining a first location of the tagging device; retrieving a location reference based on the tagging device data; calculating a distance between the first location and the location reference; and generating a message when the distance exceeds a threshold.

A ninety sixth embodiment may include the method of the ninety fifth embodiment, wherein the location reference defines a predetermined location.

A ninety seventh embodiment may include the method of the ninety fifth to ninety sixth embodiment, wherein the determining of the first location occurs at a second time, wherein the location reference defines a previous location of the tagging device as determined at a first time, and wherein the method further comprises: calculating a time difference between the first time and the second time, wherein the threshold is based on the time difference being less than a time threshold.

A ninety eighth embodiment may include the method of any of the ninety fifth to ninety seventh embodiments, wherein generating the message comprises generating the message when the distance exceeds the threshold and when the first location of the tagging device is outside a defined geographic area.

A ninety ninth embodiment may include the method of any of the ninety fifth to ninety seventh embodiments, wherein generating the message comprises generating the message when the distance exceeds the threshold and when the first location of the tagging device is within a defined geographic area.

A one hundredth embodiment may include the method of any of the ninety fifth to ninety ninth embodiments, wherein the message comprises the first location of the tagging device and at least a portion of the tagging device data.

In a one hundred first embodiment, a method of tracking an item comprises: communicating, by a reading device, with a tagging device at a first time, wherein the tagging device is associated with an item; retrieving tagging device data from the tagging device; attempting to communicate, by the reading device, with the tagging device at a second time, wherein the second time is after the first time; failing to communicate with the tagging device at the second time; and generating a message in response to failing to communicate with the tagging device.

A one hundred second embodiment may include the method of the one hundred first embodiment, wherein the first time and the second time occur at periodic intervals.

A one hundred third embodiment may include the method of the one hundred first embodiment, wherein the first time and the second time occur at predefined times.

A one hundred fourth embodiment may include the method of any of the one hundred first to one hundred third embodiments, further comprising: determining a signal strength in response to communicating with the tagging device, wherein the second time is based on the signal strength A one hundred fifth embodiment may include the method of any of the one hundred first to one hundred fourth embodiments, further comprising: attempting to communicate with the tagging device at one or more intermediate times, wherein the one or more intermediate times fall between the first time and the second time.

A one hundred sixth embodiment may include the method of any of the one hundred first to one hundred fifth embodiments, further comprising: authenticating the tagging device based on the tagging device data retrieved from the tagging device.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented by a reading device, the method comprising:
    communicating with a tagging device affixed to an item;
    receiving tagging device data and item data from the tagging device, wherein the tagging device data comprise a first digital signature and a first time stamp;
    sending the tagging device data and the item data to an authentication server;
    receiving an authentication of the tagging device from the authentication server;
    requesting an authentication tag in response to receiving the authentication; and
    receiving the authentication tag,
    wherein the authentication tag comprises a second digital signature and a second time stamp, and
    wherein the authentication tag verifies authenticity of the item at a time identified by the second time stamp.

2. The method of claim 1, wherein the tagging device comprises a linear bar code, a Quick Response (QR) code, a radio-frequency identification (RFID) device, a near-field communication (NFC)-enabled device, or a Bluetooth-enabled device.

3. The method of claim 1, wherein the authentication tag comprises a linear bar code or a Quick Response (QR) code.

4. The method of claim 1, wherein the first digital signature comprises at least one of a public key cipher, a hash function, or a keyed hash function.

5. The method of claim 1, further comprising further sending the tagging device data and the item data as distinct data.

6. The method of claim 1, wherein at least one of the first digital signature or the second digital signature is generated by a signing authority.

7. The method of claim 1, wherein the first time stamp is associated with a generation time of the first digital signature.

8. The method of claim 1, wherein the authentication based on the first digital signature and the first time stamp.

9. The method of claim 8, wherein the authentication is further based on the item data.

10. The method of claim 1, wherein the second digital signature includes the tagging device data.

11. The method of claim 1, wherein the second digital signature comprises a cipher, a hash function, or a keyed hash function.

12. The method of claim 1, further comprising receiving a certificate of authenticity comprising the authentication tag.

13. The method of claim 12, wherein the certificate of authenticity further comprises at least one of a product identifier (ID), a vendor ID, ownership data, the second time stamp, or a tagging device ID associated with the item.

14. The method of claim 12, further comprising:
    sending the certificate of authenticity to a remote device; and
    using the certificate of authenticity to authenticate the tagging device with a third party.

15. A method implemented by an authentication server, the method comprising:
    receiving tagging device data and item data originating from a tagging device affixed to an item;
    authenticating the tagging device using the tagging device data;
    sending an authentication of the tagging device to a reading device;
    receiving a request for an authentication tag in response to sending the authentication;
    generating the authentication tag, wherein the authentication tag comprises a second digital signature and a second time stamp, and wherein the authentication tag verifies authenticity of the item at a time identified by the second time stamp; and
    sending the authentication tag to the reading device.

16. The method of claim 15, wherein the tagging device data comprise a first digital signature and a first time stamp.

17. The method of claim 15, further comprising:
verifying a user associated with the reading device and the item; and
further sending the authentication tag to the reading device in response to verifying the user.

18. The method of claim 15, further comprising publishing the authentication tag.

19. The method of claim 15, wherein the authentication tag comprises a Quick Response (QR) code.

20. The method of claim 15, wherein the second digital signature includes the tagging device data.

21. A method implemented by a reading device, the method comprising:
receiving user credentials;
sending the user credentials to an authentication server;
receiving user verification based on the user credentials;
communicating with a tagging device affixed to an item;
receiving tagging device data and item data from the tagging device, wherein the tagging device data comprise a first digital signature and a first time stamp;
sending the tagging device data and the item data to the authentication server;
receiving an authentication of the tagging device from the authentication server;
requesting an authentication tag in response to receiving the authentication; and
receiving the authentication tag,
wherein the authentication tag comprises a second digital signature and a second time stamp, and
wherein the authentication tag verifies authenticity of the item at a time identified by the second time stamp.

22. The method of claim 21, wherein the user credentials are for an owner of the item.

23. The method of claim 22, wherein the user credentials are associated with a first registered user of the authentication server, and wherein the method further comprises:
sending an ownership change request to the authentication server, wherein the ownership change request comprises data associated with a second registered user of the authentication server; and
receiving a message indicating an ownership status has changed from the first registered user to the second registered user.

24. The method of claim 21, further comprising further communicating with the tagging device in response to receiving the user verification and further comprising further sending the tagging device data and the item data as distinct data.

* * * * *